United States Patent [19]
Mori et al.

[11] Patent Number: 6,128,485
[45] Date of Patent: Oct. 3, 2000

[54] MOVABLE COMMUNICATION SYSTEM

[75] Inventors: Takeshi Mori; Fumihiko Shimazaki; Kazuyuki Irifune, all of Yokohama, Japan

[73] Assignee: Hitachi, Ltd., Tokyo, Japan

[21] Appl. No.: 08/805,681

[22] Filed: Feb. 27, 1997

[30] Foreign Application Priority Data

Feb. 27, 1996 [JP] Japan .................................. 8-039727

[51] Int. Cl.$^7$ ...................................................... H04Q 7/20
[52] U.S. Cl. ........................ 455/422; 455/575; 455/560; 455/561
[58] Field of Search ..................................... 455/403, 405, 455/412, 414, 417, 418–420, 421–422, 426, 432–433, 435, 445, 455–458, 507, 517, 66, 67.1, 550, 560–561, 565–566, 575

[56] References Cited

U.S. PATENT DOCUMENTS

| | | | |
|---|---|---|---|
| 5,128,981 | 7/1992 | Tsukamoto et al. | 455/450 |
| 5,148,473 | 9/1992 | Freeland et al. | 455/556 |
| 5,678,195 | 10/1997 | Suikkola et al. | 455/524 |
| 5,884,193 | 3/1999 | Kaplan | 455/565 |

FOREIGN PATENT DOCUMENTS 07087568  3/1995  Japan .

*Primary Examiner*—Doris H. To
*Attorney, Agent, or Firm*—Antonelli, Terry, Stout & Kraus, LLP

[57] ABSTRACT

In a movable communication system, when one or more areas where special services other than a calling service and a call-incoming service are supplied to a personal station are predetermined, the content of the special services to be supplied to the personal station are notified to the personal station. For example, when a personal station located in a predetermined area in which the call-incoming to the personal station is prohibited has a call-incoming thereto, a base station covering the area supplies the personal station with a call-incoming service of prohibiting the paging to the personal station to prohibit the connection between the personal station and a caller, and also transmitting to the personal station a message indicating that there has been the call-incoming. Further, the base station transmits to the personal station a message indicating that the personal station is located in a call-incoming prohibited area.

54 Claims, 35 Drawing Sheets

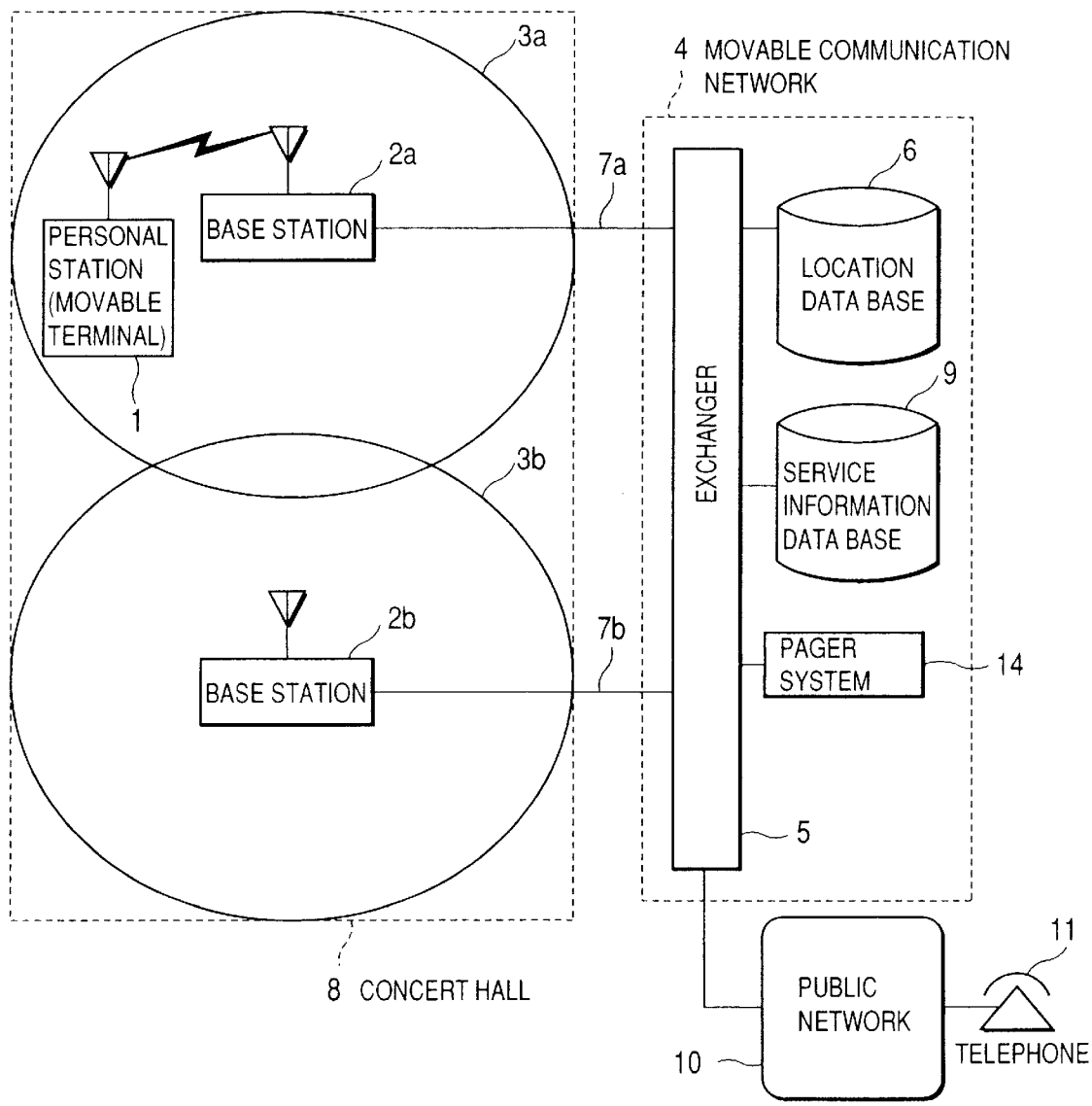

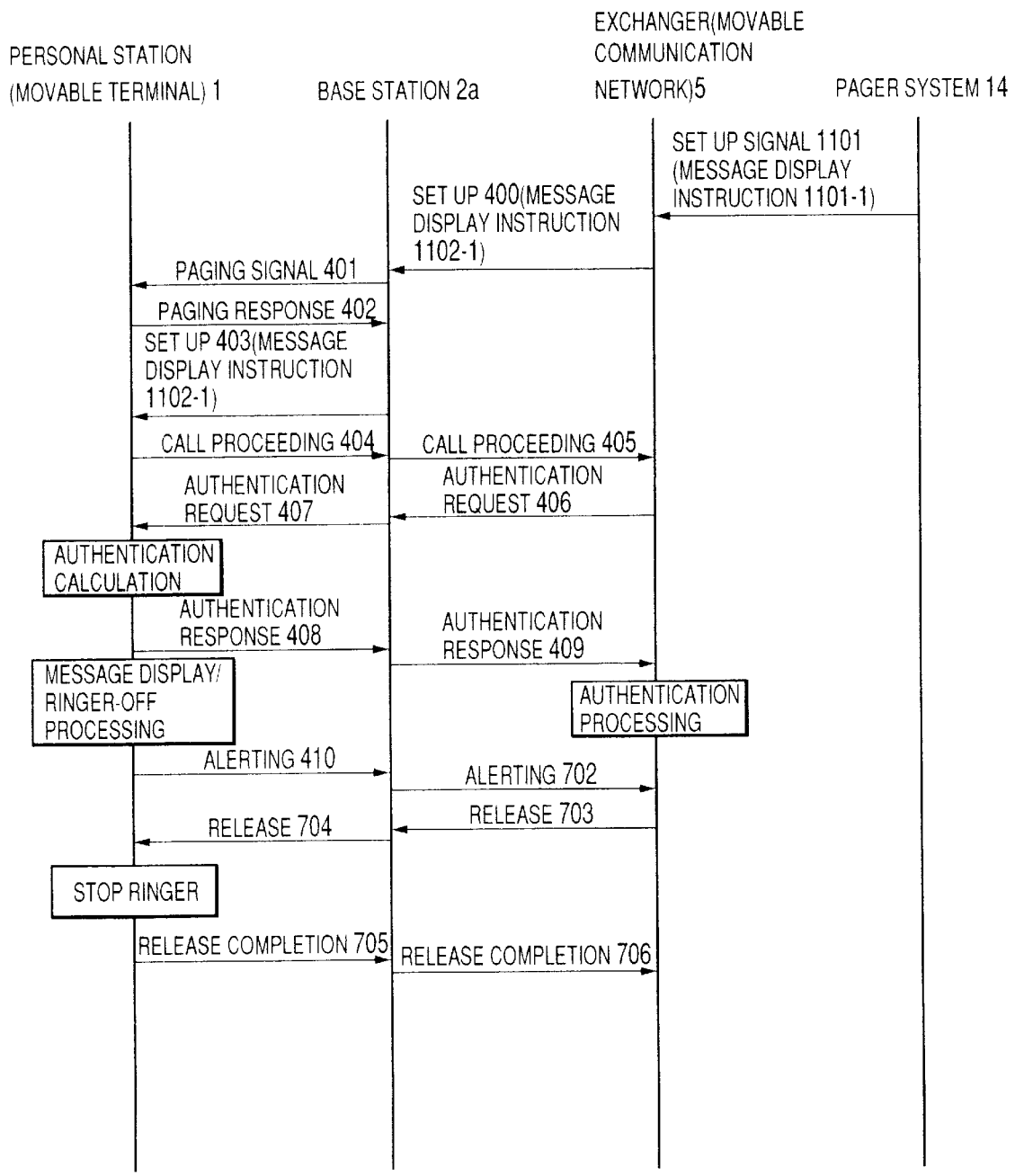

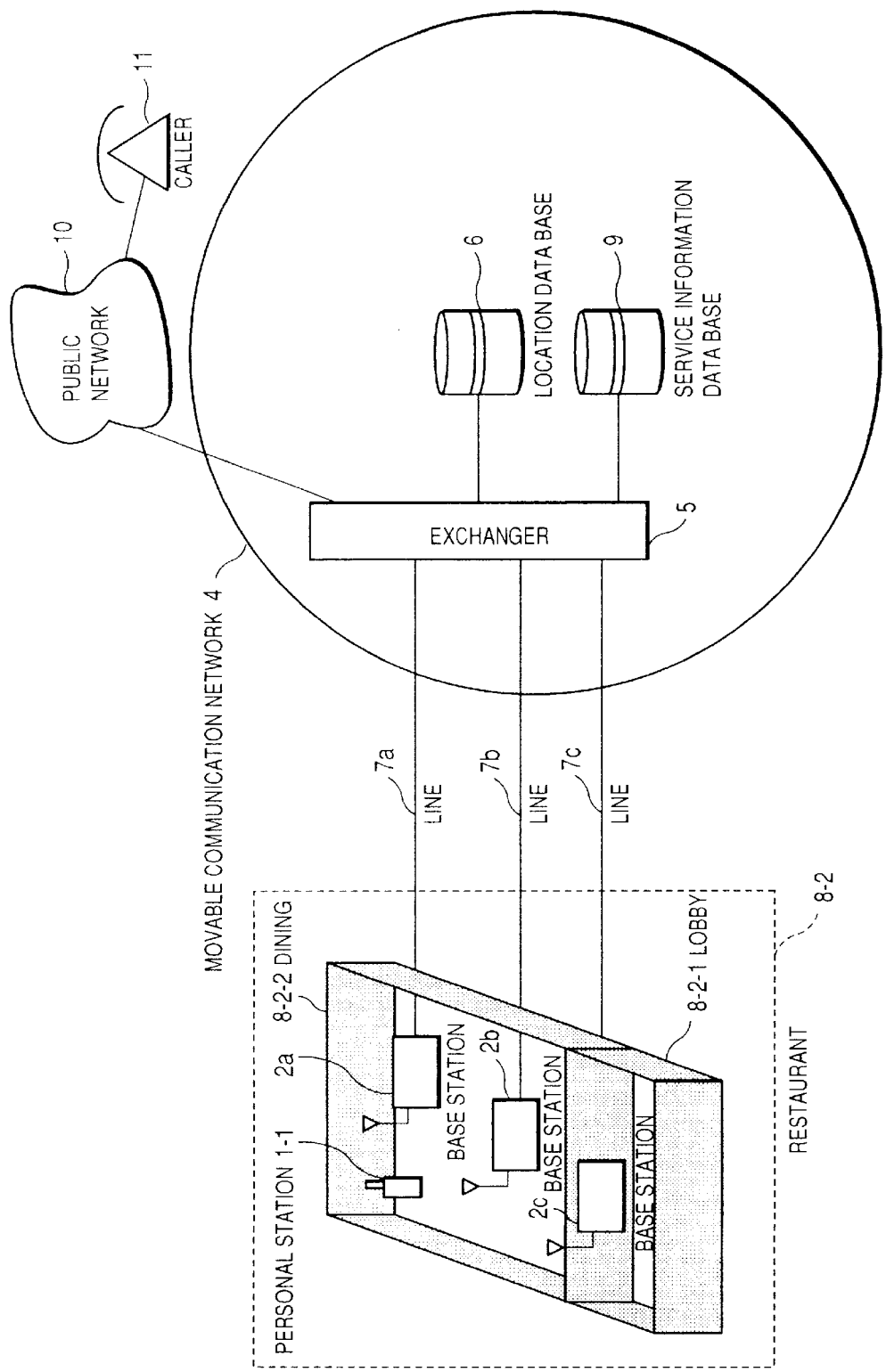

MOVABLE COMMUNICATION SYSTEM

BACKGROUND OF THE INVENTION

1. Field of the Invention

The present invention relates to a movable communication system in which a movable telephone, a portable telephone, a PHS (Personal Handy Phone) or the like is used as a personal station (hereinafter referred to as "personal station" (PS).

2. Description of Related Art

According to a conventional movable communication system, as practically used in Japanese public portable telephone service and PHS telephone service, each of all the base stations (radio wave control station) provides the same services (for example, calling, call-incoming (call reception), unconditional transfer to a voice mail or a phone-response machine, transfer under user-absence, non-response transfer, hand-over, etc.) to all the personal stations located in an area which is covered by each base station.

That is, for example, with respect to a call-incoming (call-reception) service and a calling service for a personal station, these services are allowed at any time for 24 hours by a base station which covers an area where the personal station concerned is located, except for a case where communication traffic increases temporarily and thus some restriction must be applied, and a case where a line is under busy status.

In the movable communication system as described above, call-incoming to a personal station and calling from a personal station are allowed to be freely carried out even in such a place that a paging tone generated from a personal station or a communication on the telephone puts others to annoyance (for example, in a concert hall, a library or the like), or at such a time during playing movies or lecturing, and such an inconvenient action cannot be avoided by this communication system.

Therefore, in order to inform a call-incoming (call-reception) to a user in such a place or at such a time, a personal station having a vibrator call mode in which a paging tone is not made, but the user is paged with vibration. However, in order to notify the call-incoming to the user (subscriber) with the vibration call, the subscriber is required to beforehand set a call-incoming mode to the vibration call mode. Further, although the paging tone is prohibited from being made in such a situation, the call-incoming to the personal station and the calling from the personal station are allowed to be carried out, so that the subscriber is allowed to have communication by intention.

In such a situation (place or time) where others are put to annoyance, the call-incoming to the personal station and the calling from the personal station would be impossible if the subscriber turns off the power of the personal station. It is determined by the subscriber's intention whether the power of the personal station is turned off or not. Therefore, all the subscribers do not necessarily turn off the power of their personal stations in such a situation. Further, if the power of the personal station is turned off by the subscriber, the subscriber cannot be paged during the power turn-off period even when his personal station receives a call.

The above-described problems are caused by the following situation that each of all the base stations is designed to provide the same services to all the personal stations which are located in an area which is covered by the base station.

Therefore, in order to solve the above problems, Japanese Patent Application Laid-open (KOKAI) No. Hei-7-87568 proposes such a technique that a call-incoming prohibited area and a calling prohibited area are predetermined, and the call-incoming to all the personal stations located in the call-incoming prohibited area is prohibited while the calling from all the personal stations located in the calling prohibited area is prohibited.

In the above-described technique, the call-incoming prohibited area and the calling prohibited area may be controlled (varied) in accordance with year, month, day and hour to thereby achieve a temporary call-incoming prohibited area and a temporary calling prohibited area. That is, the call-incoming to the personal stations and the calling from the personal stations are prohibited in a predetermined time zone, however, these operations are allowed in the other time zones.

Further, in the above-described technique, during a personal station being located in a call-incoming prohibited area, a message from a caller is recorded when the personal station receives a call from the caller, and afterwards the recorded message is reproduced on the basis of a request from the subscriber of the personal station.

As described above, according to the above technique, in accordance with each area which is covered by each of all the base stations, the call-incoming to a personal station located in the area is prohibited and/or the calling from a personal station is prohibited in the area. That is, one or more areas which provide special services other than the calling service and the call-incoming service can be predetermined.

In the above technique, however, the subscriber of the personal station cannot know whether an area where the personal station is located (i.e., an area covering the personal station; hereinafter referred to as "personal station locating area") can provide the special services or not. For example, in a case where the area covering the personal station is a calling prohibited area, when the subscribers calls to a communication target, he or she cannot connect to the communication target to which the subscriber wishes to connect. In the present case, the subscriber cannot know the reason why he or she cannot connect to the communication target, and thus he or she take no countermeasure to such a situation. Further, for example, in the case where the call-incoming prohibited area (or calling prohibited area) is controlled in accordance with the year, the month, the data and the hour to set a temporary call-incoming prohibited area (or temporary calling prohibited area), even when a personal station is located in the same area, the subscriber of the personal station faces such a situation that the reception of a call (call-incoming) to the personal station (a calling from the personal station) is prohibited or allowed in accordance with a time zone for which the personal station is located in the area. Therefore, the subscriber gets confused with such a situation.

Further, according to the above technique, the call-incoming to all the personal stations which are located in each of all the call-incoming prohibited areas is prohibited. Therefore, for example, while a personal station is located in a call-incoming prohibited area, a call originator (caller) cannot make an urgent call to the subscriber of the personal station located in the call-incoming prohibited area at all times because the call-incoming to the personal station is prohibited in such an area irrespective of urgency of the call.

SUMMARY OF THE INVENTION

A first object of the present invention is to provide a movable communication system in which when one or more areas where a personal station is provided with special services other than a calling service and a call-incoming service are predetermined, the content of the special services are notified to any personal station located in the predetermined areas, and the information thus notified can be known through the personal station.

Specifically, for example, a personal station located in a call-incoming prohibited area (or a calling prohibited area) is informed of the fact that the call-incoming (or calling) is prohibited in this area, and a personal station located in a temporary call-incoming prohibited area (or temporary calling prohibited area) is informed of the fact that the call-incoming (or calling) is prohibited in this area and also of a time zone in which the call-incoming (calling) is allowed. The information thus notified is displayed on the personal station.

A second object of the present invention is to provide a movable communication station in which even when a personal station is located in an area where special services are provided to personal stations, the personal station concerned is not targeted as a personal station to be provided with the special services if the personal station is a special personal station in the area.

Specifically, even when a personal station is located in a call-incoming prohibited area (or a calling prohibited area), a call-incoming to the personal station (or a calling from the personal station) is not prohibited (i.e., allowed) if the personal station is a special personal station.

A third object of the present invention is to provide a movable communication system in which a personal station is located in an area where special services are provided to any personal station, the personal station is not targeted as a personal station to be provided with the special services in case of emergency.

Specifically, even when the personal station is located in a call-incoming prohibited area, the call-incoming from a subscriber serving as a call originator (caller) to the subscriber of the personal station is not prohibited if the call is an urgent call.

A fourth object of the present invention is to provide a movable communication system in which when a personal station can be provided with special services other than a call-incoming service and a calling service, the personal station can know the content of the special services.

Specifically, for example, a personal station which is located in a call-incoming prohibited area (a calling prohibited area) is allowed to know the fact that it is located in the call-incoming (calling) prohibited area. Further, a personal station which is located in a temporary call-incoming prohibited area (a temporary calling prohibited area) is allowed to know the fact that it is located in the temporary call-incoming (temporary calling) prohibited area, and also a time zone in which the call-incoming (or calling) is allowed.

In order to attain the first object of the present invention, a movable communication system including plural personal stations, plural base stations each of which covers a predetermined area and performs radio communication with any personal station located in the area, and an exchanger for controlling the plural base stations, is characterized in that at least one of each of the plural base stations and the exchanger includes: (1) service information storage means for storing service information representing special services other than a calling service and a call-incoming service, which are to be supplied to a personal station located in the predetermined area of those areas which are respectively covered by the plural base stations, (2) service supply means for supplying the personal station with services represented by service information corresponding to a personal station locating area if the service information is stored in the service information storage means in a case where there is any calling from the personal station or call-incoming to the personal station; and (3) service content notifying means for transmitting to the personal station a message representing the content of the services supplied by the service supply means.

For example, the service information which is stored by the service information storage means may be set to represent prohibition of the call-incoming to personal stations located in the corresponding area.

In this case, when there is any call-incoming to the personal station, the service supply means prohibits any calling to the personal station and prohibits the connection between the personal station and a call originator (caller). At the same time, the service supply means transmits to the personal station a message indicating that there has been the call-incoming. Further, the service content notifying means may transmit to the personal station concerned a message indicating that the personal station locating area is a call-incoming prohibited area.

Also, the service information stored in the service information storage means may be set to represent a call-incoming prohibiting time zone in which the call-incoming to personal stations located in the corresponding area is prohibited.

In this case, when there is any call-incoming to the personal station, the service supply means prohibits a calling to the personal station and prohibits the connection between the personal station and the caller if the present time is in the call-incoming prohibiting time zone which is indicated by the service information corresponding to the personal station locating area. At the same time, the service supply means transmits to the personal station concerned a message indicating that there has been the call-incoming. Further, the service content notifying means may transmit to the personal station concerned a message indicating that the personal station locating area is now in the call-incoming prohibiting time zone, and also a message representing the time when the call-incoming prohibiting time zone is finished.

At this time, the service content notifying means may further transmit to the caller a voice message indicating that the area where the personal station to which the caller calls is located is now in the call-incoming prohibiting time zone and also a voice message representing the time when the call-incoming prohibiting time zone is finished.

Further, the movable communication system of the present invention is further provided with an operation center which includes call-incoming accepting means for accepting a call-incoming to a personal station, calling means for calling to the personal station in accordance with an instruction input from the external, and connecting means for connecting, in accordance with an instruction input from the external, a call originator (caller) of the call-incoming accepted by the call-incoming accepting means and the personal station serving as a call target to which the calling means originates a call, and if the call originator is the operation center when there is call-incoming to the personal station, the service supply means calls to the personal station regardless of the service information corresponding to the personal station locating area, thereby connecting the personal station and the operation center to each other. With this construction, the third object can be attained.

Further, for example, the service information stored in the service information storage means may be set to indicate that the calling from the personal stations located in the corresponding area is prohibited.

In this case, in a case where there is a call from the personal station, the service supply means prohibits the connection between the personal station and a called side to which the personal station calls, and the service content notifying means transmits to the personal station a message indicating that the personal station locating area is a calling prohibited area.

Still further, for example, the service information stored in the service information storage means may be set to represent a calling prohibiting time zone in which the calling from the personal stations located in the corresponding area is prohibited.

In this case, in a case where there is a call from the personal station, if the time is in the calling prohibiting time zone represented by the service information corresponding to the personal station locating area, the service supply means prohibits the connection between the personal station and a called side to which the personal station calls. Further, the service content notifying means transmits to the personal station a message indicating that the personal station locating area is now in the calling prohibiting time zone, and also a message representing the time when the calling prohibiting time zone is finished.

In order to attain the second object, according to the present invention, at least one of each of the base stations and the exchanger is further provided with subscriber information storage means for storing subscriber information representing one or more areas in which the services supplied to each of the personal stations are not effected by the service information as described above even when the service information stored in the service information storage means is any service information as described above.

When there is call-incoming to the personal station, the service supply means calls to the personal station regardless of the service information corresponding to the personal station locating area if the personal station locating area is contained in the subscriber information corresponding to the personal station, and connects the personal station with a caller which calls to the personal station. Further, in a case where there is a call from the personal station, if the personal station locating area is contained in the subscriber information corresponding to the personal station, the service supply means connects the personal station with a called side to which the personal station calls, regardless of the service information corresponding to the personal station locating area.

Further, in order to attain the fourth object of the present invention, the personal station is provided with display means for displaying a message of service information representing services other than a calling service and a call-incoming service of the movable communication system when a message display instruction signal for the service information is contained in a setup signal transmitted from the base station, the service information being transmitted from a movable communication network containing the base stations or the exchanger, and the display of the message being made in accordance with the content of the message display instruction.

By the display means, the call-incoming can be notified, and the content of the services other than the calling service and call-incoming service can be known.

BRIEF DESCRIPTION OF THE DRAWINGS

FIG. 10 is a diagram showing a movable communication system according to a fourth embodiment of the present invention;

FIG. 11 is a sequence diagram showing the operation of the fourth embodiment;

FIG. 28 is a diagram showing the construction of a movable communication system according to a thirteenth embodiment according to the present invention;

DETAILED DESCRIPTION OF PREFERRED EMBODIMENTS

Preferred embodiments according to the present invention will be described hereunder with reference to the accompanying drawings.

First, a first embodiment according to the present invention will be described.

Figure 1:
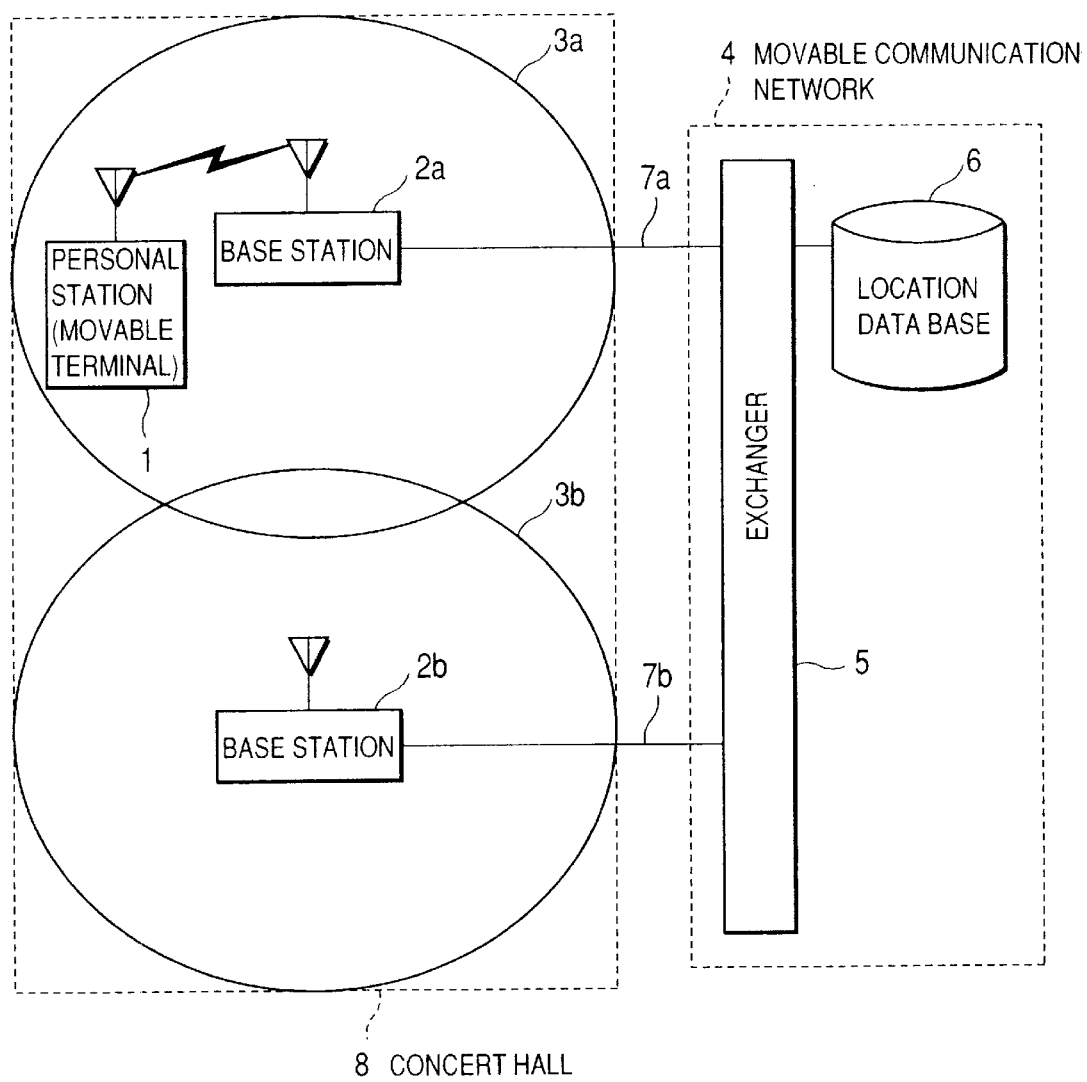
FIG. 1 is a diagram showing the construction of a movable communication system of a first embodiment of the presents invention.

FIG. 1 is a diagram showing the construction of a movable communication system according to the first embodiment of the present invention.

In FIG. 1, reference numeral 1 represents a movable terminal (personal station), reference numerals 2a, 2b represent base stations (radio wave control stations), reference numeral 3a, 3b represent areas which are covered by the base stations 2a and 2b respectively, reference numeral 4 represents a movable communication network, reference numeral 5 represents an exchanger, reference numeral 6 represents a location data base, and reference numerals 7a and 7b represent lines through which the base stations 2a and 2b are wire-connected to the exchanger 5 respectively.

In FIG. 1, the location data base 6 serves to manage location information indicating a personal station locating area (i.e., an area where a personal station is located) for each of all the personal stations (containing the personal station 1). Every time each personal station moves over areas, the exchanger 5 performs position registration processing in cooperation with the personal station through a base station covering an area to which the personal station has moved, whereby the location information corresponding to (allocated to) the personal station concerned is renewed. The content of the position registration processing is the same as the prior art, and the description thereof is omitted from the following description.

FIG. 1 shows a case where the personal station 1 is dependent on (i.e., covered by) the area 3a. Accordingly, the location information on the personal station 1 indicates the area 3a in the location data base 6.

In the movable communication system according to the first embodiment, each of all the base stations containing the base stations 2a and 2b is provided with the service information storage means, the service supply means and the service content notifying means.

The service information stored in the service information storage means is set to indicate prohibition of the call-incoming to personal stations in some predetermined areas of all the areas which are covered by all the base stations containing the base stations 2a and 2b, that is, to indicate a call-incoming prohibited area.

FIG. 1 shows a case where the areas 3a and 3b are in a concert hall 8. Accordingly, in the base stations 2a and 2b, the service information stored in the service information storage means (205 in FIG. 2) indicates that the areas 3a and 3b are call-incoming prohibited areas.

In the base stations 2a and 2b, the service supply means supplies a service of prohibiting the call-incoming to personal stations which are located in the areas 3a and 3b (call-incoming prohibited areas). That is, when a personal station located in the area 3a, 3b has a call (i.e., there is a call-incoming to the personal station), the service supply means prohibits a call-incoming to the personal station, and prohibits the connection between the personal station and a call originator (caller). At the same time, the service supply means transmits to the personal station a message indicating that there has been the call-incoming to the personal station).

Further, the service content notifying means transmits to the personal station a message indicating that the areas 3a and 3b are call-incoming prohibited areas.

When there is a call-incoming to a personal station in an area for which any service information indicating the call-incoming prohibited area is not stored in the service information storing means, each base station which covers such an area supplies a personal station with the same call-incoming service as the prior art, that is, the service of call-incoming the personal station and connecting the personal station and the caller.

Figure 2:
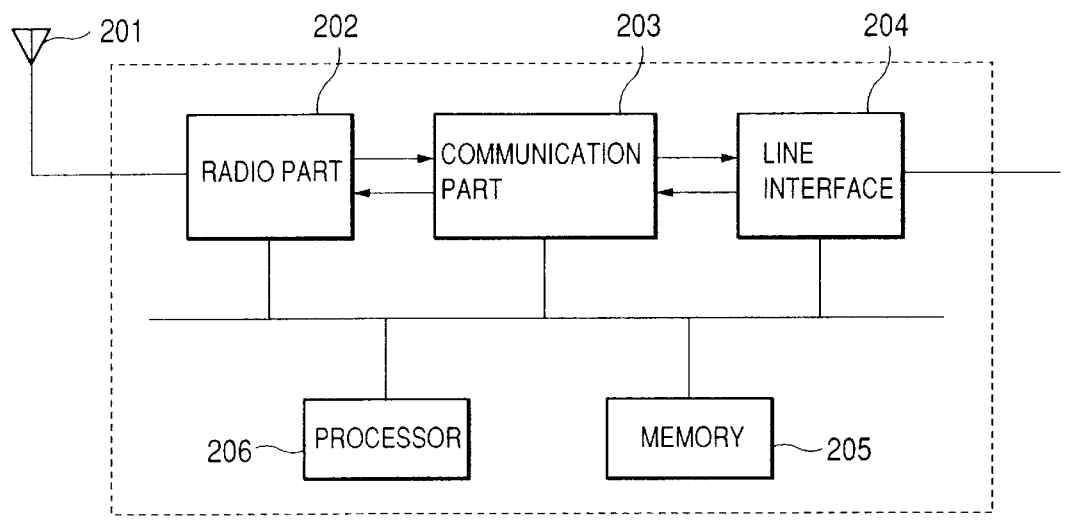
FIG. 2 is a block diagram showing the internal construction of a base station.

FIG. 2 is a diagram showing the internal construction of the base station 2a.

In FIG. 2, reference numeral 201 represents an antenna, reference numeral 202 represents a radio part, reference numeral 203 represents a communication part, reference numeral 204 represents a line interface, reference numeral 203 represents a memory, and reference numeral 206 represents a processor.

The processor 206 executes a program which is beforehand stored in the memory 205, whereby the operation of the base station 2a is performed. Particularly, in the first embodiment, the service information (message) indicating that the area 3a is a call-incoming prohibited area is stored in the memory 205.

The internal construction of the base station 2b is the same as shown in FIG. 2.

Figure 3:
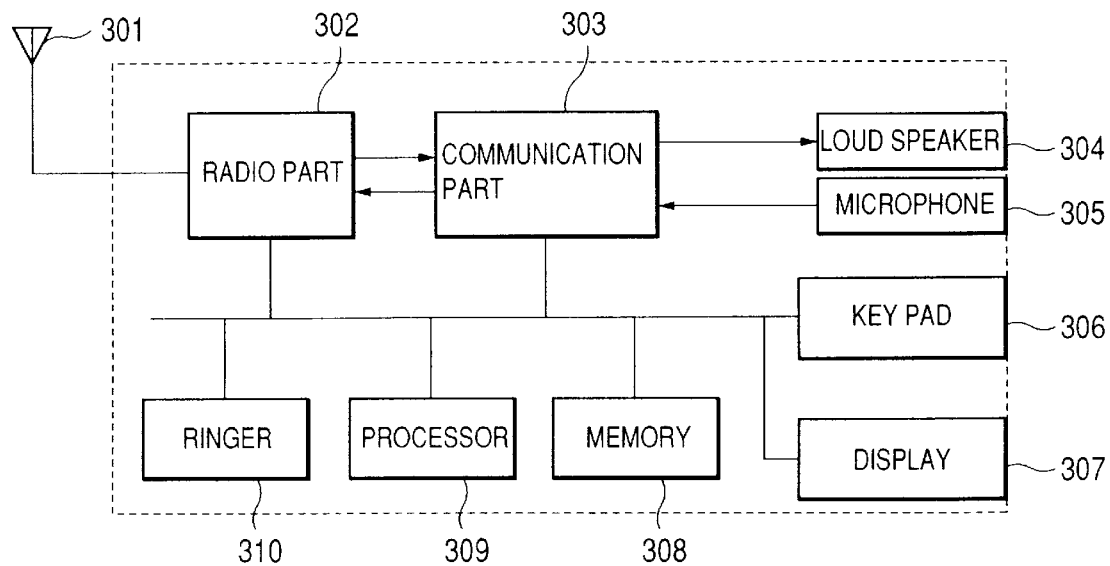
FIG. 3 is a block diagram showing the internal construction of a personal station.

FIG. 3 is a diagram showing the internal construction of the personal station 1.

In FIG. 3, reference numeral 301 represents an antenna, reference numeral 302 represents a radio part, reference numeral 303 represents a communication part, reference numeral 304 represents a loud speaker, reference numeral 305 represents a microphone, reference numeral 306 represents a key pad, reference numeral 307 represents a display, reference numeral 308 represents a memory, reference numeral 309 represents a processor, and reference numeral 310 represents a ringer.

The processor 309 executes a program stored in the memory 308 to perform the operation of the personal station 1.

Figure 4A:
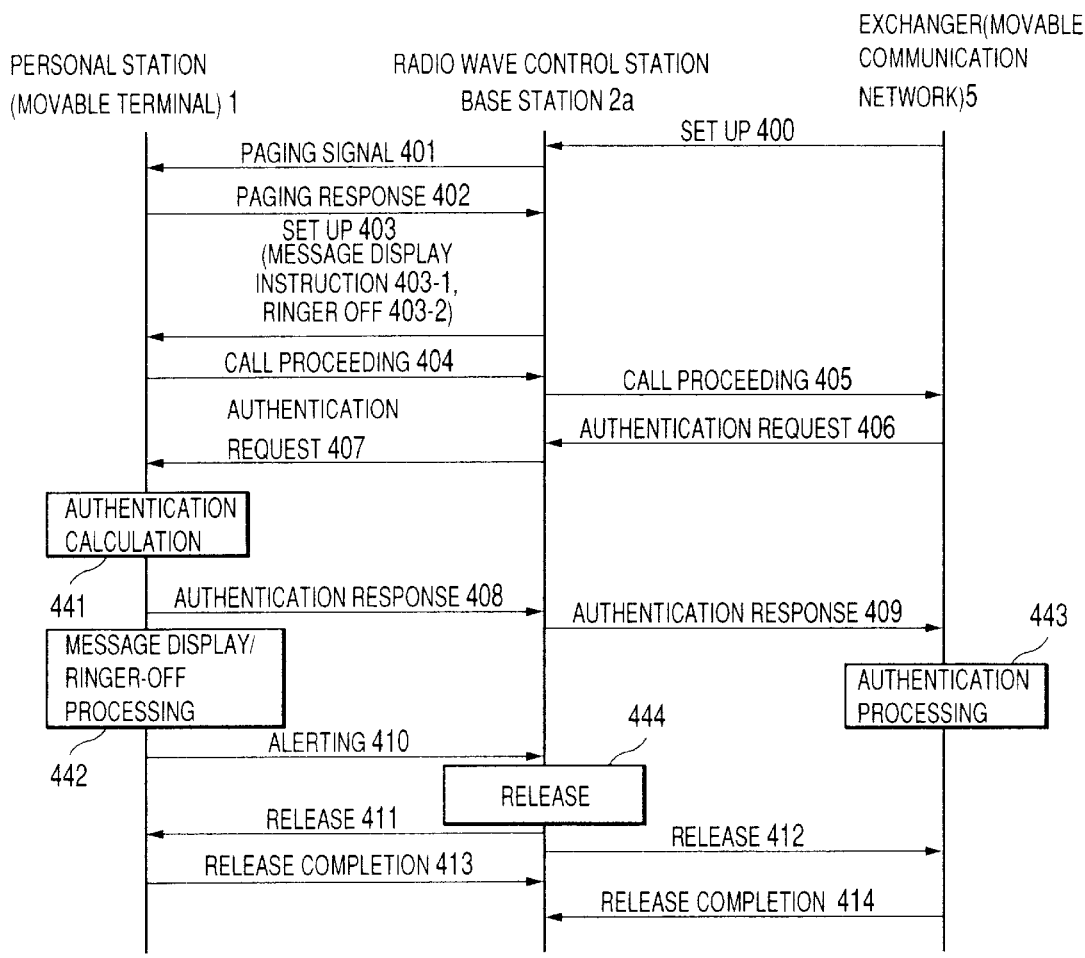
FIGS. 4A and 4B are sequence diagrams showing the operation of the first embodiment.

First, the operation of the personal station 1 when there is a call-incoming to the personal station 1, acompanying FIG. 4A.

When there is a call-incoming to the personal station 1 in the movable communication network system 4, the exchanger 5 reads out the location information on the personal station 1 from the location data base 6. In this case, since the personal station 1 is located in the area 3a, the location information on the personal station 1 indicates the area 3a in the location data base 6.

Accordingly, the exchanger 5 transmits a setup signal 400 to the base station 2a covering the area 3a as shown in FIG. 4.

In the base station 2a, upon receiving the setup signal 400 through the line interface 204 and the communication part 203, the processor 206 transmits a paging signal 401 via the radio part 202 and the antenna 201 to the personal station 1.

Upon receiving the paging signal 401 through the antenna 301 and the radio part 302, the processor 309 of the personal station 1 transmits a paging response signal 402 via the radio part 302 and the antenna 301 to the base station 2a.

In the normal call-incoming processing, that is, in the call-incoming processing when the area 3a where the personal station 1 having the call-incoming is located is not a call-incoming prohibited area, the processor 206 in the base station 2a transmits the setup signal 403 to the personal station 1 when receiving the paging response signal 402. However, in this case, the area 3a which is covered by the base station 2a is a call-incoming prohibited area, and the service information indicating this fact is stored in the memory 205, so that the processor 206 performs the call-incoming prohibiting processing as described below.

That is, upon receiving the paging response signal 402 through the antenna 201 and the radio part 202, the processor 206 transmits a call-incoming setup signal 403 to the personal station 1 via the radio part 202 and the antenna 201. In the call-incoming setup signal 403 are set a message display instruction 403-1 for instructing the personal station 1 to display a message indicating that there has been call-incoming and also that the area 3a where the personal station 1 is located is a call-incoming prohibited area, and a ringer-off instruction 403-2 for prohibiting the ringing of the ringer 310 of the personal station 1.

In the personal station 1, upon receiving the setup signal 403 (in this case, the message display instruction 403-1 and the ringer-off instruction 403-2 are set therein) through the antenna 301 and the radio part 302, the processor 309 transmits a call proceeding signal 404 to the base station 2a via the radio part 302 and the antenna 301. Thereafter, the processor 309 is on standby for the message display and the ringer-off processing, and waits for the end of authentication processing.

In the base station 2a, upon receiving the call proceeding signal 404 through the antenna 201 and the radio part 202, the processor 206 transmits the call proceeding signal 405 to the exchanger 5 through the communication part 203 and the circuit interface 204.

Upon receiving the call proceeding signal 405, the exchanger 5 transmits an authentication request signal 406 to the base station 2a.

In the base station 2a, upon receiving the authentication request signal 406 through the line interface 204 and the communication part 203, the processor 206 transmits an authentication request signal 407 via the radio part 202 and the antenna 201.

Upon receiving the authentication request signal 407 through the antenna 301 and the radio part 302, the processor 309 performs authentication calculation processing, and transmits the processing result as an authentication response signal 408 to the base station 2a via the radio part 302 and the antenna 301. The authentication calculation processing is used to transmit a predetermined signal to enable the exchanger 5 to judge appropriateness of the personal station 1. The processing content is the same as the prior art, and thus the description thereof is omitted.

In the base station 2a, upon receiving the authentication response signal 408 through the antenna 201 and the radio part 202, the processor 206 transmits an authentication response signal 409 to the exchanger 5 through the communication part 203 and the line interface 204.

Upon receiving the authentication response signal 409, the exchanger 5 performs the authentication processing to judge the appropriateness of the personal station 1. The processing content of the authentication calculation processing is the same as the prior art, and thus the description thereof is omitted.

Figure 5:
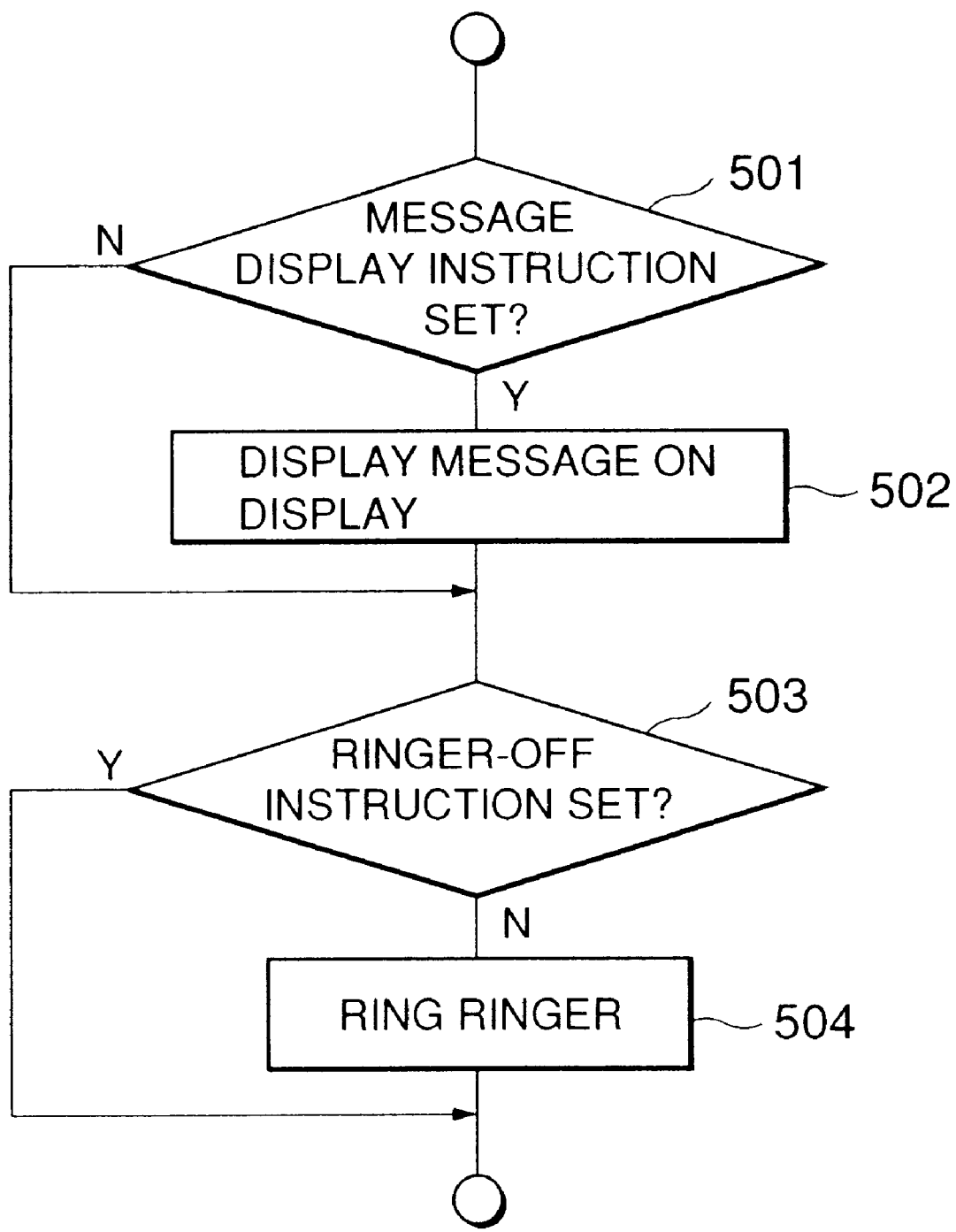
FIG. 5 is a flowchart showing a message display/ringer-off processing which are performed by the personal station in the first embodiment.

In the personal station 1, after transmitting the authentication response signal 408, the processor 309 performs message display/ringer-off processing shown in FIG. 5.

As shown in FIG. 5, in the message display/ringer-off processing, the processor 309 first judges whether a message display instruction is set in the setup signal 403 (step 501). If the message display instruction is judged to be set, the processor 309 displays a message corresponding to the content of the message display instruction on a display 307 (step 502).

In this case, since the message display instruction 403-1 is set in the setup signal 403, so that the processor 309 goes to step 502 to display on the display 307 a message indicating that there has been call-incoming and that the area 3a where the personal station 1 is located is a call-incoming prohibited area.

Subsequently, the processor 309 judges whether a ringer-off instruction is set in the setup signal 403 (step 503). If no ringer-off instruction is judged to be set, the processor 309 rings the ringer 310 (step 504).

In this case, since the ringer-off instruction 403-2 is set in the setup signal 403, the processor 309 does not execute the step 504 to prohibit the ringer 310 from ringing.

Accordingly, even when there is a call-incoming to a personal station 1 located in the area 3a (call-incoming prohibited area), the ringer 310 of the personal station does not ring, and a message indicating that there has been the call-incoming and that the area 3a where the personal station 1 is located is a call-incoming prohibited area are displayed on the display 307 of the personal station 1.

Returning to FIG. 4A, in the personal station 1, the processor 309 transmits a paging signal 410 to the base station 2a through the radio part 302 and the antenna 301 when the message display/ringer-off processing is finished.

In the call-incoming prohibiting processing of the first embodiment, in order to prohibit the connection between the personal station 1 and the call originator (caller), the processor 206 of the base station 2a transmits a release signal 411 to the personal station 1 through the antenna 201 and the radio part 202 when receiving the paging signal 410 through the antenna 201 and the radio part 202. At the same time, the processor 206 transmits a release signal 412 to the exchanger 5 through the communication part 203 and the line interface 204.

Thereafter, the processor 206 finishes the call-incoming prohibiting processing without connecting the personal station 1 and the caller when it receives through the antenna 201 and the radio part 202 a release completion signal 413 which is transmitted as a response to the release signal 411 from the personal station 1, and also receives through the line interface 204 and the communication part 203 a release completion signal 414 which is transmitted as a response to the release signal 412 from the exchanger 5.

As described above, according to the first embodiment, when there is a call-incoming to the personal station 1 which is located in the area 3a covered by the base station 2a, the base station 2a performs the call-incoming prohibiting processing as described above because the service information indicating that the area 3a is a call-incoming prohibited area is stored in the memory 205. Accordingly, in the personal station 1, the message indicating that there has been the call-incoming to the personal station 1 and the area 3a where the personal station 1 is located is call-incoming prohibited area, is displayed on the display 307 of the personal station 1 with no ringing tone, and the connection between the personal station 1 and the caller is prohibited.

Accordingly, the subscriber of the personal station 1 can know that he was called and also know the reason why the connection between the subscriber and the caller is prohibited, that is, that the area 3a where the personal station is located is a call-incoming prohibited area.

In the first embodiment as described above, each of all the base stations containing the base stations 2a and 2b is provided with the service information storage means, the service supply means and the service content notifying means as described above. However, these means may be provided to the movable communication network system 4. In the following description, a second embodiment in which these means are provided to the movable communication network system 4 will be described.

Figure 6:
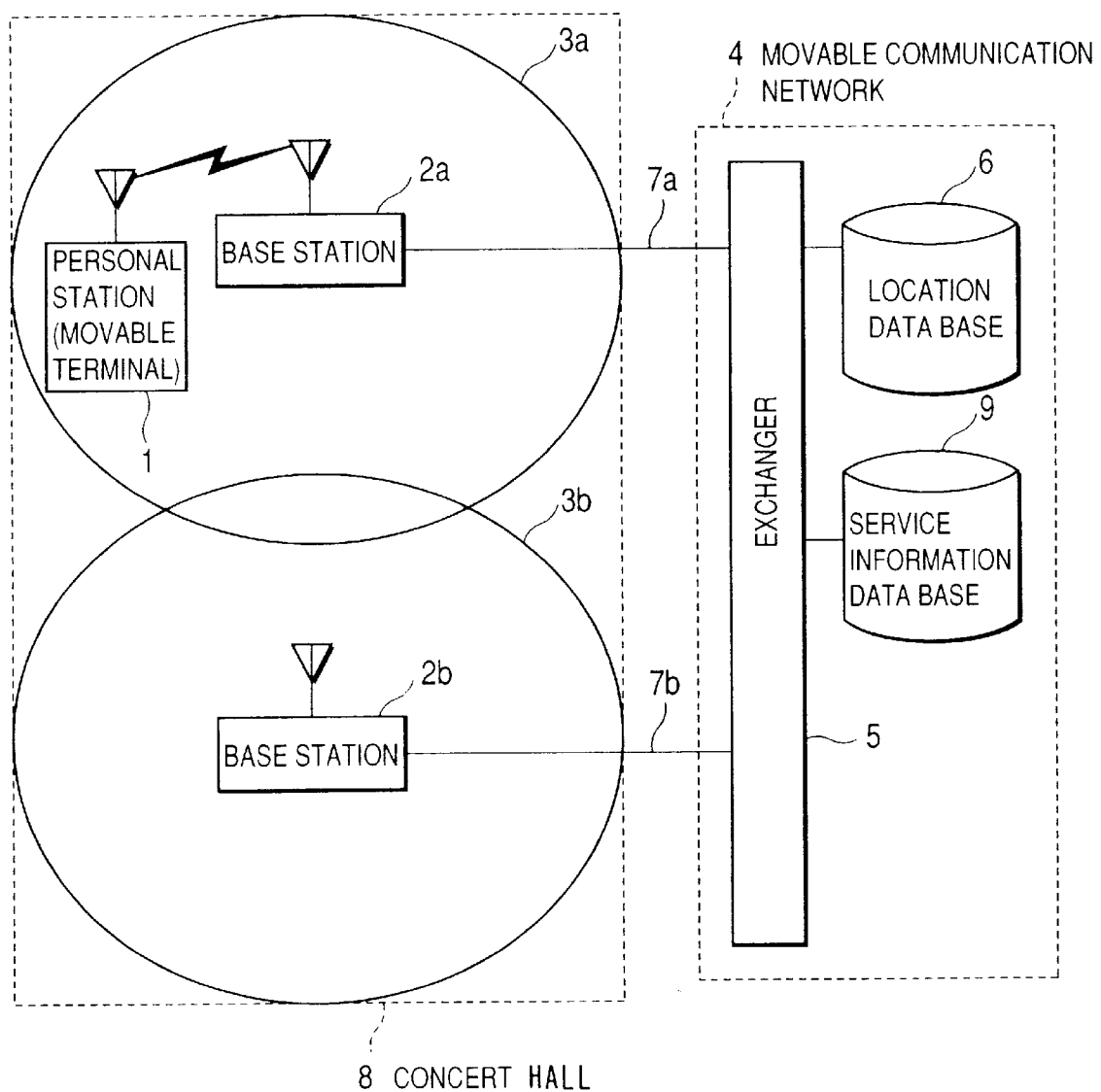
FIG. 6 is a diagram showing the construction of a movable communication system of a second embodiment.

FIG. 6 is a diagram showing the construction of the movable communication system according to the second embodiment of the present invention.

In FIG. 6, reference numeral 1 represents a personal station, reference numerals 2a and 2b represent base stations, reference numerals 3a and 3b represent areas which are covered by the base stations 2a and 2b respectively, reference numeral 4 represents a movable communication network, reference numeral 5 represents an exchanger, reference numeral 6 represents a location data base, reference numerals 7a and 7b represent lines through which the exchanger 5 is wire-connected to the base stations 2a and 2b respectively, and reference numeral 9 represents a service information data base.

In FIG. 6, the location data base 6 serves to manage the location information indicating each personal station locating area for each of all the personal stations containing the personal station 1.

FIG. 6 shows a case where the personal station 1 is located in the area 3a, and thus the location information on the personal station 1 indicates the area 3a in the location data base 6.

Further, in FIG. 6, the service information data base 9 corresponds to the service information storage means, and serves to manage the service information representing the special services other than the calling service and the call-incoming service, which are to be supplied to personal stations located in some predetermined areas of all the areas which are covered by all the base stations containing the base stations 2a and 2b.

The service information stored in the service information storage means is set to indicate the prohibition of the call-incoming to any personal station located in the predetermined areas of all the areas which are covered by all the base stations containing the base stations 2a and 2b, that is, that the area is a call-incoming prohibited area.

FIG. 6 shows a case where the areas 3a and 3b are a concert hall 8, and thus the service information on the areas 3a and 3b indicates the call-incoming prohibited area in the service information data base 9.

Therefore, in the movable communication network 4, when there is a call-incoming to a personal station located in the area 3a or 3b (call-incoming prohibited area), the service supply means supplies the service of prohibiting call-incoming to the personal station. That is, when there is a call-incoming to the personal station located in the area 3a or 3b, the service supply means prohibits the call-incoming to the personal station to prohibit the connection between the personal station and the caller, and also transmits to the personal station a message indicating that there has been the call-incoming.

Further, the service content notifying means transmits to the personal station a message that the area 3a (3b) is a call-incoming prohibited area.

In the movable communication network 4, when there is a call-incoming to a personal station located in an area for which the service information data base 9 does not manage the service information indicating the call-incoming prohibited area, the personal station is supplied with the same call-incoming service as the conventional movable communication system, that is, the service of calling the personal station and connecting the personal station and the caller.

The service supply means and the service content notifying means are actually achieved by the operation of the exchanger 5.

The internal construction of the base stations 2a and 2b is the same as that of FIG. 2, and the internal construction of the personal station 1 is the same as that of FIG. 3.

Next, the operation when there is a call-incoming to the personal station 1 will be described.

In the movable communication network 4, when there is a call-incoming to the personal station 1, the exchanger 5 reads out the location information on the personal station 1 from the location data base 6. In this case, since the personal station 1 is located in the area 3a, the location information on the personal station 1 indicates the area 3a in the location data base 6.

Subsequently, the exchanger 5 inquires of the data base about the special services, and reads out from the service information data base 9 the special service information corresponding to the area 3a where the personal station is located. In this case, since the area 3a where the personal station 1 is a call-incoming prohibited area, in the service information data base 9, the service information on the area 3a indicates the call-incoming prohibited area.

Accordingly, the exchanger 5 performs the call-incoming prohibiting processing as described below.

Figure 7:
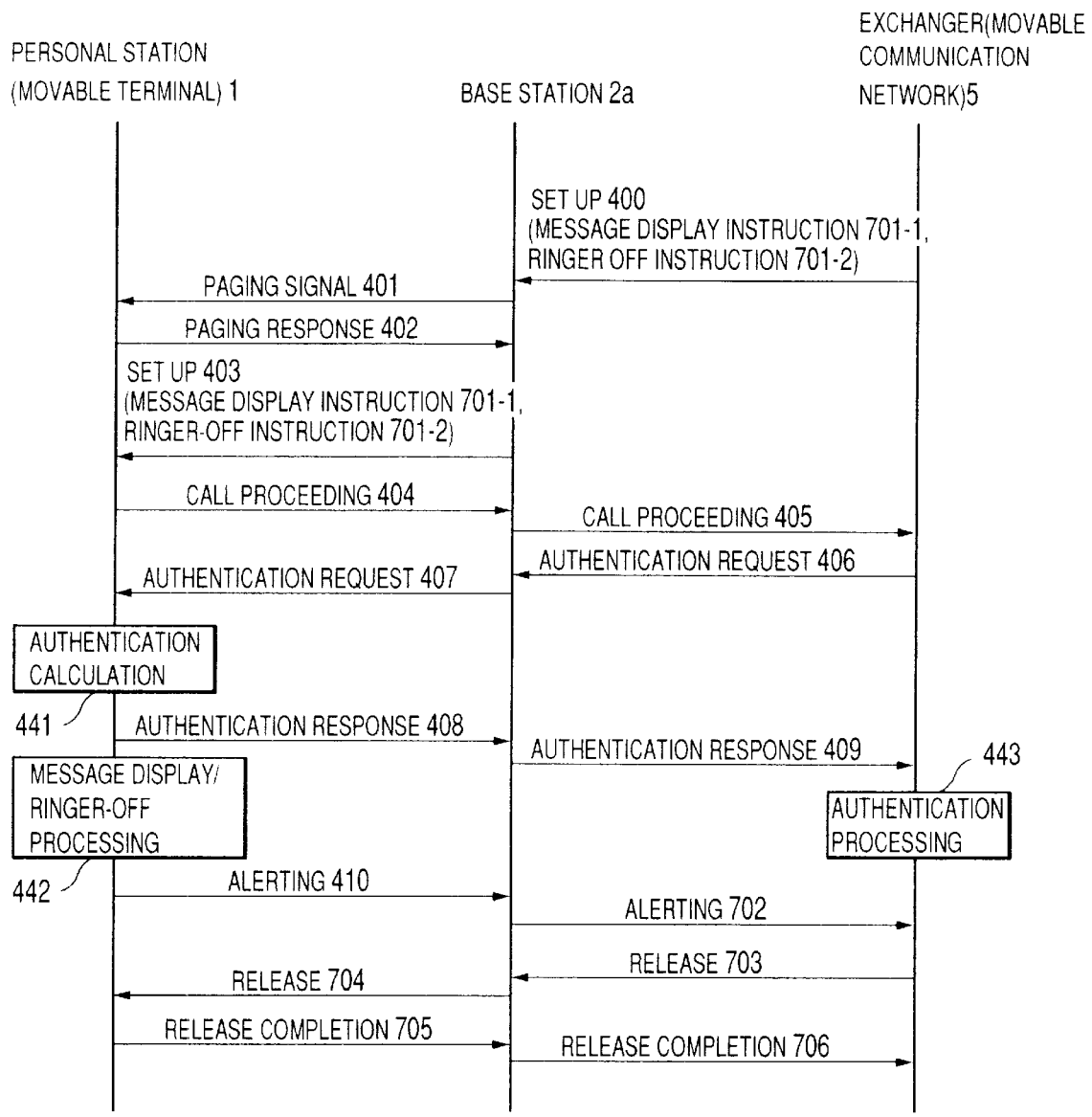
FIG. 7 is a sequence diagram showing the operation of the second embodiment.

In the call-incoming prohibiting processing of the second embodiment, as shown in FIG. 7, the exchanger 5 transmits a setup signal 400 to the base station 2a covering the area 3a. In the setup signal 400 are set a message display instruction 701-1 to display on the personal station 1 a message indicating that there has been call-incoming and that the area 3a where the personal station 1 is located is a call-incoming prohibited area, and a ringer-off instruction 701-2 to prohibiting the ringer 310 of the personal station 1 from ringing.

In the base station 2a, upon receiving the setup signal 400 (in this case, the message display instruction 701-1 and the ringer-of instruction 701-2 are set therein) through the line interface 204 and the communication part 203, the processor 206 transmits a paging signal 401 to the personal station 1 via the radio part 202 and the antenna 201.

In the personal station 1, upon receiving the paging signal 401 through the antenna 301 and the radio part 302, the processor 309 transmits a paging response signal 402 to the base station 2a via the radio part 302 and the antenna 301.

In the base station 2a, upon receiving the paging response signal 402 through the antenna 201 and the radio part 202, the processor 206 transmits a setup signal 403 via the radio part 202 and the antenna 201 to the personal station 1.

The processor 206 is set to transmit the setup signal 403 having the same content as the received setup signal 400, and thus the message display instruction 701-1 and the ringer-off instruction 701-2 are also set in the setup signal 403.

In the personal station 1, upon receiving the setup signal 403 (in this case, the message display instruction 701-1 and the ringer-off instruction 701-2 are set therein), the processor 309 transmits a call proceeding signal 404 to the base station 2a via the radio part 302 and the antenna 301.

In the base station 2a, upon receiving the call proceeding signal 404 through the antenna 201 and the radio part 202, the processor 206 transmits a call proceeding signal 405 to the exchanger 5 through the communication part 203 and the line interface 204.

Upon receiving the call proceeding signal 405, the exchanger 5 transmits an authentication request signal 406 to the base station 2a.

In the base station 2a, upon receiving the authentication request signal 406 through the line interface 204 and the communication part 203, the processor 206 transmits an authentication request signal 407 via the radio part 202 and the antenna 201.

In the personal station 1, upon receiving the authentication request signal 407 through the antenna 301 and the radio part 302, the processor 309 performs the authentication calculation processing and transmits the processing result as an authentication response signal 408 to the base station 2a via the radio part 302 and the antenna 301.

In the base station 2a, upon receiving the authentication response signal 408 through the antenna 201 and the radio part 202, the processor 206 transmits an authentication response signal 409 through the communication part 203 and the line interface 204 to the exchanger 5.

Upon receiving the authentication response signal 409, the exchanger 5 performs authentication processing of judging appropriateness of the personal station 1.

In the personal station 1, the processor 309 performs the message display/ringer-off processing shown in FIG. 5 after transmitting the authentication response signal 408.

As shown in FIG. 5, in the message/ringer-off processing, the processor 309 first judges whether the message display instruction is set in the setup signal 403 (step 501). If the message display instruction is judged to be set, the processor 309 transmits the message corresponding to the content of the message display instruction on the display 307 (step 502).

In this case, since the message display instruction 701-1 is set in the setup signal 403, the processor 309 goes to the step 502 to display on the display 307 a message indicating that there has been call-incoming to the personal station and also that the area 3a where the personal station 1 is located is a call-incoming prohibited area.

Subsequently, the processor 309 judges whether the ringer-off instruction is set in the setup signal 403 (step 503). If the ringer-off instruction is judged not to be set, the processor 309 controls the ringer 309 to ring (step 504).

In this case, since the ringer-off instruction 702-2 is set in the setup signal 403, the processor 309 does not execute the step 504 to prohibit the ringing of the ringer 310.

Accordingly, when the call-incoming is made to the personal station 1 located in the area 3a (call-incoming prohibited area), the ringer 310 does not ring, and the message indicating that there has been call-incoming and the area 3a where the personal station 1 is a call-incoming prohibited area is displayed on the display 307.

Subsequently, in the personal station 1, the processor 309 transmits a calling signal 410 to the base station 2a via the radio part 302 and the antenna 301 after the message display/ringer-off processing is finished.

In the base station 2a, upon receiving the paging signal 410 through the antenna 201 and the radio part 202, the processor 206 transmits a paging signal 702 through the communication part 203 and the line interface 204 to the exchanger 5.

In the call-incoming (call reception) prohibiting processing of the second embodiment, in order to prohibit the connection between the personal station 1 and the caller, the exchanger 5 transmits a release signal 703 to the base station 2a upon receiving the paging signal 702.

In the base station 2a, upon receiving the release signal 703 through the line interface line 204 and the communication part 203, the processor 206 transmits a release signal 704 to the personal station 1 via the radio part 202 and the antenna 201. Thereafter, upon receiving a release completion signal 705 which is transmitted as an response to the release signal 704 from the personal station 1 through the antenna 201 and the radio part 202, the processor 206 transmits a release completion signal 706 to the exchanger 5 through the communication part 203 and the line interface 204.

Upon receiving the release completion signal 706, the exchanger 5 finishes the call-incoming prohibiting processing without connecting the personal station 1 and the caller.

As described above, according to the second embodiment, when there is the call-incoming to the personal station 1 located in the area 3a, the exchanger 5 performs the call-incoming prohibiting processing as described above because the service information on the area 3a which is managed by the service information data base 9 indicates the call-incoming prohibited area. Accordingly, in the personal station 1, the paging tone is not made, and the message indicating that there has been the call-incoming to the personal station and the area where the personal station 1 is located is a call-incoming prohibited area is merely displayed on the display 307, and the connection between the personal station 1 and the caller is prohibited.

Accordingly, the subscriber of the personal station can know that he was called (paged), and the reason why the connection between him and the caller is prohibited, that is, that the area 3a where the personal station 1 is locates is a call-incoming prohibited area.

In the above-described first and second embodiments, the service information stored in the service information storage means indicates that the predetermined areas of all the areas covered by all the base stations are the call-incoming prohibited areas. However, the service information may indicate the content of the processing which is actually performed.

That is, it may indicate that "when there is a call-incoming to a personal station, the calling to the personal station is prohibited to prohibit the connection between the personal station and the caller, and the message indicating that there has been the call-incoming to the personal station and also that the area where the personal station is locates is a call-incoming prohibited area is transmitted to the personal station".

Further, in the above-described first and second embodiments, the caller to the personal station may be a telephone which is installed in a public network, or another personal station.

In the first and second embodiments, the area 3a, 3b corresponding to a concert hall 8 is assumed as a call-incoming prohibited area. However, it is actually unnecessary to prohibit the call-incoming (call reception) to a personal station located in the area 3a or 3b if no play is put on the stage.

As described above, if there is considered a place having a time zone in which the call-incoming to the personal station is prohibited and a time zone in which the call-incoming to the personal station is allowed, the service information corresponding to each area may be set to indicate a call-incoming prohibiting time zone which is a time zone for prohibiting the call-incoming to the personal station located in the area. For example, if the call-incoming prohibiting time zone indicated by the service information on the area 3a, 3b is set to a time zone for which the call-incoming to the personal station is prohibited, the call-incoming to the personal station located in the area 3a, 3b can be prohibited only when a play is being put on the stage.

Next, a third embodiment of the movable communication system in which the service information indicates the call-incoming prohibiting time zone will be described.

Figure 8:
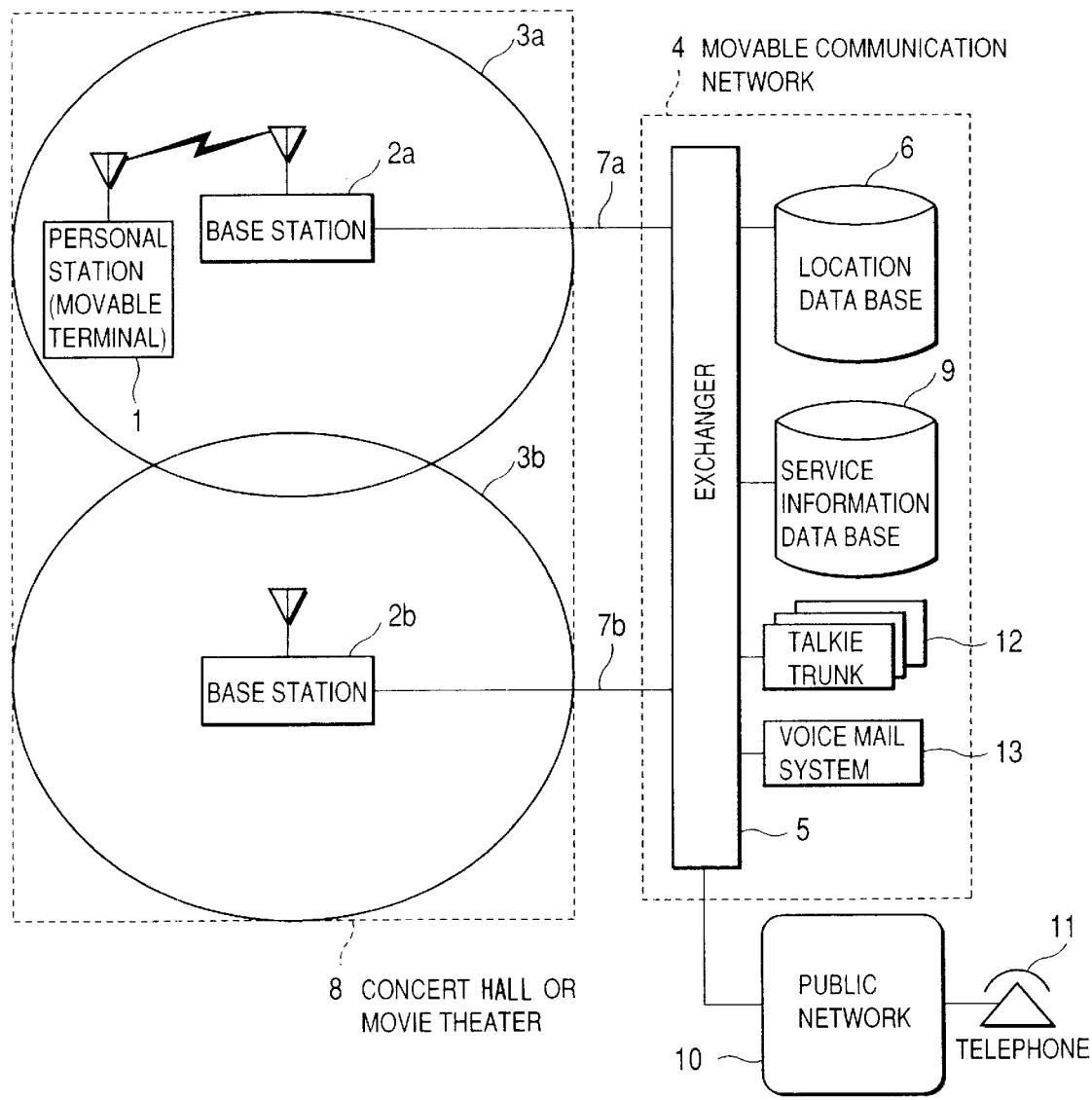
FIG. 8 is a diagram showing the construction of a movable communication system according to a third embodiment.

FIG. 8 is a diagram showing the construction of the movable communication system according to the third embodiment of the present invention.

In FIG. 8, reference numeral 1 represents a personal station, reference numerals 2a and 2b represent base stations, reference numerals 3a and 3b represent areas covered by the base stations 2a and 2b respectively, reference numeral 4 represents a movable communication network, reference numeral 5 represents an exchanger, reference numeral 6 represents a location data base, reference numerals 7a and 7b represent lines through which the exchanger 5 and the base stations 2a and 2b are wire-connected to each other, reference numeral 9 represents a service information data base, reference numeral 10 represents a public network, reference numeral 11 represents a telephone accommodated in the public network 10, reference numeral 12 represents a talkie trunk, and reference numeral 13 represents a voice mail system.

In FIG. 8, the location data base 6 serves to manage location information indicating each personal station locating area for each of all the personal stations containing the personal station 1.

FIG. 8 shows a case where the personal station 1 is located in the area 3a, and thus the location information on the personal station 1 indicates the area 3a in the location data base 6.

In the movable communication system of the third embodiment of the present invention, the movable communication network 4 is provided with the service information storage means, the service supply means and the service content notifying means as described above.

Further, in FIG. 8, the service information data base 9 corresponds to the service information storage means, and serves to manage the service information representing the services other than the calling service and the call-incoming service to be supplied to personal stations located in predetermined areas of all the areas which are covered by all the base stations containing the base stations 2a and 2b.

The service information stored in the service information storage means is set to indicate the call-incoming prohibiting time zone in which the call-incoming to personal stations located in predetermined areas of all the areas covered by all the base stations containing the base stations 2a and 2b is prohibited.

FIG. 8 shows a case where the area 3a, 3b corresponds to a concert hall 8. Therefore, the call-incoming prohibiting time zone indicated by the service information on the area 3a, 3b is set as a time zone in which a play is being put in the concert hall 8 (hereinafter referred to as "under-play time zone") in the service information data base 9.

Therefore, in the movable communication network 4, when there is a call-incoming to a personal station located in the area 3a or 3b, the service supply means supplies a service of prohibiting the call-incoming to the personal station if the time is in the call-incoming prohibiting time zone represented by the service information on the area 3a or 3b. That is, when there is a call-incoming to a personal station located in the area 3a or 3b, the service supply means prohibits the call-incoming to the personal station to prohibit the connection between the personal station and the caller if the time is within the under-play time zone in the concert hall 8, and at the same time the service supply means transmits to the personal station a message indicating that there has been the call-incoming to the personal station.

The service content notifying means transmits to the personal station a message indicating that the area 3a, 3b is in the call-incoming prohibiting time zone and also a message indicating the time when the call-incoming prohibiting time zone is finished (the play in the concert hall 8 is finished).

Even when there is a call-incoming to a personal station located in the area 3a or 3b, the service supply means does not supply the service of prohibiting the call-incoming to the personal station if the time is not within the call-incoming prohibiting time zone represented by the service information on the area 3a or 3b. Therefore, in the movable communication network 4, the personal station is supplied with the same call-incoming service as the conventional movable communication system, that is, the service of call-incoming the personal station and connecting the personal station and the caller.

Further, in the movable communication network 4, when there is a call-incoming to a personal station located in an area of which the service information data base 9 does not manage the service information representing the call-incoming prohibiting time zone, the personal station is supplied with the same call-incoming service as the conventional movable communication system, that is, the service of call-incoming the personal station and connecting the personal station and the caller.

The service supply means and the service content notifying means are actually achieved by the operation of the exchanger 5.

The internal construction of the base stations 2a and 2b are the same as that of FIG. 2, and the internal construction of the personal station 1 is the same as that of FIG. 3.

The following description is made on the operation when there is the call-incoming to the personal station 1 during the play in the concert hall 8.

In the following description, it is assumed that the caller to the personal station 1 is the telephone 11 installed in the public network 10 (hereinafter referred to as "caller 11"), however, it may be another personal station.

In the movable communication network 4, when there is a call-incoming to the personal station 1 from the caller 11, the exchanger 5 reads out the location information on the personal station 1 from the location data base 6. In this case, since the personal station 1 is located in the area 3a, the location information on the personal station 1 indicates the area 3a in the location data base 6.

Subsequently, the exchanger 5 reads out from the service information data base 9 the service information corresponding to the area 3a where the personal station 1 is located. In this case, since the area where the personal station 1 is located corresponds to the concert hall 8, the call-incoming prohibiting time zone indicated by the service information on the area 3a is set to an under-play time zone.

In the third embodiment, the service content to be supplied to the personal station 1 is varied in accordance with whether the call-incoming time from the caller 11 to the personal station 1 is a call-incoming prohibiting time zone or not. Therefore, the exchanger 5 performs the service content judgment processing shown in FIG. 9A.

Figure 9A:
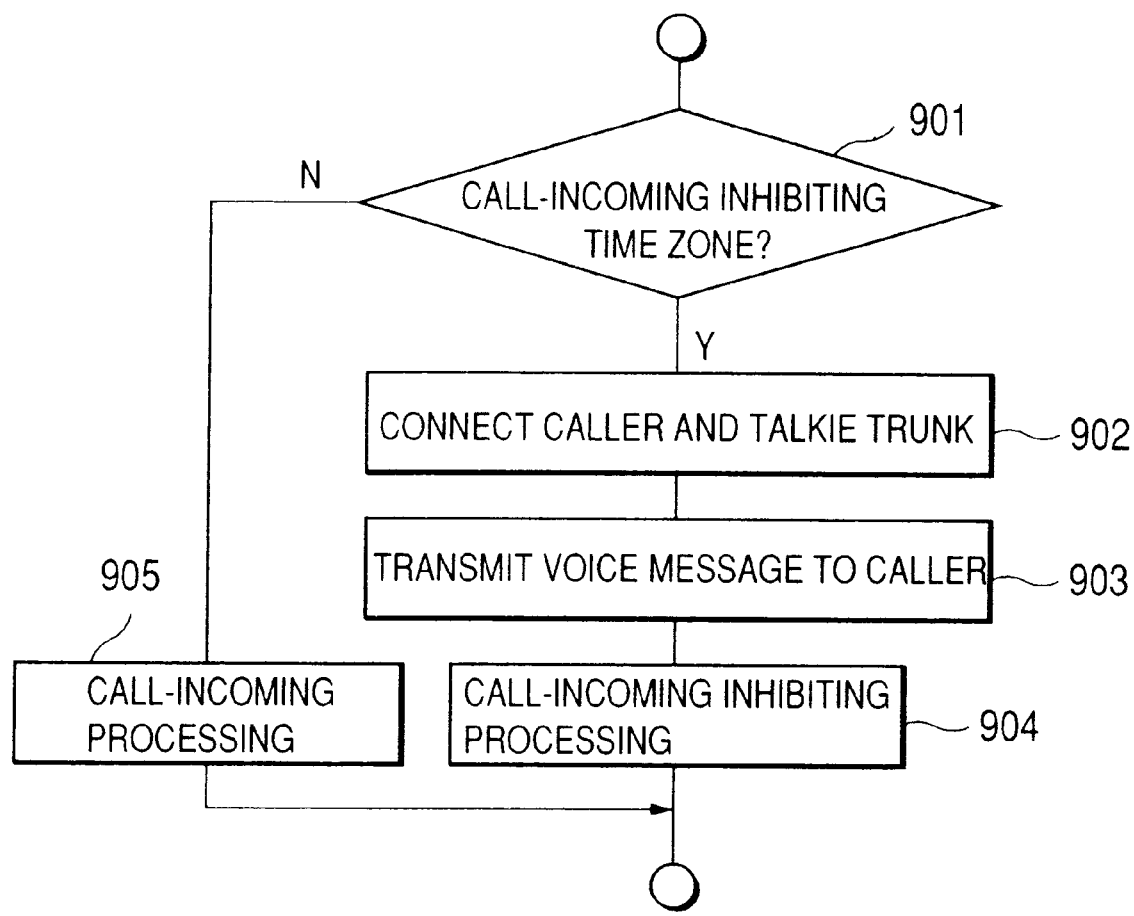
FIGS. 9A and 9B are flowcharts showing service content judgment processing which is performed by an exchanger in the third embodiment.

As shown in FIG. 9A, the exchanger 5 judges whether the call-incoming time from the caller 11 to the personal station 1 is the call-incoming prohibiting time zone (step 901). If it is judged to be the call-incoming prohibiting time zone, it means that the concert hall 8 is under a play, and thus the following call-incoming prohibiting processing as described below is performed (step 903).

However, according to the third embodiment, by transmitting a call proceeding signal, a calling signal and a connection signal to the caller 11 before the call-incoming prohibiting processing is performed, the caller 11 and the talkie trunk 12 is connected to each other (step 902). Upon receiving a connection response signal transmitted from the caller 11, the caller 11 is supplied with a voice message indicating that the area 3a where the personal station 1 is located is under the call-incoming prohibiting time zone, and also indicating the time when the call-incoming prohibiting time zone is finished (the play in the concert hall 8 is finished) (step 903). In this case, there are provided talkie trunks 12 whose number is equal to that of plural kinds of voice messages which are prepared in advance. In step 902, the exchanger 5 connects the caller 11 and the talkie trunk 12 corresponding to a voice message to be transmitted.

For example, when the play in the concert hall is finished at half past thirteen o'clock, a voice message to be supplied from the talkie trunk 12 to the caller 11 may be set to "call-incoming to a person to which you call is just now prohibited, and please recall after half past thirteen o'clock".

With this setting, the subscriber of the caller 11 which calls the personal station 1 can know the time from which the call-incoming to the personal station 1 is permitted.

In the case where the call-incoming time at which the personal station 1 has a call-incoming thereto from the caller 11 is out of the call-incoming prohibiting time zone, it means that the play is not put in the concert hall 8, and thus the normal call-incoming processing is performed (step 905).

The call-incoming prohibiting processing performed at step 904 is the same as that described with reference to FIG. 7. However, there is a difference in the content set in the setup signal 400 which is to be transmitted from the exchanger 5 to the base station 2a. That is, the exchanger 5 transmits to the base station 2a covering the area 3a a setup signal 400 which contains a message display instruction for instructing the personal station 1 to display a message indicating that there has been call-incoming and the area 3a where the personal station 1 is locates is a call-incoming prohibiting time zone, and also a message indicating the time when the call-incoming time zone is finished, and a ringer-off instruction for prohibiting the ringer 310 of the personal station 1 from ringing.

Accordingly, according to the third embodiment of the present invention, in the personal station 1 located in the area 3a, when there is a call-incoming to the personal station 1 under the play in the concert hall 8, the paging tone is not made, but a message indicating that there has been the call-incoming and the area 3a where the personal station 1 is located is in the call-incoming prohibiting time zone, and also a message indicating the time when the call-incoming time zone is finished, is merely displayed on the personal station with the connection between the personal station 1 and the caller 11 being prohibited.

Therefore, the subscriber of the personal station 1 can know that there has been the call-incoming thereto, and also the reason why the connection with the caller 11 is prohibited, that is, that the personal station 1 is located in the area 3a under the call-incoming prohibiting time zone. Further, the subscriber of the personal station 1 can also know the time when the call-incoming prohibiting time zone is finished, that is, the time when the call-incoming to the personal station 1 is permitted.

In the third embodiment of the present invention, the service information stored in the service information storage means is set to indicate the call-incoming prohibiting time zone which is a time zone for prohibiting the call-incoming to personal stations located in predetermined areas of all the areas which are covered by all the base stations. However, the service information may be set to indicate the actual processing content.

That is, the service information may be set to indicate the following processing content: "in such a case where there is a call-incoming to the personal station, if the call-incoming time is in the call-incoming prohibiting time zone, the paging to the personal station is prohibited and the connection between the personal station and the caller is prohibited while the personal station is supplied with the message indicating that there has been the call-incoming to the personal station, and the area where the personal station is located is in the call-incoming prohibiting time zone, and also the message indicating the time when the call-incoming time zone is finished".

Further, in the third embodiment, the exchanger 5 connects the caller 11 and the talkie trunk 12 to each other. However, if the caller 11 and the voice mail system 13 are connected to each other, the subscriber of the caller 11 could record a voice message therefrom to the subscriber of the personal station 1, to which the caller is prohibited from connecting.

Further, in the second embodiment, the exchanger 5 may be designed to connect the talkie trunk 12 and the caller which calls the personal station 1, whereby the subscriber of the caller can know the reason why the connection to the personal station 1 is prohibited, that is, that the area 3a where the personal station 1 is located is in the call-incoming prohibited area. Further, if the exchanger 5 is designed to connect the caller and the voice mail system 13, the subscriber of the caller could record a voice message to the subscriber of the personal station 1 to which the caller is prohibited from connecting.

Figure 9B:
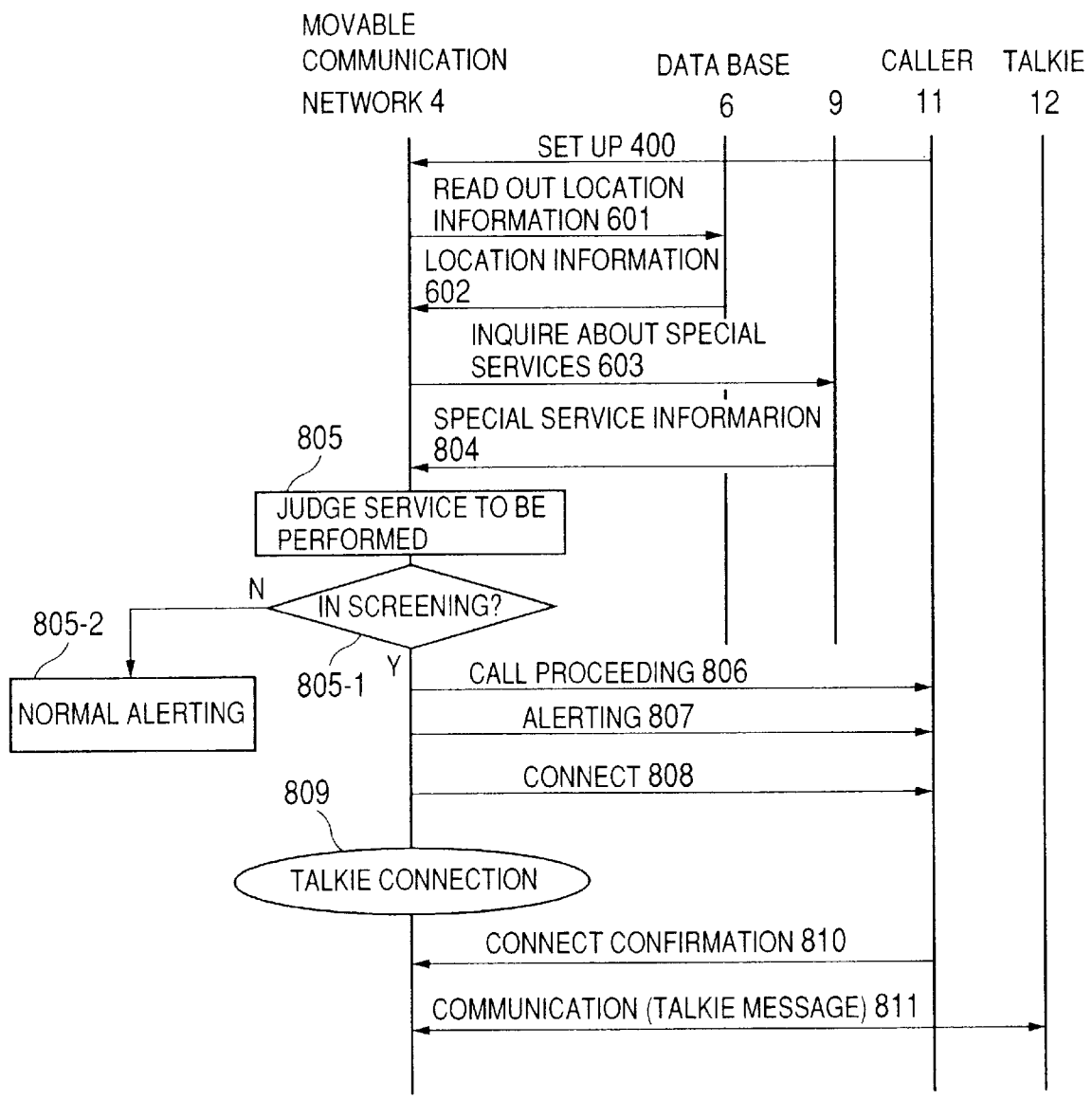

In FIGS. 8 and 9B, when a personal station 1 is located in a movie theater 8, the call-incoming to the personal station 1 is prohibited while a movie is put on the screen. For example, when there is a call-incoming (setup 400) from the telephone 11 at a caller side through the public network 10 to the personal station 1, the movable communication network 4 performs a location information read-out operation 601 on the data base 6 to read out the location information 602 on the personal station 1. It is described in the location information 602 that the personal station 1 is located in the movie theater 8, that is, in a service area of the base station 2a or 2b. The movable communication network 4 inquires about the special services to the data base 9 in which the service information on the location information is stored. The movable communication network 4 which reads out the special service information 804 from the data base 9 performs a performed service judgment 805. Since it is described in the special service information 804 that the service on the base stations 2a and 2b is both the prohibition of the call-incoming to the a personal station under the screening of a movie and the talkie connection, it is judged whether the call-incoming time is under the screening of a movie (805-1). If the call-incoming time is not under the movie-screening, the normal paging (805-2) is performed. If a movie is put on the screen, the movable communication network 4 performs no normal call-incoming to the personal station 1, and connects the call-incoming to the talkie 12. The movable communication network 4 transmits the call proceeding 806, the paging 807 and the connection 808 to the caller 11 to perform the talkie connection 809. After a connection confirmation 810 from the caller 11, the talkie 12 supplies the caller 11 with a voice message 811 indicating, for example, that "The paging is now restricted because a movie is put on the screen. The paging will be permitted after 13:30, and please call again after that".

Figure 4B:
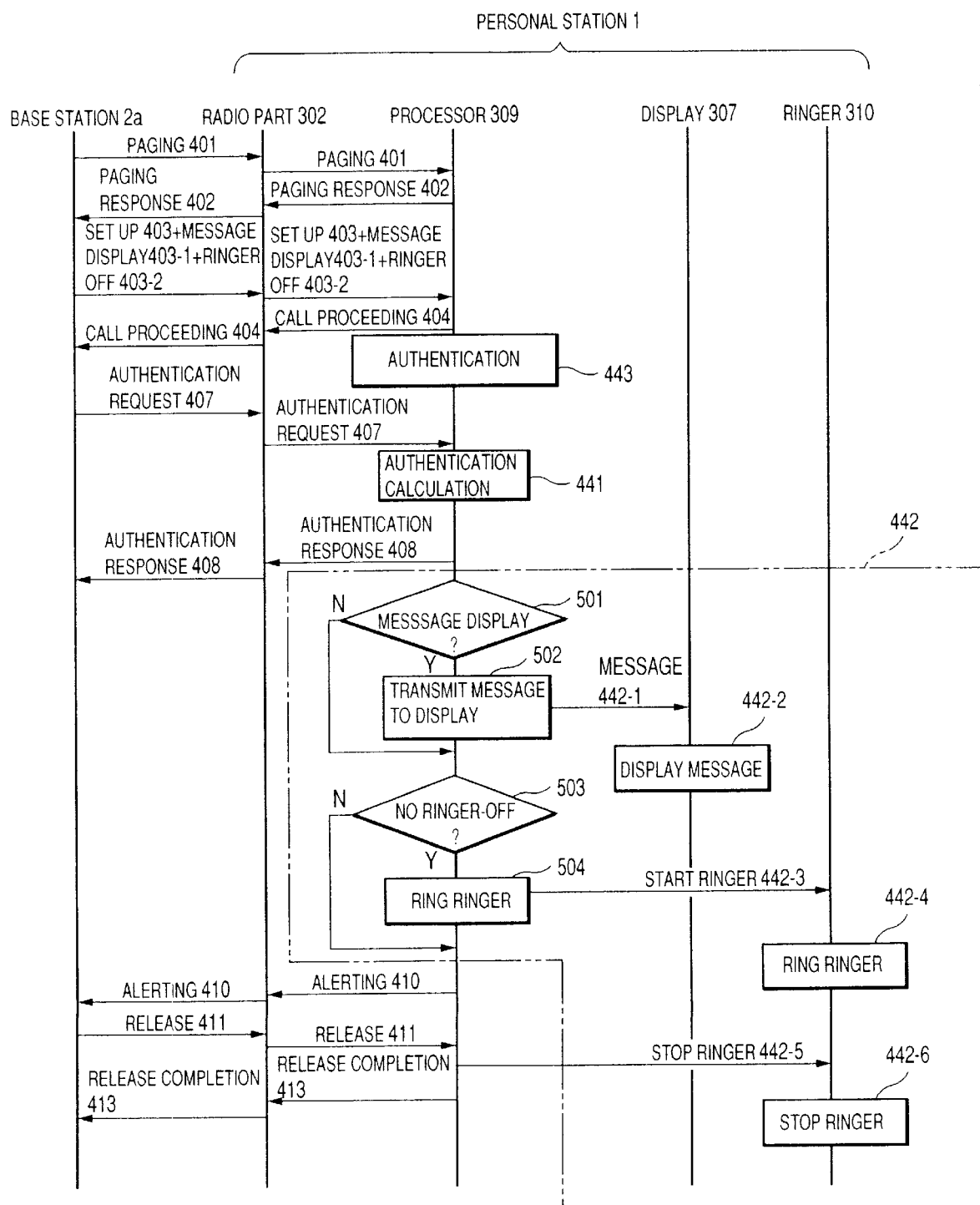

This service can inform the personal station 1 of the call-incoming thereto and prohibit the actual communication by using the sequence shown in FIGS. 4B and 7 and combining it with the display of the call-incoming message. Further, a voice mail may be used in place of the talkie trunk 12 to which the call-incoming concerned is connected.

In order to enhance the service to the subscriber of a caller to which the connection with a personal station 1 is prohibited because the personal station 1 is located in an area which is a call-incoming prohibited area or a call-incoming prohibiting time zone, a message to be transmitted from the subscriber of the caller may be directly displayed on the display 307 of the personal station 1 like a message display service which is now given in a radio pager service in place of the recording of a voice message from the subscriber of a caller to the subscriber of a personal station to which the caller calls.

Next, a fourth embodiment of the movable communication system in which a message transmitted from the subscriber of a caller is displayed on the display 307 of a personal station 1 will be described.

FIG. 10 is a diagram showing the construction of the movable communication system according to the fourth embodiment of the present invention.

In FIG. 10, reference numeral 1 represents a personal station, reference numerals 2a, 2b represents a base station, reference numeral 3a, 3b represents an area which is covered by the base station 2a, 2b, reference numeral 4 represents a movable communication network, reference numeral 5 represents an exchanger, reference numeral 6 represents a location data base, reference numeral 7a, 7b represents a line through which the exchanger 5 and the base station 2a, 2b are wire-connected to each other, reference numeral 9 represents a service information data base, reference numeral 10 represents a public network, reference numeral 11 represents a telephone accommodated in the public network 10, and reference numeral 14 represents a pager system.

In FIG. 10, the location data base 6 serves to manage the location information indicating an area where each of all the personal stations containing the personal station 1 is located.

FIG. 10 shows a case where the personal station 1 is located in the area 3a, and thus the location information on the personal station 1 indicated the area 3a.

In the movable communication system of the fourth embodiment, the movable communication network 4 is provide with the service information storage means, the service supply means and the service content notifying means as described above.

In FIG. 10, the service information data base 9 corresponds to the service information storage means, and serves to manage the service information representing special services other than the calling service and the call-incoming service to be supplied to predetermined areas of all the areas which are covered by all the base stations containing the base stations 2a and 2b.

The service information stored in the service information storage means is set to indicate that the call-incoming to personal stations located in the predetermined areas of the areas covered by all the base stations containing the base stations 2a and 2b is prohibited, that is, indicate the call-incoming prohibited area.

FIG. 10 shows such a situation that the areas 3a, 3b correspond to a concert hall 8, and thus the service information on the areas 3a, 3b indicate the call-incoming prohibited area in the service information data base 9.

Therefore, in the movable communication network 4, when there is a call-incoming to a personal station located in the area 3a or 3b (call-incoming prohibited area), the service supply means supplies a service of prohibiting the call-incoming to the personal station. That is, when there is a call-incoming to the personal station located in the areas 3a, 3b, the service supply means prohibits the connection between the personal station and the caller, and also transmits to the personal station a message which is transmitted by the subscriber of the caller.

Further, the service content notifying means transmits to the personal station a message indicating that the areas 3a, 3b are call-incoming prohibited areas.

However, in the fourth embodiment, in order for the subscriber of the personal station to know that a message (particularly, a message which is transmitted from the subscriber of the caller to the subscriber of the personal station) is transmitted to the personal station, the service supply means pages the personal station by making a paging tone.

In the movable communication net network 4, when there is a call-incoming to a personal station located in an area for which the service information data base 9 does not manage the service information indicating the call-incoming prohibited area, the same call-incoming service as the conventional movable communication system, that is, the service of paging the personal station and connecting the personal station and the caller.

The service supply means and the service content notifying means are actually performed by the operation of the exchanger 5.

The internal construction of the base station 2a, 2b is the same as shown in FIG. 2, and the internal construction of the personal station 1 is the same as shown in FIG. 3.

Next, the operation when the personal station 1 has a call-incoming thereto will be described.

In the movable communication network 4, when the personal station 1 has a call-incoming, the exchanger 5 reads out the location information corresponding to the personal station 1 from the location data base 6. In this case, since the personal station 1 is located in the area 3a, the location information on the personal station 1 indicates the area 3a in the location data base 8.

Subsequently, the exchanger 5 reads out from the service information data base 9 the service information corresponding to the area 3a where the personal station 1 is located. In this case, since the area 3a where the personal station 1 is located is a call-incoming prohibited area, the service information on the area 3a indicates the call-prohibited area in the service information data base 9.

Therefore, the exchanger 5 performs the following call-incoming prohibiting processing.

However, in the fourth embodiment, a message transmitted from the subscriber of the call originator to the personal station 1 is actually mediated through the pager system 14. More specifically, the pager system 14 receives the message transmitted from the subscriber of the call originator to the personal station 1, and then calls to the personal station 1 to transmit the received message to the personal station 1. Therefore, the call-incoming prohibiting processing which is performed by the exchanger unit 5 is divided into processing which is performed when the call originator to the personal station 1 is not the pager system 14, and processing which is performed when the call originator to the personal station 1 is the pager system 14.

That is, when the call originator to the personal station 1 is not the pager system 14, the exchanger 5 does not connect the personal station and the call originator to each other, but connects the call originator and the pager system 14 to each other.

In this case, the call originator to the personal station 1 is assumed to be the telephone 11 installed in the public network 10 (hereinafter referred to as "caller 11"). However, the call originator may be another personal station which is different from the personal station 1.

When the caller 11 and the pager system 14 are connected to each other, the pager system 14 transmits to the caller 11 a message "paging to a person to which you call is prohibited, and please input a message and push # at the end of the message", for example.

When the subscriber of the caller 11 inputs a message to the subscriber of the personal station 1 through a push button in the same manner as the input operation of the radio pager service which is practically used at present, the caller 11 transmits the input message to the pager system 14.

Upon transmission of the message from the caller 11, the pager system 14 calls to the personal station 1 to transmit the message to the personal station 1. At this time, the pager system 14 transmits to the exchanger 5 a setup signal containing a message display instruction to display the message transmitted from the caller 11 on the personal station 1.

Further, when the caller to the personal station 1 is the pager system 14, a setup signal 1101 (in this case, the message display instruction 1101-1 as described above is set therein) is transmitted from the payer system 14 to the exchanger 5 as shown in FIG. 11, and thus the exchanger 5 transmits to the base station 2a covering the area 3a the setup signal 400 which contains therein a message indicating that the area 3a where the personal station 1 is located is a call-incoming prohibited area, and a message display instruction 1102-1 for instructing the personal station 1 to display the message transmitted from the caller 11.

In the base station 2a, upon receiving the setup signal 400 (in this case, the message display instruction 1102-1 is set therein) through the line interface 204 and the communication part 203, the processor 206 transmits a paging signal 401 to the personal station 1 via the radio part 202 and the antenna 201.

In the personal station 1, upon receiving the paging signal 401 through the antenna 301 and the radio part 302, the processor 309 transmits the paging response signal 402 to the base station 2a via the radio part 302 and the antenna 301.

In the base station 2a, upon receiving the paging response signal 402 through the antenna 201 and the radio part 202, the processor 206 transmits a setup signal 403 to the personal station 1 via the radio part 202 and the antenna 201.

The processor 206 is set to transmit the setup signal 403 having the same content as the received setup signal 400, and thus the message display instruction 1102-1 is also set in the setup signal 403.

In the personal station 1, upon receiving the setup signal 403 (in this case, the message display instruction 1102-1 is set therein) through the antenna 301 and the radio part 302, the processor 309 transmits a call proceeding signal 404 to the base station 2a via the radio part 302 and the antenna 301.

In the base station 2a, upon receiving the call proceeding signal 404 through the antenna 201 and the radio part 202, the processor 206 transmits a call proceeding signal 405 to the exchanger 5 through the communication part 203 and the line interface 204.

Upon receiving the call proceeding signal 405, the exchanger 5 transmits an authentication request signal 406 to the base station 2a.

In the base station 2a, upon receiving the authentication request signal 406 through the line interface 204 and the communication part 203, the processor 206 transmits an authentication request signal 407 to the personal station 1 via the radio part 202 and the antenna 201.

In the personal station 1, upon receiving the authentication request signal 407 through the antenna 301 and the radio part 302, the processor 309 performs the authentication calculation, and transmits the processing result as an authentication response signal 408 to the base station 2a via the radio part 302 and the antenna 301.

In the base station 2a, upon receiving the authentication response signal 408 through the antenna 201 and the radio part 202, the processor 206 transmits an authentication response signal 409 to the exchanger 5 through the communication part 203 and the line interface 204.

Upon receiving the authentication response signal 409, the exchanger 5 performs the authentication processing for judging appropriateness of the personal station 1.

Further, in the personal station 1, after transmitting the authentication response signal 408, the processor 309 performs the message display/ringer-off processing as shown in FIG. 5.

In the message display/ringer-off processing, as shown in FIG. 5, the processor 309 first judges whether the message display instruction is set in the setup signal 403 (step 501). If the message display instruction is set, the message corresponding to the content of the message display instruction is displayed on the display 307 (step 502).

In this case, since the message display instruction 1102-1 is set in the setup signal 403, the processor 309 goes to step 502 to display on the display 307 a message indicating that the area 3a where the personal station 1 is located is a call-incoming prohibited area, and also a message which is transmitted from the caller 11 and mediated by the pager system 14.

Subsequently, the processor 309 judges whether the ringer-off instruction is set in the setup signal 403 (step 503). If the ringer-off instruction is not set, the processor 309 controls the ringer 310 to be rung (step 504).

In this case, since the ringer-off instruction is not set in the setup signal 403, the processor 309 goes to step 504 to ring the ringer 310.

Accordingly, in the personal station 1 located in the area 3a (call-incoming prohibited area), when the personal station 1 has a call-incoming thereto, the ringer 310 rings, and the message indicating that the area 3a where the personal station 1 is located is a call-incoming prohibited area, and also a message which is transmitted from the caller 11 and mediated by the pager system 14 are displayed on the display 307.

Returning to FIG. 11, in the personal station 1, after the message display/ringer-off processing is finished, the processor 309 transmits a paging signal 410 to the base station 2a via the radio part 302 and the antenna 301.

In the base station 2a, upon receiving the paging signal 410 through the antenna 201 and the radio part 202, the processor 206 transmits a paging signal 702 to the exchanger 5 through the communication part 203 and the line interface 204.

In the call-incoming prohibiting processing of the fourth embodiment, a release signal 703 is transmitted to the base station 2a to prohibit the connection between the personal station and the caller 11 when the paging signal 702 is received.

In the base station 2a, upon receiving the release signal 703 through the line interface 204 and the communication part 203, the processor 206 transmits a release signal 704 to the personal station 1 via the radio part 202 and the antenna 201. Upon receiving through the antenna 201 and the radio part 202 a release completion signal 705 which is transmitted as a response to the release signal 704 from the personal station 1, the processor 206 transmits a release completion signal 706 to the exchanger 5 through the communication part 203 and the line interface 204.

Upon receiving the release completion signal 706, the exchanger 5 finishes the call-incoming prohibiting processing.

In the personal station 1, upon receiving the release signal 704 through the antenna 301 and the radio part 302, the processor 309 stops the ringing of the ringer 310.

As described above, according to the fourth embodiment of the present invention, when there is a call-incoming from the caller to a personal station 1 located in the area 3a, the exchanger 5 performs the call-incoming prohibiting processing because the service information on the area 3a which is managed by the service information data base 9 indicates that the area is the call-incoming prohibited area. Accordingly, in the caller 11, it is connected to the pager system 14, and the subscriber of the caller 11 is allowed to input a message which is required to be transmitted from the subscriber of the caller 11 to the subscriber of the personal station 1. In the personal station 1, the paging tone is made, and the message indicating that the area 3a where the personal station 1 is located is the call-incoming prohibited area and also the message which is transmitted from the caller 11 and mediated by the pager system 14 are merely displayed on the display 307. The connection between the personal station 1 and the caller 11 is prohibited.

Accordingly, the subscriber of the personal station 1 can know the message transmitted from the caller 11, and also the reason why the connection with the caller 11 is prohibited, that is, that the area 3a where the personal station 1 is located is a call-incoming prohibited area.

In the fourth embodiment of the present invention, with respect to the predetermined areas of all the areas which are covered by all the base stations, the service information stored in the service information storage means is set to indicate that each of these predetermined areas is a call-incoming prohibited area. However, the service information may be set to indicate the actual processing content.

The service information may indicate the processing content of "when there is a call-incoming from a caller other than the pager system 14 to the personal station, the caller and the pager system 14 is connected. When there is a call-incoming from the pager system 14 to the personal station, the personal station is paged to connect the personal station and the pager system to each other, and a message indicating that the area where the personal station is located is a call-incoming prohibited area and a message which is mediated by the pager system 14 is transmitted to the personal station".

Further, in the fourth embodiment, even when the service information stored in the service information storage means is set to indicate a call-incoming prohibiting time zone in which the call-incoming to a personal station located in each of the predetermined areas is prohibited, the service supply means can supply the same service.

Next, a fifth embodiment according to the present invention will be described.

In the above-described first to fourth embodiments, the connection is prohibited between a caller and each of all personal stations located in a call-incoming prohibited area or an area under a call-incoming prohibiting time zone. In the fifth embodiment, the normal call-incoming processing is performed on special personal stations even when these personal stations are located in a call-incoming prohibited area or an area under a call-incoming prohibiting time zone, thereby connecting a caller and each of these personal stations.

Figure 12:
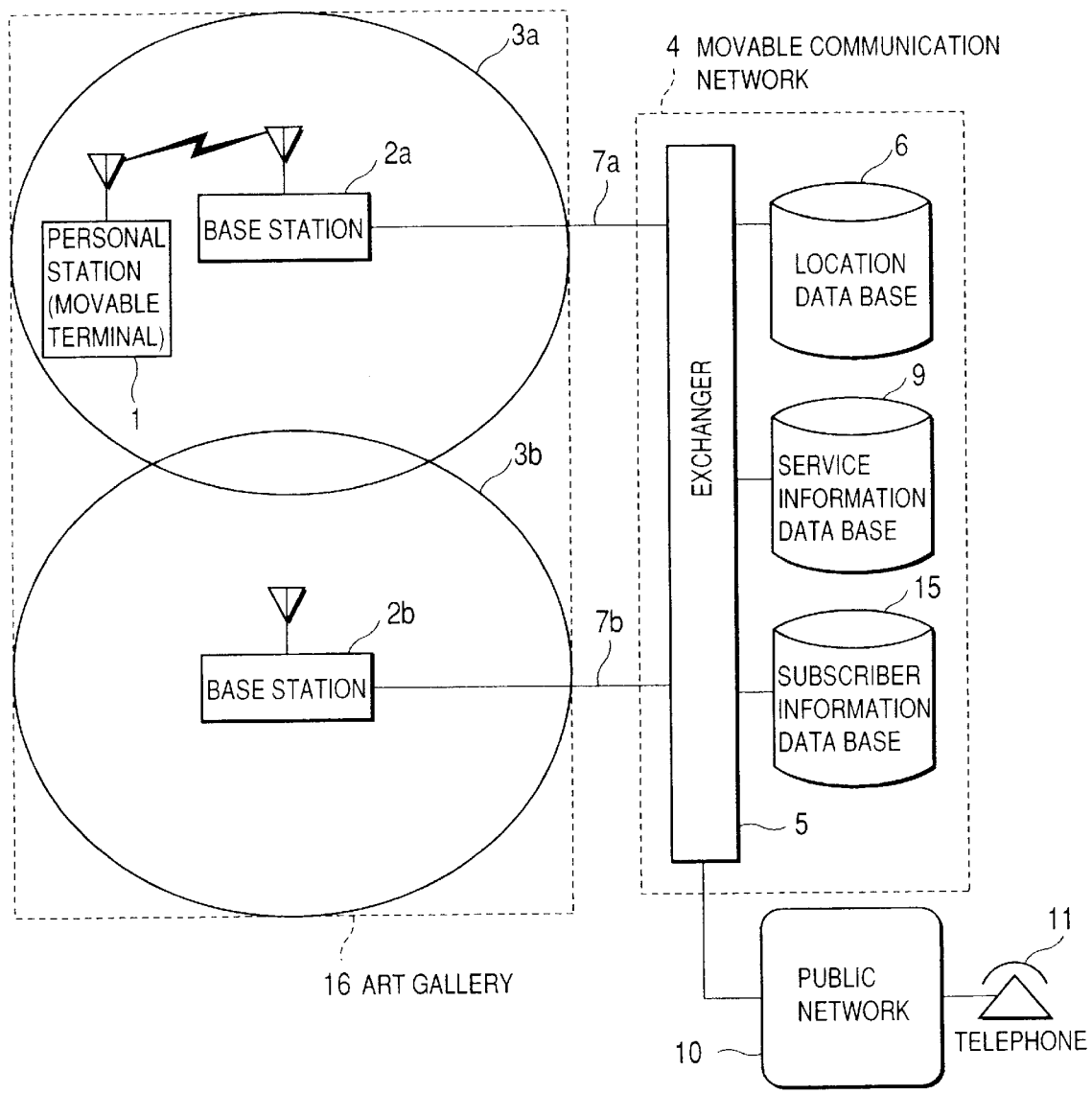
FIG. 12 is a diagram showing the construction of a movable communication system according to a fifth embodiment of the present invention.

FIG. 12 is a diagram showing a movable communication system according to the fifth embodiment of the present invention.

In FIG. 12, reference numeral 1 represents a personal station, reference numerals 2a, 2b represent base stations, reference numeral 3a, 3b represent areas which are covered by the base stations 2a, 2b, respectively, reference numeral 4 represents a movable communication network, reference numeral 5 represents an exchanger, reference numeral 6 represents a location data base, reference numeral 7a, 7b represent lines through which the exchanger 5 and the base stations 2a, 2b are connected to each other, reference numeral 9 represents a service information data base, reference numeral 10 represents a public network, reference numeral 11 represents a telephone installed in the public network 10, and reference numeral 15 represents a subscriber data base.

In FIG. 12, the location data base 6 serves to manage the location information indicating the area where each of all the personal stations containing the personal station 1 is located.

FIG. 12 shows a case where the personal station 1 is located in the area 3a, and thus the location information on the personal station 1 indicates the area 3a.

In the movable communication system of the fifth embodiment, the service information storage means, the service supply means and the service content notifying means are provided to the movable communication network 4.

Further, in FIG. 12, the service information data base 9 corresponds to the service information storage means, and it serves to manage the service information indicating services other than the calling service and the call-incoming services, which are to be supplied to personal stations located in predetermined areas of all the areas covered by all the base stations containing the base stations 2a and 2b.

The service information stored in the service information storage means is set to indicate the call-incoming prohibition to personal stations located in the predetermined areas of all the areas covered by all the base stations containing the base stations 2a and 2b, that is, that the area is a call-incoming prohibited area.

FIG. 12 shows a case where the area 3a, 3b corresponds to art gallery 16, and thus the service information on the area 3a, 3b indicates a call-incoming prohibited area in the service information data base 9.

Further, in FIG. 12, the subscriber data base 15 serves to manage subscriber information indicating a call-incoming prohibited area in which the call-incoming to each of all the personal stations containing the personal station 1 is not prohibited. The subscriber data base 15 may be set to manage information indicating personal stations, to which the call-incoming is not prohibited in areas for which the service information data base 9 manages the service information indicating the cal-call-incoming prohibited area.

In FIG. 12, the subscriber of the personal station 1 is assumed as a staff of the art museum 16, and thus the subscriber information on the personal station 1 indicates in the subscriber data base 15 that the call-incoming in the area 3a, 3b is prohibited.

Accordingly, in the movable communication network 4, when there is a call-incoming to a personal station located in the area 3a or 3b (call-incoming prohibited area), the service supply means supplies a service of prohibiting the call-incoming to the personal station if the subscriber information on the personal station indicates that the call-incoming in the area 3a, 3b is not prohibited. That is, when there is a call-incoming to a personal station located in the area 3a, 3b, if the subscriber information on the personal station does not indicate that the call-incoming in the area 3a, 3b is not prohibited, the service supply means prohibits the paging to the personal station to prohibit the connection between the personal station and the caller, and also transmits to the personal station a message indicating that there has been the call-incoming to the personal station.

The service content notifying means transmits to the personal station a message indicating that the area 3a, 3b is a call-incoming prohibited area.

Even when there is a call-incoming to a personal station located in the area 3a, 3b, the service supply means does not supply the service of prohibiting the call-incoming to the personal station if the subscriber information on the personal station indicates that the call-incoming in the area 3a, 3b is not prohibited. Therefore, in the movable communication network system 4, the personal station is provided with the same call-incoming service as the conventional movable communication system, that is, the service of paging the personal station, and connecting the personal station and the caller.

Further, in the movable communication network 4, when there is a call-incoming to a personal station located in an area for which the service information data base 9 does not manage the service information indicating the call-incoming prohibited area, the personal station is supplied with the same call-incoming service as the conventional movable communication system, that is, the service of paging the personal station and connecting the personal station and the caller.

The service supply means and the service content notifying means are actually achieved by the operation of the exchanger 5.

The internal construction of the base station 2a, 2b is the same as that shown in FIG. 2, and the internal construction of the personal station is also the same as that shown in FIG. 3.

Next, the operation when there is a call-incoming to the personal station 1 will be described.

In this case, the caller to the personal station 1 is assumed to be a telephone 11 installed in the public network 10 (hereinafter referred to as "caller 11"). However, the caller may be another personal station which is different from the personal station 1.

In the movable communication network 4, when there is a call-incoming to the personal station 1 from the caller 11, the exchanger 5 reads out the location information on the personal station 1 from the location data base 6. In this case, since the personal station 1 is located in the area 3a, the location information on the personal station 1 indicates the area 3a in the location data base 6.

Subsequently, the exchanger 5 reads out from the service information data base 9 the service information corresponding to the area 3a where the personal station 1 is located. In this case, since the area 3a where the personal station 1 is located corresponds to the art museum 16, the service information on the area 3a indicates a call-incoming prohibited area in the service information data base 9.

Subsequently, the exchanger 5 reds out the subscriber information on the personal station 1 from the subscriber data base 15. In this case, since the subscriber of the personal station 1 is a staff of the art museum 16, the subscriber information on the personal station 1 indicates that the call-incoming in the area 3a, 3b is not prohibited.

In the fifth embodiment, even when the area 3a where the personal station 1 is located is a call-incoming prohibited area, the service content to be supplied to the personal station 1 is varied in accordance with whether the personal station 1 is a special personal station in the area 3a. Therefore, the exchanger 5 performs service content judgment processing shown in FIG. 13.

Figure 13:
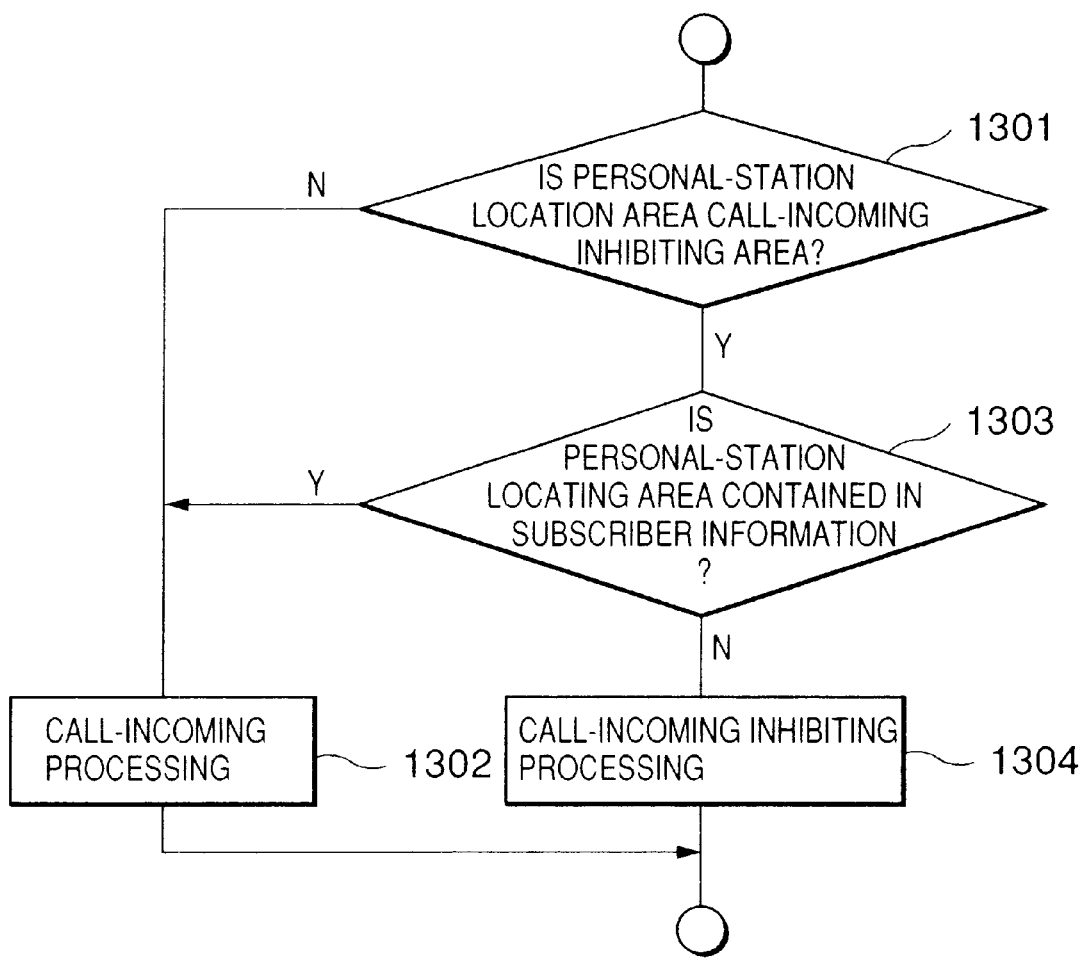
FIG. 13 is a flowchart showing the service content judgment processing which is performed by the exchanger in the fifth embodiment.

As shown in FIG. 13, the exchanger 5 judges whether the area 3a where the personal station 1 is located is a call-incoming prohibited area (step 1301).

When the area 3a where the personal station 1 is not a call-incoming prohibited area, the normal call-incoming processing is performed to connect the personal station 1 and the caller (step 1302). Further, when the area 3a where the personal station 1 is located is a call-incoming prohibited area, it is judged whether the area 3a which is the call-incoming prohibited area is contained in the areas indicated by the subscriber information on the personal station (step 1303).

When the area 3a is contained in these areas, it means that the personal station 1 is a special area in the area 3a. Therefore, in order to connect the personal station 1 and the caller, the normal call-incoming processing is performed (step 1302). On the other hand, if the area 3a is not contained in these areas, the call-incoming prohibiting processing is performed to prohibit the connection between the personal station 1 and the caller (step 1304).

The call-incoming prohibiting processing performed in the step 1304 is coincident with the call-incoming prohibiting processing described in FIG. 7.

In this case, the subscriber of the personal station 1 is a staff of the art museum 16, and thus the personal station 1 is a special subscriber in the area 3a. Therefore, the exchanger 5 performs the normal call-incoming processing to connect the personal station 1 and the caller 11.

Figure 14:
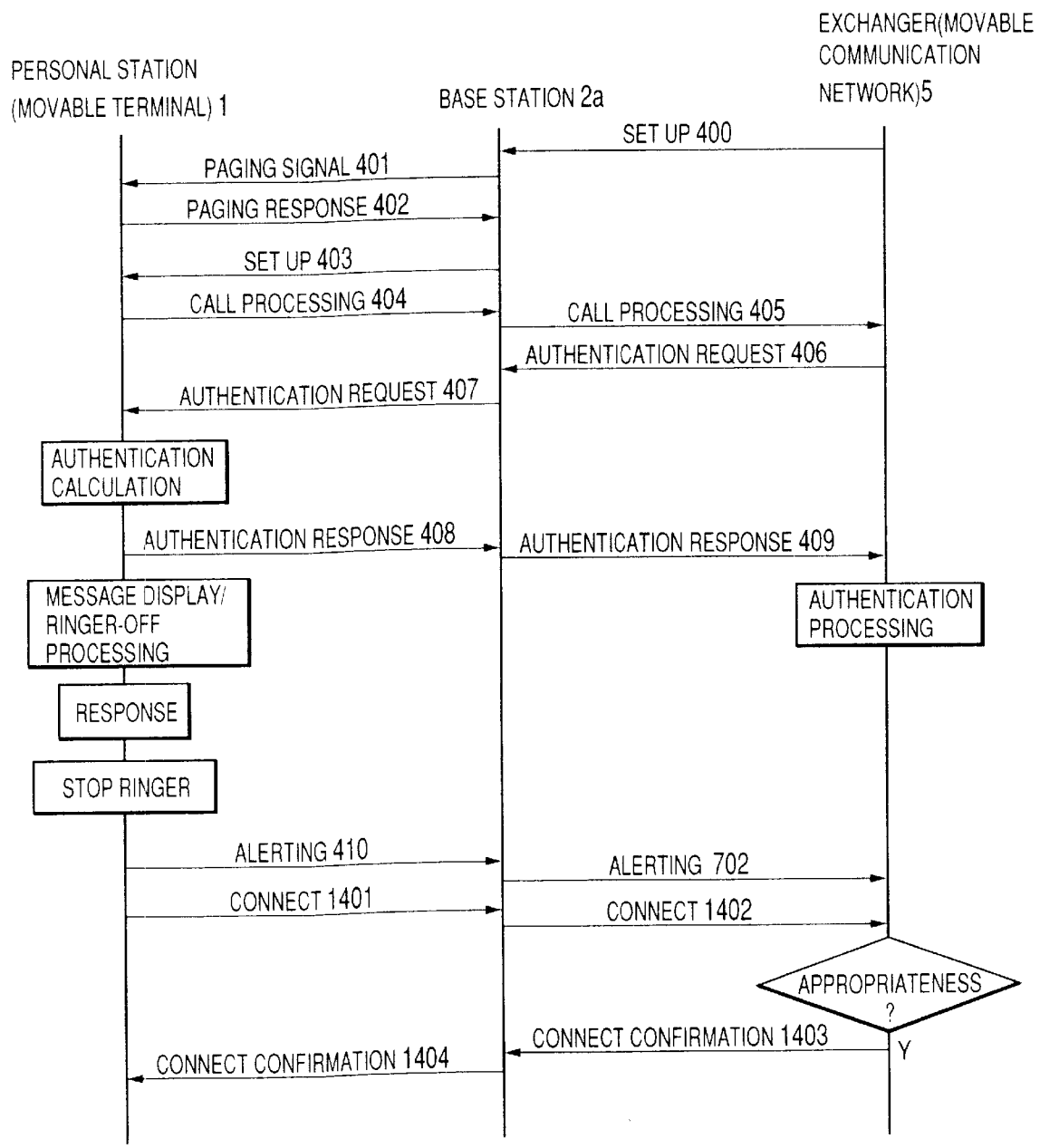
FIG. 14 is a sequence diagram showing the operation of the fifth embodiment.

That is, the exchanger 5 transmits the setup signal 400 to the base station 2a covering the area 3a as shown in FIG. 14.

In the base station 2a, upon receiving the setup signal 400 through the line interface 204 and the communication part 203, the processor 206 transmits the paging signal 401 to the personal station 1 via the radio part 202 and the antenna 201.

In the personal station 1, upon receiving the paging signal 401 through the antenna 301 and the radio part 302, the processor 309 transmits the paging response signal 402 to the base station 2a via the radio part 302 and the antenna 301.

In the base station 2a, upon receiving the paging response signal 402 through the antenna 201 and the radio part 202, the processor 206 transmits a setup signal 403 to the personal station 1 via the radio part 202 and the antenna 201.

In the personal station 1, upon receiving the setup signal 403 through the antenna 301 and the radio part 302, the processor 309 transmits a call proceeding signal 404 to the base station 2a via the radio part 302 and the antenna 301.

In the base station 2a, upon receiving the call proceeding signal 404 through the antenna 201 and the radio part 202, the processor 206 transmits a call proceeding signal 405 to the exchanger 5 through the communication part 203 and the line interface 204.

Upon receiving the call proceeding signal 405, the exchanger 5 transmits an authentication request signal 406 to the base station 2a.

In the base station 2a, upon receiving the authentication request signal 406 through the line interface 204 and the communication part 203, the processor 206 transmits an authentication request signal 407 to the personal station 1 via the radio part 202 and the antenna 201.

In the personal station 1, upon receiving the authentication request signal 407 through the antenna 301 and the radio part 302, the processor 309 performs the authentication calculation processing and transmits the authentication calculation result as an authentication response signal 408 to the base station 2a via the radio part 302 and the antenna 301.

In the base station 2a, upon receiving the authentication response signal 408 through the antenna 201 and the radio part 202, the processor 206 transmits an authentication response signal 409 to the exchanger 5 through the communication part 203 and the line interface 204.

Upon receiving the authentication response signal 409, the exchanger 5 performs the authentication processing of judging the appropriateness of the personal station 1.

In the personal station 1, the processor 309 performs the message display/ringer-off processing shown in FIG. 5 after transmitting the authentication response signal 408.

In the message display/ringer-off processing shown in FIG. 5, the processor 309 first judges whether the message display instruction is set in the setup signal 403 (step 501). If the message display instruction is set, the message corresponding to the content of the message display instruction is displayed on the display 307 (step 502).

In this case, since the message display instruction is not set in the setup signal 403, the processor 309 does not execute the step 502, and thus no message is displayed on the display 307.

Subsequently, the processor 309 judges whether the ringer-off instruction is set in the setup signal 403 (step 503). If the ringer-off instruction is not set, the ringer 310 rung (step 504).

In this case, since the ringer-off instruction is not set in the setup signal 403, the processor 309 goes to step 504 to ring the ringer 310.

Accordingly, with respect to a personal station which is located in the area 3a (call-incoming prohibited area), but is a special personal station, the ringer 310 of the personal station 1 rung when there is a call-incoming to the personal station 1.

Returning to FIG. 14, in the personal station 1, when the message display/ringer-of processing is finished and the subscriber of the personal station 1 responds, the processor 309 stops the ringing of the ringer 310 and transmits a paging signal 410 and a connection signal 1401 to the base station 2a via the radio part 302 and the antenna 301.

In the base station 2a, upon receiving the paging signal 410 and the connection signal 1401 through the antenna 201 and the radio part 202, the processor 206 transmits a paging signal 702 and a connection signal 1402 to the exchanger 5 through the communication part 203 and the line interface 204.

Upon receiving the paging signal 702 and the connection signal 1402, the exchanger 5 transmits a connection confirmation signal 1403 to the base station 2a if the processing result of the authentication processing indicates the appropriateness of the personal station 1.

In the base station 2a, upon receiving the connection confirmation signal 1403 through the line interface 204 and the communication part 203, the processor 206 transmits the connection confirmation signal 1404 to the personal station 1 via the radio part 202 and the antenna 201.

In the personal station 1, when the processor 309 receives the connection confirmation signal 1404 through the antenna 301 and the radio part 302, the personal station 1 and the caller 11 are connected to each other to enable the subscribers of the personal station 1 and the caller 11 to have a communication with each other.

As described above, when there is a call-incoming to the personal station 1 located in the area 3a from the caller 11, the exchanger 5 performs the normal call-incoming processing because the service information on the area 3a which is managed by the service information data base 9 indicates the call-incoming prohibited area, but the subscriber information on the personal station 1 which is managed by the subscriber data base 15 indicates that the call-incoming in the area 3a is not prohibited. Accordingly, even when the area 3a where the personal station 1 is located is a call-incoming prohibited area, the connection between the personal station 1 and the caller 11 is established if the personal station 1 is a special personal station in the area 3a.

In the fifth embodiment, the service information stored in the service information storage means is set to indicate that each of the predetermined areas of all the areas covered by all the base stations is a call-incoming prohibited area. However, the service information may be set to indicate the content of the processing which is actually performed.

That is, "when there is a call-incoming to a personal station other than the specific personal stations, the paging to the personal station is prohibited to prohibit the connection between the personal station and the caller, and also the processing content "Transmitting to the personal station a message indicating that there has been the call-incoming to the personal station and an area where the personal station is located is a call-incoming prohibited area is transmitted to the personal station" is indicated.

In the fifth embodiment, even when the service information stored in the service information stored in the service information storage means is set to indicate a call-incoming prohibiting time zone in which the call-incoming to a personal station in a corresponding area is prohibited, the service supply mans may supply the same services.

Next, a sixth embodiment according to the present invention will be described.

In the first to fifth embodiments as described above, the connection between the personal station and the caller is prohibited when the call-incoming to the personal station is prohibited. According to the sixth embodiment, when the call-incoming to the personal station is prohibited, the personal station and the caller are connected to each other while the call is put on hold, and the call hold state is releases after the personal station is moved to an area where the call-incoming is allowed to enable the communication between the subscribers of the personal station and the caller.

Figure 15:
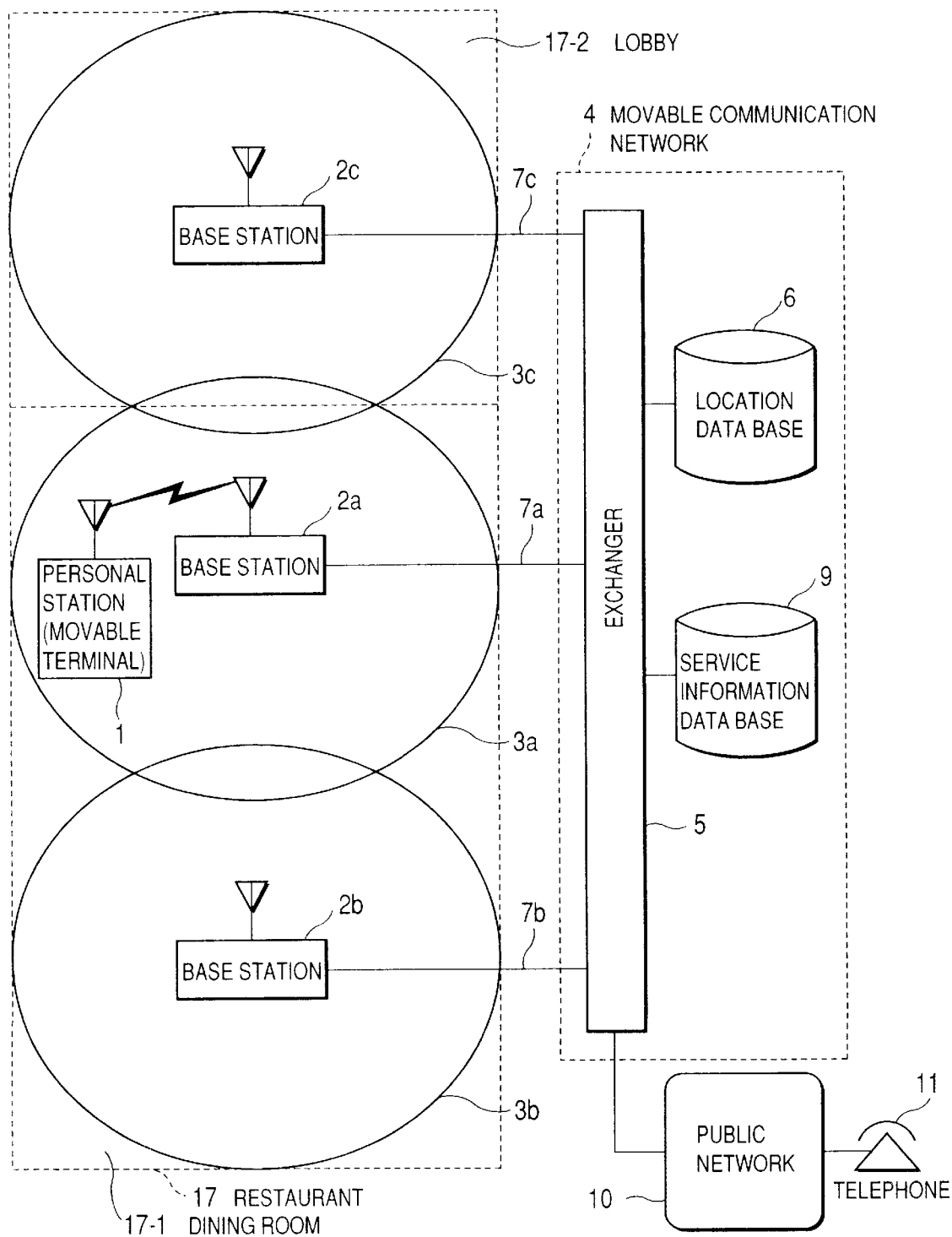
FIG. 15 is a diagram showing the construction of a movable communication system according to a sixth embodiment of the present invention.

FIG. 15 is a diagram showing a movable communication system according to the sixth embodiment.

In FIG. 15, reference numeral 1 represents a personal station, reference numerals 2a to 2c represent base stations, reference numerals 3a to 3c represent areas covered by the base stations 2a to 2c respectively, reference numeral 4 represents a movable communication network, reference numeral 5 represents an exchanger, reference numeral 6 represents a location data base, reference numerals 7a to 7c represent lines through which the exchanger 5 and the base stations 2a to 2c are connected to each other respectively, reference numeral 9 represents a service information data base, reference numeral 10 represents a public network, and reference numeral 11 represents a telephone installed in the public network 10.

In FIG. 15, the location data base 6 serves to manage location information indicating an area where a personal station is located, for each of all the personal stations containing the personal station 1.

FIG. 15 shows a case where the personal station 1 is located in the area 3a. Therefore, the location information on the personal station 1 indicates the area 3a.

In the movable communication system of the sixth embodiment, the service information storage means, the service supply means and the service content notifying means are equipped to the movable communication network 4.

In FIG. 15, the service information data base 9 corresponds to the service information storage means, and it serves to manage service information representing the special services other than the calling service and the call-incoming service which are to be supplied to personal stations located in predetermined areas of all the areas covered by all the base stations containing the base stations 2a to 2c.

The service information stored in the service information storage means is set to indicate that the call-incoming to personal stations located in the predetermined areas is prohibited, that is, the area where the personal station concerned is a call-incoming prohibited area.

However, in the sixth embodiment, the caller and the personal station which is prohibited from having the call-incoming thereto are connected to each other while the call is put on hold. Accordingly, if the personal station is moved to an area where the call-incoming is allowed, the call hold state is released and thus the communication is allowed between the subscriber of the caller and the personal station. Therefore, it is preferable to transmit to the personal station a place which corresponds to an area to which the subscriber of the personal station should move (such a place will be hereinafter referred to as "moving target place"). In order to transmit a message indicating a moving target place to the personal station, the service information stored in the service information data base 9 may be set to indicate that the corresponding area is a call-incoming prohibited area, and to also indicate the moving target place corresponding to the area.

In FIG. 15, each of the areas 3a to 3c corresponds to a restaurant 17. Specifically, each of the areas 3a and 3b corresponds to a dining room 17-1 in the restaurant 17, and the area 3c corresponds to a lobby 17-2 in the restaurant 17. Therefore, in the service information data base 9, the service information on the area 3a, 3b indicates that the area is a call-incoming prohibited area, and also that the moving target place is the lobby 17-2 corresponding to the area 3c.

Accordingly, in the movable communication network 4, when there is a call-incoming to a personal station located in the area 3a, 3b (call-incoming prohibited area), the service supply means supply a service of prohibiting the call-incoming to the personal station. That is, when there is a call-incoming to the personal station located in the area 3a, 3b, the service supply means connects the caller and the personal station to each other while putting the call on hold, and then the call hold is released to enable the communication between the caller and the personal station if the personal station is moved to the lobby 17-2 (moving target place) corresponding to the area 3c within a predetermined time.

The service content notifying means transmits to the personal station a message indicating that the area 3a, 3b is a call-incoming prohibited area, and also that the communication is allowed if the personal station is moved to the lobby 17-2.

However, in the sixth embodiment, the service supply means pages the personal station to produce a call tone in order to let the subscriber know that a message is transmitted to the subscriber and enable the subscriber to go to the lobby 17-2.

In the movable communication network 4, when there is a call-incoming to a personal station located in an area for which the service information data base 9 does not manage the service information indicating the call-incoming prohibited area, the personal station is supplied with the same call-incoming service as the conventional movable communication system, that is, the service of paging the personal station and connecting the personal station and the caller.

The service supply means and the service content notifying means are actually achieved by the operation of the exchange unit 5.

The internal construction of the base stations 2a to 2c is the same as shown in FIG. 2, and the internal construction of the personal station 1 is the same as shown in FIG. 3.

Next, the operation when there is a call-incoming to the personal station 1 will be described.

In this case, the caller to the personal station 1 is assumed to be a telephone 11 (hereinafter referred to as the "caler 11") installed in the public network 10, however, it may be another personal station.

In the movable communication network 4, when there is a call-incoming to the personal station 1 from the caller 11, the exchanger 5 reads out the location information on the personal station 1 from the location information data base 6. In this case, since the person station 1 is located in the area 3a, the location information on the personal station 1 indicates the area 3a in the location information data base 6.

Subsequently, the exchanger 5 reads from the service information data base 9 the service information corresponding to the area 3a where the personal station 1 is located. In this case, since the area 3a where the personal station 1 is located corresponds to the dining room 17-1, in the service information data base 9, the service information on the area 3a indicates that the area is a call-incoming prohibited area and that the moving target place is the lobby 17-2 corresponding to the area 3c.

Accordingly, the exchanger 5 performs the call-incoming prohibiting processing as described below.

Figure 16:
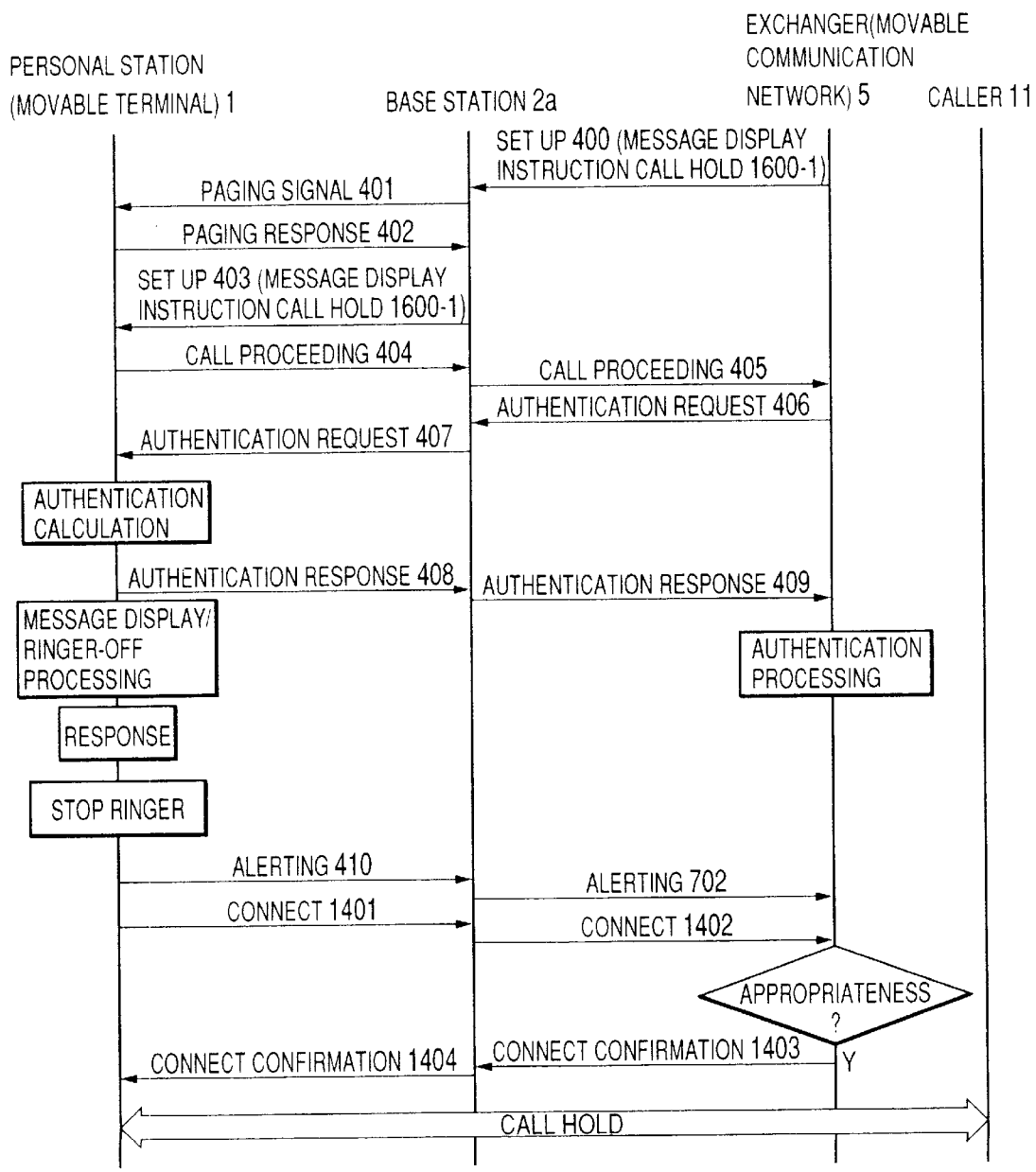
FIG. 16 is a sequence diagram showing the operation of the sixth embodiment.

That is, as shown in FIG. 16, the exchanger 5 transmits to the base station 2a covering the area 3a a setup signal 400 which contains therein a message display instruction 1601-1 for instructing the personal station to display a message indicating that the area 3a where the personal station 1 is located is a call-incoming prohibited area and that the communication is allowed if the personal station 1 is moved to the lobby 17-2.

In the base station 2a, upon receiving the setup signal 400 (in this case, the message display instruction 1600-1 is set therein) through the line interface 204 and the communication part 203, the processor 206 transmits a paging signal 401 to the base station 2a via the radio part 202 and the antenna 201.

In the personal station 1, upon receiving the paging signal 401 through the antenna 301 and the radio part 302, the processor 309 transmits a paging response signal 402 to the base station 2a via the radio part 302 and the antenna 301.

In the base station 2a, upon receiving the paging response signal 402 through the antenna 201 and the radio part 202, the processor 206 transmits a setup signal 403 to the personal station 1 via the radio part 202 and the antenna 201. Since the processor 206 transmits the setup signal 403 having the same content as the received setup signal 400, the message display instruction 1600-1 is also set in the setup signal 403.

In the personal station 1, upon receiving the setup signal 403 (in this case, the message display instruction 160-1 is set therein) through the antenna 301 and the radio part 302, the processor 309 transmits a call proceeding signal 404 to the base station 2a via the radio part 302 and the antenna 301.

In the base station 2a, upon receiving the call proceeding signal 404 through the antenna 201 and the radio part 202, the processor 206 transmits a call proceeding signal 405 to the exchanger 5 through the communication part 203 and the line interface 204.

Upon receiving the call proceeding signal 405, the exchanger 5 transmits an authentication request signal 406 to the base station 2a.

In the base station 2a, upon receiving the authentication request signal 406 through the line interface 204 and the communication part 203, the processor 206 transmits an authentication request signal 407 to the base station 1 via the radio part 202 and the antenna 201.

In the personal station 1, upon receiving the authentication request signal 407 through the antenna 301 and the radio part 302, the processor 309 performs the authentication calculation processing and transmits the calculation result as an authentication response signal 408 to the base station 2a through the antenna 301 and the radio part 302.

In the base station 2a, upon receiving the authentication response signal 408 through the antenna 2-1 and the radio part 202, the processor 206 transmits an authentication response signal 409 to the exchanger 5 through the communication part 203 and the line interface 204.

Upon receiving the authentication response signal 409, the exchanger 5 performs the authentication processing to judge the appropriateness of the personal station 1.

In the personal station 1, after transmitting the authentication response signal 408, the processor 309 performs the message display/ringer-off processing shown in FIG. 5.

As shown in FIG. 5, in the message display/ringer-off processing, the processor 309 first judges whether the message display instruction is set in the setup signal 403 (step 501). If it is set, a message which is conformable with the content of the message display instruction is displayed on the display 307 (step 502).

In this case, since the message display instruction 1600-1 is set in the setup signal 403, the processor 309 goes to step 502 to display on the display 307 a message indicating that the area 3a where the personal station 1 is located is a call-incoming prohibited area, and also that the communication is allowed if the personal station is moved to the lobby 17-2.

Subsequently, the processor 309 judges whether the ringer-off instruction is set in the setup signal 403 (step 503). If it is not set, the ringer 310 rung (step 504).

In this case, since the ringer-off instruction is not set in the setup signal 403, the processor 309 goes to step 504 to ring the ringer 310.

Accordingly, in the personal station 1 located in the area 3a which is a call-incoming prohibited area, when there is a call-incoming to the personal station 1, the ringer 310 rings, and a message indicating that the area 3a where the personal station 1 is located is a call-incoming prohibited area and that the communication is allowed if the personal station 1 is moved to the lobby 17-2, is displayed on the display 307.

For example, the message to be displayed on the display 307 may be set to a message "There has been call-incoming to you, but the call-incoming is now regulated in the area where you are now. If you move to a lobby within one minute, the line will be connected".

Returning to FIG. 16, in the personal station 1, when the message display/ringer-off processing is finished and the subscriber of the personal station 1 answers, the ringer 310 which is ringing is stopped, and a paging signal 410 and a connection signal 1401 are transmitted to the base station 2a via the radio part 302 and the antenna 301.

In the base station 2a, upon receiving the paging signal 410 and the connection signal 1401 through the antenna 201 and the radio part 202, the processor 206 transmits a paging signal 702 and a connection signal 1402 to the exchanger 5 through the communication part 203 and the line interface 204.

Upon receiving the paging signal 702 and the connection signal 1402, the exchanger 5 transmits a connect confirmation signal 1403 to the base station 2a if the processing result of the authentication processing indicates the appropriateness of the personal station 1.

In the base station 2a, upon receiving the connect confirmation signal 1403 through the line interface 204 and the communication part 203, the processor 206 transmits a connect confirmation signal 1404 to the personal station 1 via the radio part 202 and the antenna 201.

In the personal station 1, upon receiving the connect confirmation signal 1404 through the antenna 301 and the radio part 302, the processor 309 connects the personal station 1 and the caller 11. However, in the call-incoming prohibiting processing of the sixth embodiment, the connection is established under a call-hold state. Accordingly, at this time point, the communication is not allowed between the subscribers of the personal station 1 and the caller 11.

In this case, a communication channel connecting the personal station 1 and the exchanger 5 among communication channels through which the personal station 1 and the caller 1 are connected to each other is a communication channel via the base station 2a.

Under the call-hold state, if the subscriber of the personal station 1 moves to the lobby 17-2 within one minute according to the message displayed on the display 307, the call-hold state is released, so that the subscriber of the personal station 1 and the subscriber of the caller 11 can communicate with each other.

Figure 17:
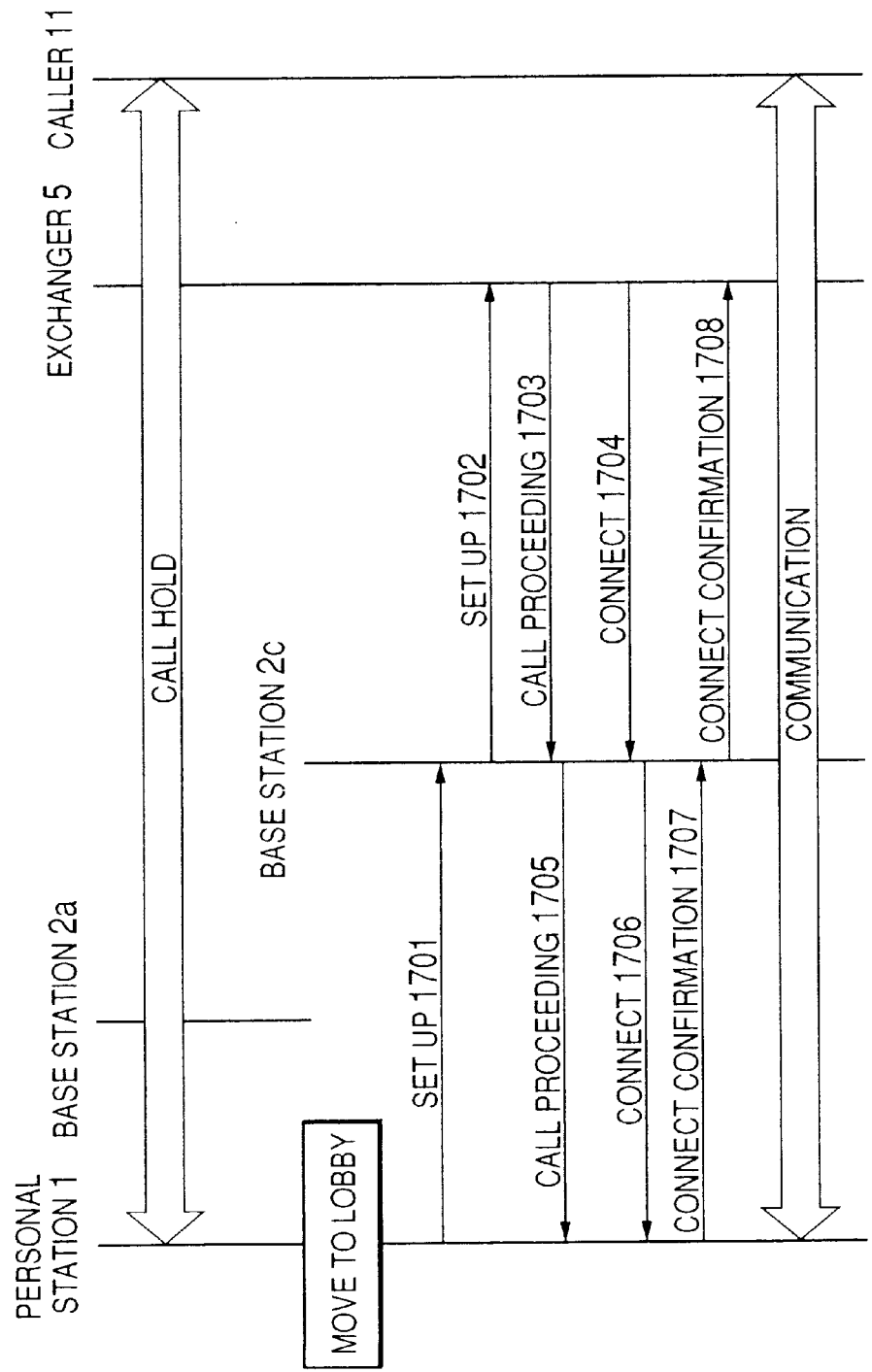
FIG. 17 is a sequence diagram showing the operation of the sixth embodiment.

That is, as shown in FIG. 17, if the subscriber of the personal station 1 moves to the lobby 17-2 under the call-hold state, the base station covering the area where the personal station 1 itself is located is changed from the base station 2a to the base station 2c, so that the processor 309 transmits the setup signal 1701 via the radio part 302 and the antenna 301 to the base station 2c which covers the area 3c.

In the base station 2c, upon receiving the setup signal 1701 through the antenna 201 and the radio part 202, the processor 206 transmits a setup signal 1702 to the exchanger 5 through the communication part 203 and the line interface 204.

Upon receiving the setup signal 1702, the exchanger 5 transmits a call proceeding signal 1703 and a connection signal 1704 to the base station 2c.

In the base station 2c, upon receiving the call proceeding signal 1703 and the connection signal 1704 through the line interface 204 and the communication part 203, the processor 206 transmits a call proceeding signal 1705 and a connection signal 1706 to the personal station 1 via the radio part 202 and the antenna 201.

In the personal station 1, upon receiving the call proceeding signal 1705 and the connection signal 1706 through the antenna 301 and the radio part 302, the processor 309 transmits a connect confirmation signal 1707 to the base station 2c via the radio part 302 and the antenna 301.

In the base station 2c, upon receiving the connect confirmation signal 1707 through the antenna 201 and the radio part 202, the processor 206 transmits a connect confirmation signal 1708 to the exchanger 5 through the communication part 203 and the line interface 204.

According to the call-incoming prohibiting processing of the sixth embodiment, if the exchanger 5 receives the connect confirmation signal 1708 which is transmitted from the personal station 1 and then from the base station 2c within a predetermined time (in this case, one minute) after the personal station 1 and the caller 11 are connected under the call-hold state, the exchanger 5 switches to the communication channel via the base station 2c the communication channel connecting the personal station 1 and the exchanger 5 in the communication channels connecting the personal station 1 and the caller 11, and also releases the call-hold state, so that the communication is allowed between the subscribers of the personal station 1 and the caller 11.

If the exchanger 5 does not receive the connect confirmation signal 1708 which is transmitted from the personal station 1 and then from the base station 2c within a predetermined time (in this case, one minute) after the personal station 1 and the caller 11 are connected under the call-hold state, the exchanger 5 disconnects the communication channel through which the personal station 1 and the caller 11 are connected to each other under the call-hold state.

As described above, according to the sixth embodiment, when there is a call-incoming from the caller 11 to the personal station 1 located in the area 3a, the exchanger 5 performs the call-incoming prohibiting processing described above because the service information on the area 3a which is managed by the service information data base 9 indicates that the area 3a is a call-incoming prohibited area. Accordingly, in the personal station 1, the paging tone is made, and the message indicating that the area 3a where the personal station 1 is located is a call-incoming prohibited area and that the communication is allowed if the personal station 1 is moved to the lobby 17-2, is displayed on the display 307.

Accordingly, the subscriber of the personal station 1 can know the reason why the connection to the caller 11 is prohibited, that is, that the area where the personal station 1 is located is a call-incoming prohibited area. Further, if according to a message displayed on the display 307, the subscriber of the personal station 1 moves to the place corresponding to the area 3c (the moving target area for the area 3a), that is, the lobby 17-2, the subscriber of the personal station 1 can communicate with the subscriber of the caller 11.

In the sixth embodiment, the service information stored in the service information storage means is set to indicate that each of the predetermined areas of all the areas covered by all the base stations is a call-incoming prohibited area, and also indicate the moving target place for the area. However, the service information may be set to indicate the content of the processing which is actually performed.

That is, the service information may be set to indicate the following processing content: "when there is a call-incoming to the personal station, the personal station is paged, and the personal station and the caller are connected to each other under the call hold state. At the same time, a message indicating that the communication is allowed if the personal station is moved to a moving target place is transmitted to the personal station, and then if the personal station is moved to the moving target place within a predetermined time, the call-hold state is released to enable the communication between the subscribers of the personal station and the caller".

Further, in the sixth embodiment, even when the service information stored in the service information storage means is set to indicate a call-incoming prohibiting time zone in which the call-incoming to a personal station located in the area is prohibited, the service supply means can supply the same service by indicating the place corresponding to the area to which the personal station should be moved when there is a call-incoming in the call-incoming prohibiting time zone.

In the above-described sixth embodiment, the base stations 2a to 2c are disposed at such places that the dining room 17-1 (a place in which the call-incoming to the personal station is required to be prohibited in the restaurant 17) is physically coincident with the areas 3a, 3b which are covered by the base stations 2a, 2b, and the lobby 17-2 (a place in which the call-incoming to the personal station is not required to be prohibited) is physically coincident with the area 3c which is covered by the base station 2c. Accordingly, the areas 3a, 3b are set as call-incoming prohibited areas while the area 3c is set as a moving target place for the areas 3a and 3c.

However, there may be a case where the area covered by the same base station corresponds to a place at which the prohibition of the call-incoming to the personal station is required and a place at which the prohibition of the call-incoming to the personal station is not required. In this case, the service information data base 9 may be set to manage as a moving target place a place at which the communication is allowed in the corresponding area, and also when the personal station is moved to the moving target place, a signal indicating the movement of the personal station may be transmitted from the personal station to the base station. In order to enable the personal station to transmit to the base station the signal which indicates the movement of the personal station to the moving target place, the subscriber of the personal station may merely input a predetermined number (for example, "#1") through a key pad of the personal station after the subscriber moves to the moving target place.

The call-incoming prohibiting processing in the above situation will be described on the assumption that the base station 2c is not disposed, and the area 3a covered by the base station 2a corresponds to both the dining room 17-1 and the lobby 17-2 in FIG. 15.

In this case, the service information on the area 3a which is managed by the service information data base 9 indicates that the area 3a is a call-incoming prohibited area, and that the moving target place is the lobby 17-2 in the area 3a.

In the call-incoming prohibiting processing described with reference to FIG. 16, the exchanger 5 transmits to the base station 2a covering the area 3a a setup signal 400 which contains therein the message display instruction 1600-1 for displaying a message indicating that the area 3a where the personal station 1 is located is a call-incoming prohibited area, and that the communication is allowed if the subscriber of the personal station 1 moves to the moving target place, that is the lobby 17-2 and inputs "#1". Accordingly, in the personal station 1, the paging tone is made, and for example, a message "you have just had a call-incoming, but the call-incoming is regulated at your present location. If you move to the lobby and input "#1" within one minute, you would be connected to the caller" is displayed on the display 307.

Figure 18:
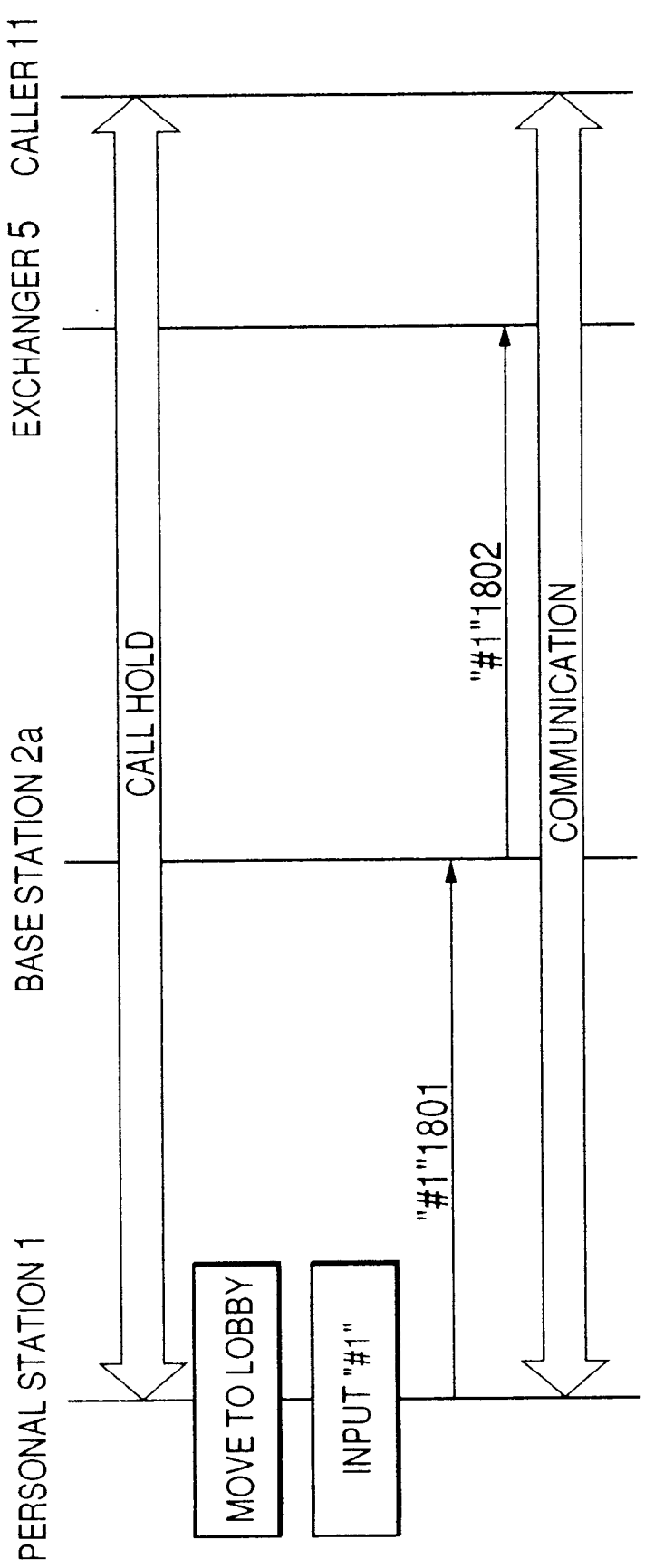
FIG. 18 is a sequence diagram showing the operation of the sixth embodiment.

Like the call-incoming prohibiting processing described with reference to FIG. 16, when the subscriber of the personal station 1 moves to the lobby 17-2 and then inputs "#1" through the key pad 306 after the personal station 1 and the caller 11 are connected under the call-hold state, the processor 309 of the personal station 1 transmits "#1" 1801 input through the key pad to the base station 2a via the radio part 302 and the antenna 301 as show in FIG. 18.

In the base station 2a, upon receiving "#1" 1801 through the antenna 201 and the radio part 202, the processor 206 transmits "#1" 1802 to the exchanger 5 through the communication part 203 and the line interface 204.

When the exchanger 5 receives "#1" 1802 within a predetermined time (in this case, within one minute) from the time when the personal station 1 and the caller 11 are connected to each other under the call-hold state, "#1" 1802 being transmitted from the personal station 1 and then transmitted from the base station 2a, the exchanger 5 releases the call-hold state and thus the subscribers of the personal station 1 and the caller 11 can communicate with each other.

If the exchanger 5 does not receive "#1" 1802 within the predetermined time (in this case, within one minute) from the time when the personal station 1 and the caller 11 are connected to each other under the call-hold state, the communication channel through which the personal station 1 and the caller 11 are connected to each other under the call-hold state is disconnected.

Next, a seventh embodiment according to the present invention will be described.

In the above-described first to fourth embodiment, all the personal stations located in call-incoming prohibited areas or areas under a call-incoming prohibiting time zone are prohibited from being connected to callers. Further, in the fifth embodiment, personal stations other than special personal stations located in call-incoming prohibited areas or areas under a call-incoming prohibiting time zone are prohibited from being connected to callers. However, in the seventh embodiment, even when a personal station is located in a call-incoming prohibited area or an area under a call-incoming prohibiting time zone, the personal station is connected to a caller to enable communication with the caller if the subscriber of the caller needs an urgent communication with the subscriber of the personal station.

However, in the seventh embodiment, if the connection between the caller and the personal station (call target) is allowed by only the operation of the subscriber of the caller in such a situation that the connection between the caller and the personal station is prohibited, the significance of provision of the call-incoming prohibited area is lost. Therefore, it is allowed through an operation center.

That is, when the caller is prohibited from connecting to the personal station (call target), but the subscriber of the caller needs an urgent communication with the subscriber of the personal station, the subscriber of the caller calls to the operation center, so that the caller and the operation center are connected to each other to allow the communication between the caller and the operation center. If the subscriber of the caller declares that he or she needs an urgent communication with the subscriber of the personal station (call-prohibited target), the caller can be connected to the personal station by the operation of the operator, whereby the subscriber of the caller can communicate with the subscriber of the personal station.

Figure 19:
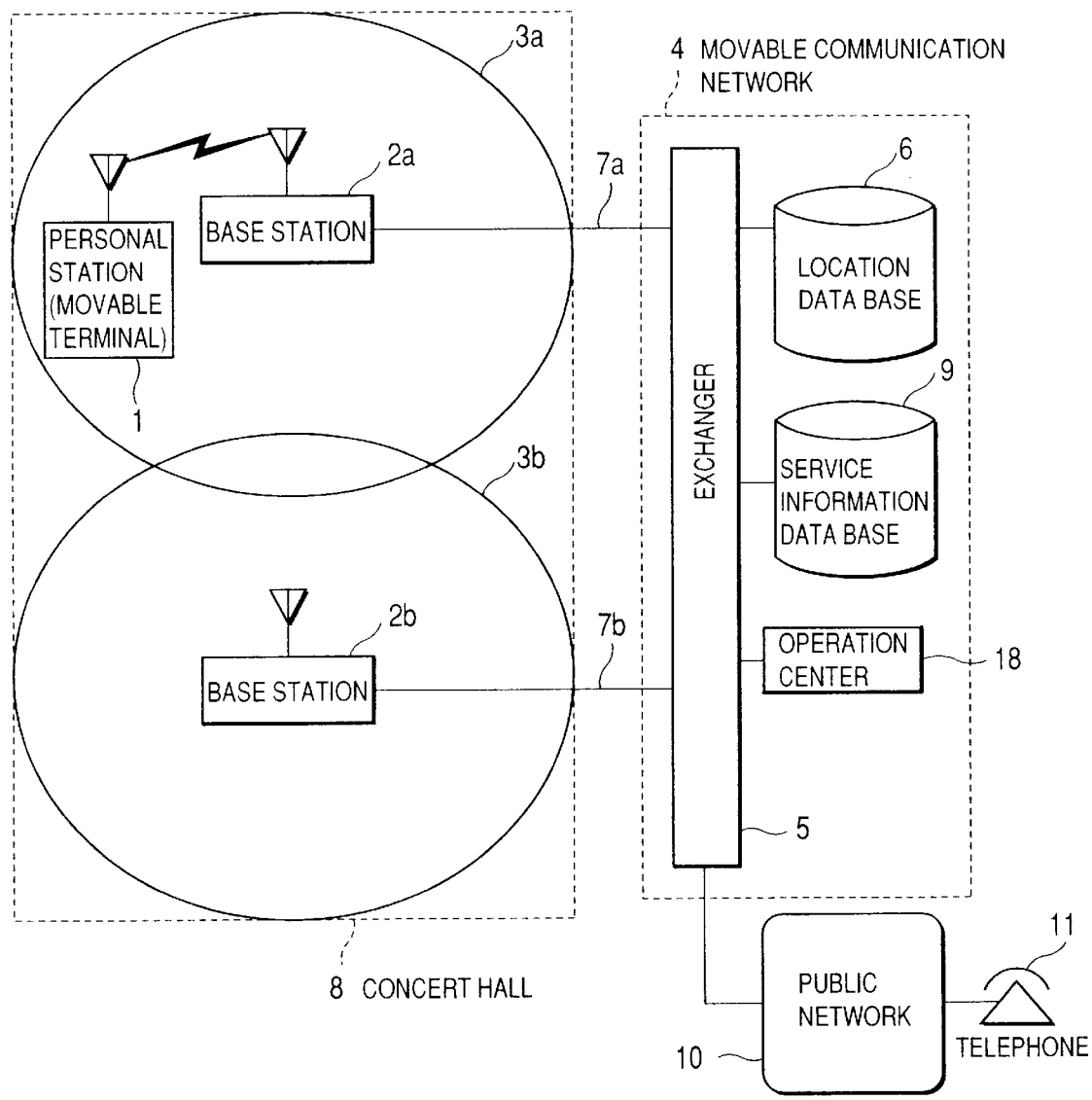
FIG. 19 is a diagram showing the construction of a movable communication system according to a seventh embodiment of the present invention.

FIG. 19 is a block diagram showing a movable communication system of the seventh embodiment.

In the figure, reference numeral 1 represents a personal station, reference numerals 2a, 2b represent base stations, reference numerals 3a, 3b represent areas covered by the base stations 2a, 2b, respectively, reference numeral 4 represents a movable communication network, reference numeral 5 represents an exchanger, reference numeral 6 represents a location data base, reference numerals 7a, 7b represent lines through which the exchanger 5 are wire-connected to the respective base stations 2a, 2b, reference numeral 9 represents a service information data base, reference numeral 10 represents a public network, reference numeral 11 represents a telephone installed in the public network 10, and reference numeral 18 represents an operation center.

In FIG. 19, the location data base 6 is used for management of location information, i.e., information indicating an area in which each personal station is located, for all personal stations including the personal station 1.

FIG. 19 shows a case in which the personal station 1 is located in the area 3a, and accordingly, in the location data base 6, the location information corresponding to the personal station 1 indicates the area 3a.

In the movable communication system of the seventh embodiment, the movable communication network 4 is provided with the above-described service information storage means, service supply means, and service content notifying means.

In FIG. 19, the service information data base 9 corresponds to the service information storage means, and is used, for predetermined areas out of the areas covered respectively by all the base stations including the base stations 2a, 2b, for management of service information expressing special services other than the calling service and the call-incoming service, which are to be provided to personal stations located in the areas in question.

Further, the service information stored in the service information storage means indicates prohibition of call-incoming to the personal stations located in predetermined areas out of the areas covered respectively by all the base stations, i.e. the areas in question being call-incoming prohibited areas.

In the example shown in FIG. 19, the areas 3a, 3b correspond to a concert hall 8, and in the service information data base 9, the service information corresponding to the areas 3a, 3b indicates that the areas 3a, 3b are call-incoming prohibited areas.

Accordingly, in the movable communication network 4, the service supply means provides such service that, when there is a call-incoming to a personal station located in the areas 3a, 3b in which the call-incoming is prohibited, it prohibits the call-incoming to the personal station in question unless it is an urgent call-incoming mediated by the operation center 18. Namely, when there is a call-incoming to a personal station located in the areas 3a, 3b, the service supply means prohibits paging to the personal station in question unless it is an urgent call-incoming mediated by the operation center 18, and prohibits connection between that personal station and a caller while sending the personal station a message indicating occurrence of call-incoming.

Further, the service content notifying means sends the personal station in question a message indicating that the areas 3a, 3b are call-incoming prohibited areas.

On the other hand, even when there is a call-incoming to a personal station located in the areas 3a, 3b, if it is an urgent call-incoming mediated by the operation center 18, the service supply means does not provide the service of prohibiting call-incoming to the personal station in question, and accordingly, in the movable communication network 4, the personal station is provided with a call-incoming service similar to one in the conventional movable communication system, in which that personal station rung, and connected with the caller.

When, in the movable communication network 4, there is call-incoming to a personal station located in an area for which the service information data base 9 does not manage information indicating a call-incoming prohibited area, that personal station is provided with the call-incoming service similar to one in the conventional movable communication system, in which that personal station rung, and connected with the caller.

In practice, the service supply means and the service content notifying means are implemented as operations of the exchanger 5.

Internal construction for each of the base station 2a, 2b is similar to FIG. 2, and internal construction of the personal station 1 is similar to FIG. 3.

Next, there will be explained an operation at the time of call-incoming to the personal station 1.

When, in the movable communication network 4, there is call-incoming to the personal station 1, the exchanger 5 reads location information corresponding to the personal station 1 from the location data base 6. In the present case, the personal station 1 is located in the area 3a, and accordingly, in the location data base 6, the location information corresponding to the personal station 1 indicates the area 3a.

Successively, the exchanger 5 reads the service information corresponding to the area 3a where the personal station 1 is located, from the service information data base 9. In the present case, the area 3a where the personal station 1 is located is a call-incoming prohibited area, and accordingly, in the service information data base 9, the service information corresponding to the area 3a expresses that the area is a call-incoming prohibited area.

As a result, the exchanger 5 performs a call-incoming prohibition processing described below.

In the seventh embodiment, however, the call-incoming prohibition processing carried out by the exchanger 5 is divided into two kinds of processes, a process carried out when the caller to the personal station 1 is not the operation center 18, and a process carried out when the caller to the personal station 1 is the operation center 18.

Namely, when the caller to the personal station 1 is not the operation center 18, the exchanger 5 prohibits connection between the personal station 1 and that caller, as in the case of the call-incoming prohibition processing described with reference to FIG. 7.

Here, the caller to the personal station is a telephone 11 (hereinafter referred to as "the caller 11") accomodated in the public network 10. It, however, may be another personal station than the personal station 1.

The subscriber of the caller 11 can not communicate (e.g., speak) with the subscriber of the personal station 1. When it is necessary to communicate with the subscriber of the personal station 1 urgently, he newly calls the operation center 18. Then, when the operation center 18 and the caller 11 are connected so that it is possible to communicate with an operator of the operation center 18, the subscriber of the caller 11 declares urgent necessity of speaking with the subscriber of the personal station 1 which is prohibited from being connected.

In the operation center 18, the operator who has received the declaration from the subscriber of the caller 11, performs a calling operation directed to the personal station 1 through a console.

By operator's performing the calling operation directed to the personal station 1, the operation center 18 calls the personal station 1 by transmitting a setup signal to the exchanger 5.

All the while, the communication channel connecting the caller 1 and the operation center 18 remains intact.

Figure 20:
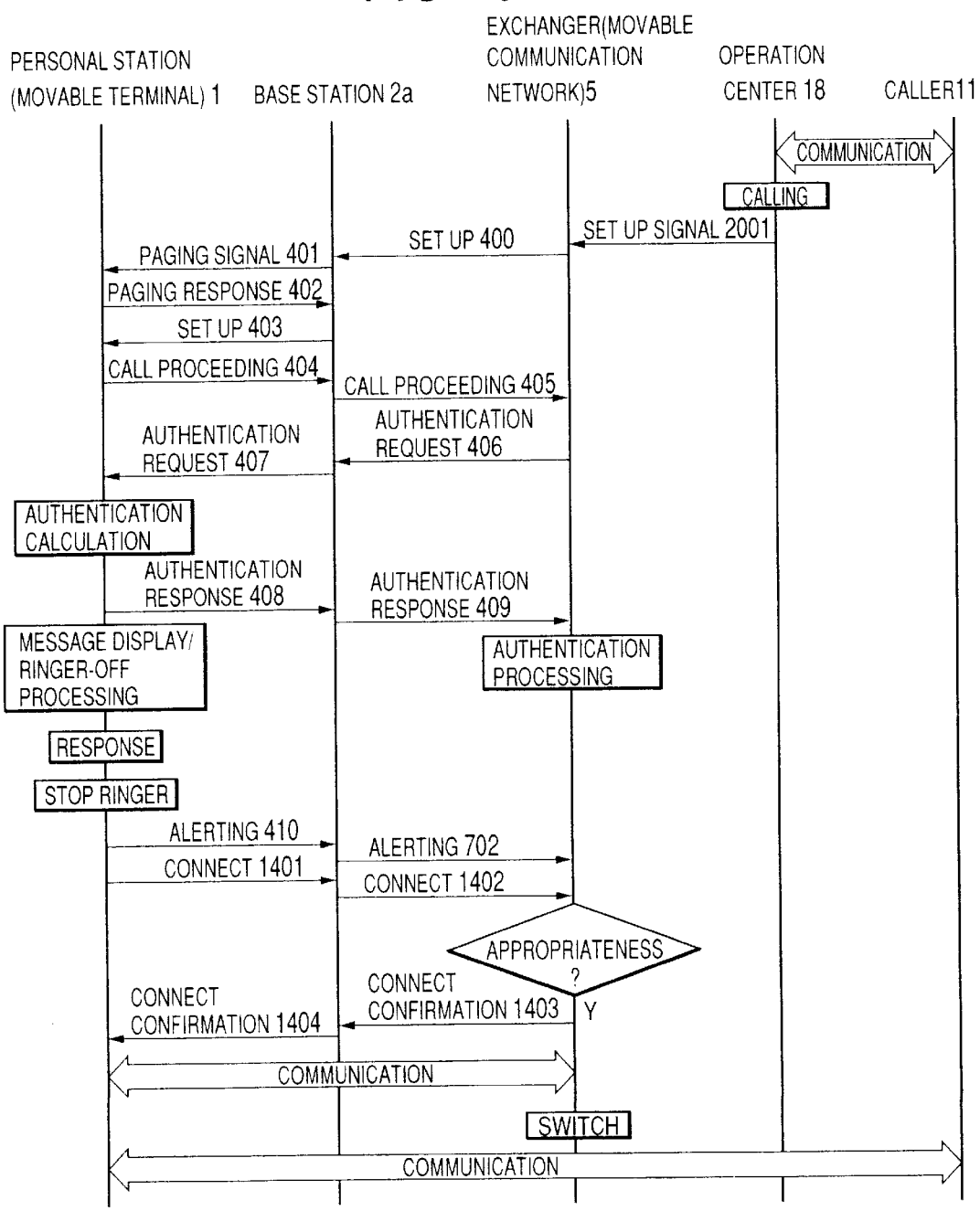
FIG. 20 is a sequence diagram showing the operation of the seventh embodiment.

On the other hand, when the caller to the personal station 1 is the operation center 18, as shown in FIG. 20, the exchanger 5 receives a setup signal 2001 transmitted from the operation center 18, and, in turn, transmits a setup signal 400 to a base station 2a covering the area 3a.

In the base station 2a, upon receiving the setup signal 400 via a line interface 204 and a communication part 203, a processor 206 sends the personal station 1 a paging signal 401 via a radio part 202 and an antenna 201.

In the personal station 1, upon receiving the paging signal 401 via an antenna 301 and a radio part 302, a processor 309 sends the base station 2a a paging response signal 402 via the radio part 302 and the antenna 301.

In the base station 2a, upon receiving the paging response signal 402 via the antenna 201 and the radio part 202, the processor 206 sends the personal station 1 a setup signal 403 via the radio part 202 and the antenna 201.

In the personal station 1, upon receiving the setup signal 403 via the antenna 301 and the radio part 302, the processor 309 sends the base station 2a a call proceeding signal 404 via the radio part 302 and the antenna 301.

In the base station 2a, upon receiving the call proceeding signal 404 via the antenna 201 and the radio part 202, the processor 206 sends the exchanger 5 a call proceeding signal 405 via the communication part 203 and the line interface 204.

Upon receiving the call proceeding signal 405, the exchanger 5 sends the base station 2a an authentication request signal 406.

In the base station 2a, upon receiving the authentication request signal 406 via the line interface 204 and the communication part 203, the processor 206 sends the personal station 1 an authentication request signal 407 via the radio part 202 and the antenna 201.

In the personal station 1, upon receiving the authentication request signal 407 via the antenna 301 and the radio part 302, the processor 309 performs an authentication calculation operation and sends the base station 2a a processed result as an authentication response signal 408 via the radio part 302 and the antenna 301.

In the base station 2a, upon receiving the authentication response signal 408 via the antenna 201 and the radio part 202, the processor 206 sends the exchanger 5 an authentication response signal 409 via the communication part 203 and the line interface 204.

Upon receiving the authentication response signal 409, the exchanger 5 performs an authentication processing for judging the appropriateness of the personal station 1.

Upon the other hand, in the personal station 1, after sending the authentication response signal 408, the processor 309 performs the message display/ringer off processing shown in FIG. 5.

As shown in FIG. 5, in the message display/ringer off processing, the processor 309 judges first if message display indication is set inside the setup signal 403 (step 501), and, if it is set, a message according to the contents of the message display indication is displayed on the display 307 (step 502).

In the present case, the message display indication is not set in the setup signal 403, the processor 309 does not perform Step 502 and does not display a message on the display 307.

Successively, the processor 309 judges if the ringer off indication is set in the setup signal 403 (step 503), and, if it is not set, the ringer 310 is made to ring (step 504).

In the present case, the ringer off indication is not set in the setup signal 403, and the processor 309 proceeds to step 504 to make the ringer 310 ring.

By this, in the personal station 1 located in the area 3a which is a call-incoming prohibited area, when there arises an urgent call-incoming mediated by the operation center 18, the ringer 310 is made to ring.

Returning to FIG. 20, in the personal station 1, when the message display/ringer off processing is ended and the subscriber of the personal station 1 answers, the processor 309 stops the ringer 310 from ringing while sending the base station 2a the alerting (calling) signal 410 and a connection signal 1401 via the radio part 302 and the antenna 301.

In the base station 2a, upon receiving the alerting signal 410 and the connection signal 1401 via the antenna 201 and the radio part 202, the processor 206 transmits an alerting signal 702 and a connection signal 1402 to the exchanger 5 via the communication part 203 and the line interface 204.

Upon receiving the alerting signal 702 and the connection signal 1402, when the result of the authentication processing shows the appropriateness of the personal station 1, the exchanger 5 transmits the connect confirmation signal 1403 to the base station 2a.

In the base station 2a, upon receiving the connection confirmation signal 1403 via line interface 204 and the communication part 203, the processor 206 sends the personal station 1 the connection confirmation signal 1404 via the radio part 202 and the antenna 201.

In the personal station 1, upon receiving the connection confirmation signal 1404 by the processor 309 via the antenna 301 and the radio part 302, connection is completed between the personal station 1 and the operation center 18 so that communication between the subscriber of the personal station 1 and an operator of the operation center 18 becomes possible.

Then, an operator of the operation center 18 informs the subscriber of the personal station 1 that the subscriber of the caller 11 needs an urgent communication, and when the subscriber of the personal station 1 consents, the operator performs a switching operation through the console for connection between the personal station 1 and the caller 11.

By this, on the switching operation of the operator, the operation center 18 switches the connection destination for the caller 11 from the operation center 18 to the personal station 1. In detail, the operation center 18 connects the communication (speech) channel which connects between the caller 11 and the exchanger 5 out of the communication channels connecting between the caller 11 and the operation center 18 and the communication channel which connects between the exchanger 5 and the personal station 1 out of the communication channels connecting between the operation center 18 and the personal station 1. As a result, the personal station 1 are connected with the caller directly so that communication between the subscriber of the personal station 1 and the subscriber of the caller 11 becomes possible.

Further, preferably, the operator of the operation center 18 may lead the subscriber of the personal station 1 to move to another place to communicate therein.

As described, according to the seventh embodiment, when there arises a call-incoming to the personal station 1 which is located in the area 3a, the service information corresponding to the area 3a, which is managed by the service information data base 9, shows that the area 3a is a call-incoming prohibited area, and therefore, the exchanger 5 performs the above-described call-incoming prohibition processing. Accordingly, in the personal station 1, when the caller 1 is not the operation center 18, the ringing tone is not made, and on the display 307 is displayed a message indicating that there has been call-incoming and the area 3a where the personal station 1 is located is a call-incoming prohibited area. When the caller is the operation center 18, it means an urgent call-incoming mediated by the operation center 18, and accordingly, a ringing tone rung, and after completion of connection with the operation center 18, connection with the true caller 11 is accomplished.

By this, the subscriber of the personal station 1 can know occurrence of a call-incoming as well as the reason why connection with the caller 11 is prohibited, that the area 3a where the personal station is located is a call-incoming prohibited area. Further, in the case of an urgent call-incoming, the subscriber of the personal station 1 can communicate with the subscriber of the caller.

In the seventh embodiment, the service information stored in the service information storage means is made to indicate that, for the predetermined areas out of the areas covered respectively by all the base stations, those areas in question are call-incoming prohibited areas. The service information, however, may show the contents of the processing to be carried out practically.

Namely, there may be shown following content of the processing: "when there arises a call-incoming to a personal station, if the caller is not the operation center 18, prohibit paging to the personal station in question and prohibit connection between that personal station and the caller, and send the personal station in question a message that there arose a call-incoming and the area in which that personal station is located is a call-incoming prohibited area".

Further, in the seventh embodiment, the service information stored in the service information storage means may show a time zone during which call-incoming to a personal station located in the areas in question is prohibited, and in that case also, the service supply means can provide similar service.

Next, the eighth embodiment will be described.

A block diagram of a movable communication system of the eighth embodiment is similar to FIG. 1.

In the above described first through seventh embodiment, there have been described the services provided by the service supply means when there arise a call-incoming to a personal station. It also can be considered that, in places where communication causes annoyance to other persons, a calling from a personal station is prohibited.

Accordingly, in the eighth embodiment, a calling from a personal station is prohibited, and each of all the base stations including the base stations 2a, 2b is provided with the above-described service information storage means, service supply means, and service content notifying means.

In the eighth embodiment, however, to prohibit a calling from a personal station, service information stored in the service information storage means is made to show that, for predetermined areas out of the areas covered respectively by all the base stations including the base stations 2a, 2b, a calling to a personal station located in those predetermined areas is prohibited, or those areas are calling prohibited areas.

FIG. 1 shows an example in which the areas 3a, 3b correspond to a concert hall 8, and accordingly, the service information stored in the service information storage means shows that the areas 3a, 3b are calling prohibited areas.

In accordance with this, in the base stations 2a, 2b, the service supply means provides service of prohibiting a calling from a personal station located in the areas 3a, 3b, calling prohibited areas. Namely, when there arises a calling from a personal station located in the areas 3a, 3b, the service supply means prohibits connection between that personal station and the call target.

Then, the service content notifying means transmits a message showing that areas 3a, 3b are calling prohibited areas, to the personal station in question.

On the other hand, in a base station covering an area on which the service information storage means does not store service information indicating a calling prohibited area, when there arises a calling from a personal station, calling service of connecting the personal station and the call target is provided to the personal station in question, which is similar to the conventional movable communication system.

Internal construction of the base stations 2a, 2b is similar to FIG. 2, and internal construction of the personal station 1 is similar to FIG. 3.

Now, there will be described operation when there arises a calling from the personal station 1.

Figure 21:
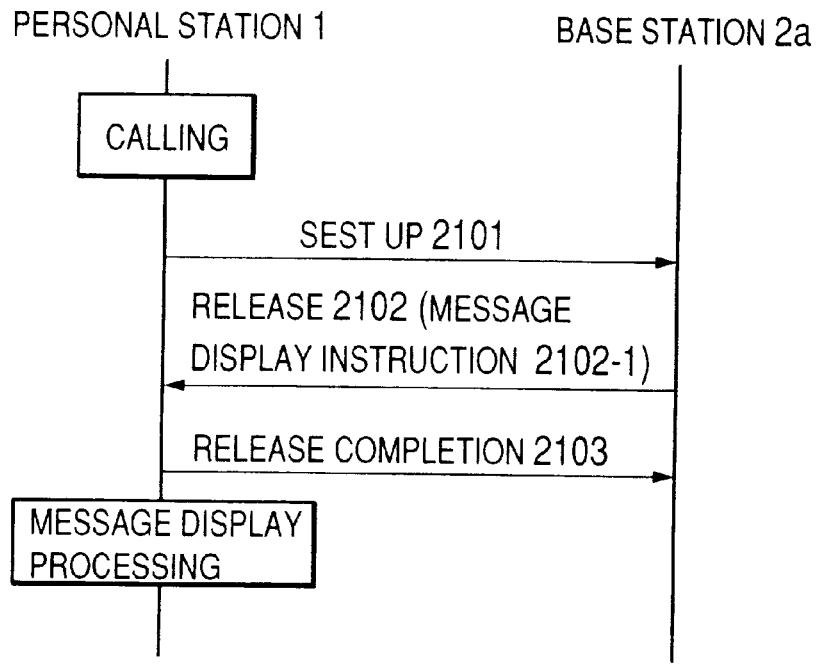
FIG. 21 is a sequence diagram showing the operation of an eighth embodiment.

As shown in FIG. 21, in the personal station 1, when there arises a calling operation (for example, input of a telephone number of a call target and calling indication through a keypad 306) by a subscriber, the processor 309 sends the base station 2a a setup signal 2101 via the radio part 302 and the antenna 301.

At the time of an ordinary calling processing, i.e. when the area 3a in which the calling personal station 1 is located is not a calling prohibited area, in the base station 2a, on receiving the setup signal 2101, the processor 206 transmits a setup signal to an exchanger 5 via the communication part 203 and the line interface 204. In the present case, however, the base station 2a covers the calling prohibited area 3a, and its memory 205 stores service information showing that fact, and therefore, the processor 206 performs a calling prohibition processing described below.

Namely, on receiving the setup signal 2101 via the antenna 201 and the radio part 202, the processor 206 sends the personal station 1 a release signal 2102 via the radio part 202 and the antenna 201. Inside the release signal 2102, there is set message display indication 2102-1 for making the personal station 1 display a message that the area 3a where the personal station 1 is located is a calling prohibited area.

In the personal station 1, upon receiving the release signal 2102 (which, in the present case, has the message display indication 2102-1 in its inside), the processor 309 sends the base station 2a a release-completed signal 2103 via the radio part 302 and the antenna 201.

In the base station 2a, upon receiving the release-completed signal 2103 via the antenna 201 and the radio part 202, the processor 206 ends the calling prohibition processing without connecting between the personal station 1 and the call target.

Figure 22:
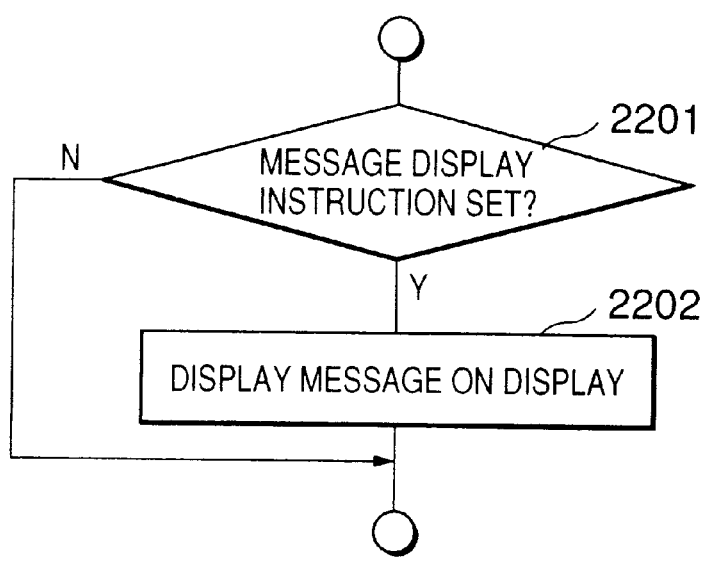
FIG. 22 is a flowchart showing message display processing which is performed by a personal station in the eighth embodiment.

On the other hand, in the personal station 1, after sending the release-completed signal 2103, the processor 309 performs a message display processing shown in FIG. 22.

As shown in FIG. 22, in the message display processing, firstly the processor 309 judges if the message display indication is set inside the release signal 2102 or not (step 2201), and if it is set, a message according to the contents of the message display indication is displayed on the display 307 (step 2202).

In the present case, the message display indication 2102-1 has been set inside the release signal 2102, and therefore, the processor 309 proceeds to step 2202, and, on the display 307, there is displayed a message that the area 3a in which the personal station 1 is located is a calling prohibited area.

By this, in the personal station 1 located in the area 3a which is a calling prohibited area, when a subscriber performs a calling operation, connection is not made with a call target, and, on the display 307, there is displayed a message that the area 3a in which the personal station 1 is located is a calling prohibited area.

As described above, according to the eighth embodiment, when there arises a calling from a personal station 1 located in the area 3a covered by the base station 2a, the base station 2a performs the above-described calling prohibition processing because, the memory 205 stores the service information showing the area 3a is a calling prohibited area. In accordance with this, in the personal station 1, there is only displayed a message that the area 3a in which the personal station 1 is located is a calling prohibited area, on the display 307, and the connection between the personal station and the call target is prohibited.

As a result, the subscriber of the personal station 1 knows the reason why the connection with the call target has been prohibited, namely the fact that the area 3a in which the personal station 1 is located is a calling prohibited area.

Next, the ninth embodiment will be described.

According to the above-described eighth embodiment, each of all the base stations including the base station 2a, 2b is provided with the above-described service information storage means, service supply means, and service content notifying means. In the ninth embodiment, however, a movable communication network 4 is equipped with these means.

A block diagram for the movable communication system of the ninth embodiment is similar to FIG. 6.

In the ninth embodiment, however, service information stored in the service information storage means (i.e., service information managed by the service information data base 9) is made to show that, for predetermined areas out of the areas covered respectively by all the base stations including the base stations 2a, 2b, a calling from a personal station located in those areas is prohibited, or, those areas are calling prohibited areas.

FIG. 6 shows an example in which the areas 3a, 3b correspond to a concert hall 8, and accordingly, in the service information data base 9, the service information corresponding to the areas 3a, 3b shows that those areas are calling prohibited areas.

Accordingly, in the movable communication network 4, when there arises a calling from a personal station located in the areas 3a, 3b which are calling prohibited areas, the service supply means provides such service that the calling from that personal station is prohibited. Namely, when there arises a calling from a personal station located in the areas 3a, 3b, the service supply means prohibits connection between the personal station in question and a call target.

Then, the service content notifying means transmits a message showing that the areas 3a, 3b are calling prohibited areas to the personal station in question.

On the other hand, in the movable communication network 4, when there arises a calling from a personal station located in an area for which the service information data base 9 does not manage service information indicating a calling prohibited area, calling service of connecting the personal station and a call target, which is similar to the conventional movable communication system, is provided to the personal station in question.

Further, practically, the service supply means and the service content notifying means are implemented by the operation of the exchanger 5.

Internal construction of the base stations 2a, 2b is similar to FIG. 2, and internal construction of the personal station is similar to FIG. 3.

Now, operation in the case of calling from the personal station will be described.

Figure 23:
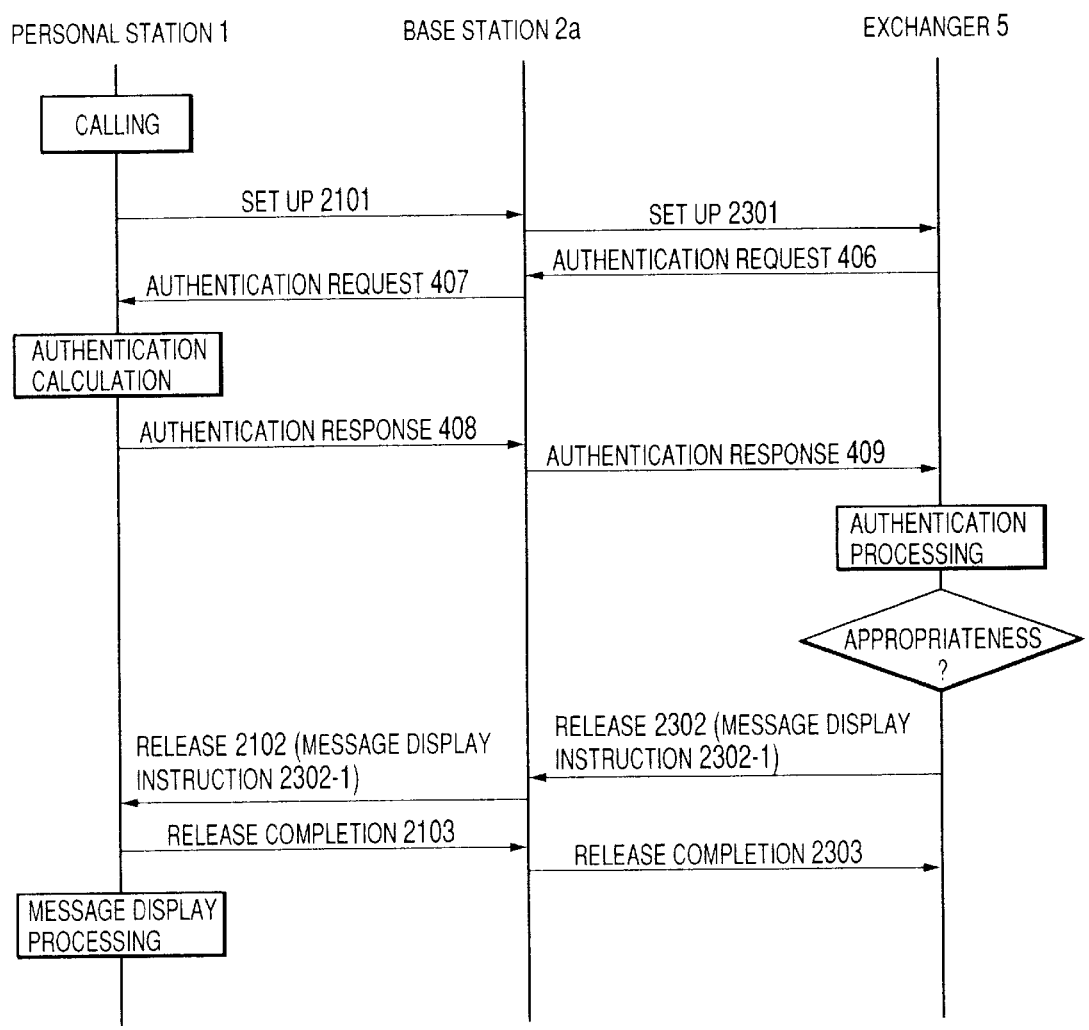
FIG. 23 is a sequence diagram showing the operation of a ninth embodiment.

As shown in FIG. 23, in the personal station 1, on a calling operation by a subscriber (for example, input of a telephone number of a call target and calling indication through the keypad 306), the processor 309 sends the base station 2a a setup signal 2101 via the radio part 302 and the antenna 301.

In the base station 2a, on receiving the setup signal 2101 via the antenna 201 and the radio part 202, the processor 206 transmits a setup signal 2301 to the exchanger 5 via the communication part 203 and the line interface 204.

Upon receiving the setup signal 2301, the exchanger 5 transmits an authentication request signal 406 to the base station 2a.

In the base station 2a, upon receiving the authentication request signal 406 via the line interface section 204 and the communication part 203, the processor 206 sends the personal station 1 an authentication request signal 407 via the radio part 202 and the antenna 201.

In the personal station 1, on receiving the authentication request signal 407 via the antenna 301 and the radio part 302, the processor 309 performs an authentication operation and sends the base station 2a the processed result as an authentication response signal 408 via the radio part 302 and the antenna 301.

In the base station 2a, upon receiving the authentication response signal 408 via the antenna 201 and the radio part 202, the processor 206 transmits an authentication response signal 409 to the exchanger 5 via the communication part 203 and the line interface 204.

On receiving the authentication response signal 409, the exchanger 5 performs an authentication processing for judging the appropriateness of the personal station 1. When the result of the authentication processing shows the appropriateness of the personal station 1, the exchanger 5 reads the service information corresponding to the area 3a in which the personal station 1 is located from the service information data base 9. In fact, the exchanger 5 recognizes that the area in which the personal station 1 as the caller is the area 3a covered by the base station 2a because the sender of the setup signal 2301 is the base station 2a. In the present case, since the area 3a in which the personal station 1 is located is a calling prohibited area, in the service information data base 9, the service information corresponding to the area 3a shows to that effect.

Then, the exchanger 5 performs a calling prohibition processing described in the following.

Namely, in the calling prohibition processing in the ninth embodiment, the exchanger 5 transmits a release signal 2302 to the base station 2a covering the area 3a. Inside the release signal 2302, there is set message display indication 2302-1 for making the personal station 1 display a message that the area 3a in which the personal station 1 is located is a calling prohibited area.

In the base station 2a, upon receiving the release signal 2302 (which, in the present case, has the message display indication 2302-1 in its inside) via the line interface 204 and the communication part 203, the processor 206 sends the personal station 1 a release signal 2102 via the radio part 202 and the antenna 201.

In the personal station 1, upon receiving the release signal 2102 (which, in the present case, has the message display indication 2302-1 in its inside), the processor 309 sends the base station 2a a release-completed signal 2103 via the radio part 302 and the antenna 301.

In the base station 2a, upon receiving the release-completed signal 2103 via the antenna 201 and the radio part 202, the processor 206 transmits a release-completed signal 2303 to the exchanger 5 via the communication part 203 and the line interface 204.

Upon receiving the release-completed signal 2303, the exchanger 5 ends the calling prohibition processing without connecting between the personal station 1 and the call target.

On the other hand, in the personal station 1, after sending the release-completed signal 2103, the processor 309 performs a message display processing shown in FIG. 22.

As shown in FIG. 22, in the message display processing, the processor 309 firstly judges if the message display indication is set inside the release signal 2103 or not (step 2201), and, when it is set, the processor 309 displays a message according to the contents of the message display indication on the display 307 (step 2202).

In the present case, since the message display indication 2302-1 is set inside the release signal 2103, the processor proceeds to step 2202, and displays a message showing that the area 3a in which the personal station 1 is located is a calling prohibited area, on the display 307.

By this, in the personal station 1 located in the area 3a which is a calling prohibited area, when a subscriber performs a calling operation, connection with a call target is not made, and, on the display 307, there is displayed a message that the area 3a in which the personal station is located is a calling prohibited area.

As described above, according to the ninth embodiment, when there arises a calling from the personal station 1 located in the area 3a, the service information corresponding to the area 3a, which is managed by the service information data base 9, shows that the area is a calling prohibited area, and therefore, the exchanger 5 performs the above-described calling prohibition processing. Accordingly, in the personal station 1, on the display 307 is displayed only a message showing that the area 3a in which the personal station 1 is located is a calling prohibited area and that the connection between the personal station 1 and the call target is prohibited.

As a result, the subscriber of the personal station 1 recognizes the reason why connection with the call target has been prohibited, i.e. the fact that the area 3a in which the personal station 1 is located is a calling prohibited area.

Further, in the above-described eighth and ninth embodiments, the service information stored in the service information storage means is made to indicate that, for the predetermined areas out of the areas covered respectively by all the base stations, those areas in question are calling prohibited areas. The service information, however, may show the contents of the processing to be carried out practically.

Namely, there may be shown following contents of the processing: "when there arises a calling from a personal station, prohibit connection between that personal station and the call target, and send the personal station in question a message that the area in which that personal station is located is a calling prohibited area".

Next, the tenth embodiment will be described.

In the above-described eighth and ninth embodiments, for prohibiting a calling from a personal station, the service information stored in the service information storage means is made to indicate that, for predetermined areas out of the areas covered respectively by all the base stations, the areas in question are calling prohibited areas. On the other hand, in the tenth embodiment, the service information is made to indicate a calling prohibited time zone during which a calling from a personal station located in the areas in question is prohibited.

Further, a movable communication system of the tenth embodiment is provided with the above-described service information storage means, service supply means, and service content notifying means in the ovable communication network 4.

A block diagram for the movable communication system of the tenth embodiment is similar to FIG. 8.

In the tenth embodiment, however, the service information stored in the service information storage means (i.e., the service information managed by a service information data base 9) is made to indicate the calling prohibited time zone during which, for predetermined areas out of the areas covered respectively by all the base stations including base stations 2a, 2b, a calling from a personal station located in those areas in question is prohibited.

FIG. 8 shows the example in which the areas 3a, 3b correspond to a concert hall 8. Accordingly, in the service information data base 9, the calling prohibited time zone indicated by the service information corresponding to the areas 3a, 3b is a time zone for presentation in the concert hall 8.

In the movable communication network 4, when there arises a calling from a personal station located in the areas 3a, 3b, the service supply means provides service of prohibiting the calling from that personal station if the time belongs to the calling prohibited time zone indicated by the service information corresponding to the areas 3a, 3b. Namely, when there arises a calling from a personal station located in the area 3a, 3b, the service supply means prohibits connection between the personal station in question and a call target if the time belongs to the time zone for presentation in the concert hall 8.

Then, the service content notifying means transmits a message indicating that the areas 3a, 3b is in the calling prohibited time zone and indicating the time when the calling prohibited time zone ends (the time when presentation in the concert hall 8 is to end), to the personal station in question.

On the other hand, even in the case that there arises a calling from a personal station located in the areas 3a, 3b, if that time is not in the calling prohibited time zone shown by the service information corresponding to the areas 3a, 3b, the service supply means does not provide service of prohibiting a calling from the personal station in question. Accordingly, in the movable communication network 4, a calling service of connecting the personal station in question with a call target, which is similar to the conventional movable communication system, is provided to the personal station in question.

Further, in the movable communication network 4, when there arises a calling from a personal station located in an area for which the service information data base 9 does not manage service information indicating a calling prohibited time zone, calling service of connecting the personal station in question with a call target, which is similar to the conventional movable communication system, is provided to that personal station.

Further, practically, the service supply means and the service content notifying means are implemented by the operation of the exchanger 5.

Internal construction of the base station 2a, 2b is similar to FIG. 2, and internal construction of the personal station 1 is similar to FIG. 3.

Now, there will be described operation in the case that there arises a calling from the personal station 1 during presentation in the concert hall 8.

As shown in FIG. 23, in the personal station 1, when a subscriber performs a calling operation (for example, input of a telephone number of a call target and calling indication through the keypad 306), the processor 309 sends the base station 2a a setup signal 2101 via the radio part 302 and the antenna 301.

In the base station 2a, on receiving the setup signal 2101 via the antenna 201 and the radio part 202, the processor 206 transmits a setup signal 2301 to the exchanger 5 via the communication part 203 and the line interface 204.

On receiving the setup signal 2301, the exchanger 5 transmits the authentication request signal 406 to the base station 2a.

In the base station 2a, on receiving the authentication request signal 406 via the line interface 204 and the communication part 203, the processor 206 sends the personal station 1 the authentication request signal 407 via the radio part 202 and the antenna 201.

In the personal station 1, on receiving the authentication request signal 407 via the antenna 301 and the radio part 302, the processor 309 performs the authentication operation and sends the base station 2a the processed result as the authentication response signal 408 via the radio part 302 and the antenna 301.

In the base station 2a, on receiving the authentication response signal 408 via the antenna 201 and the radio part 202, the processor 206 transmits the authentication response signal 409 to the exchanger 5 via the communication part 203 and the line interface 204.

On receiving the authentication response signal 409, the exchanger 5 performs the authentication processing for judging the appropriateness of the personal station 1. If the processed result of the authentication processing shows that the personal station 1 is valid, the exchanger 5 reads service information corresponding to the area 3a in which the personal station 1 is located, from the service information data base 9. Since the sender of the setup signal 2301 is the base station 2a, the exchanger 5 can recognize that the area in which the personal station 1 as the caller is located is the area 3a covered by the base station 2a. In the present case, the area 3a in which the personal station 1 is located corresponds to the concert hall 8, and accordingly, in the service information data base 9, the calling prohibited time zone shown by the service information corresponding to the area 3a is the time zone for presentation in the concert hall 8.

In the tenth embodiment, contents provided to the personal station 1 change depending on if the time of a calling from the personal station 1 belongs to the calling prohibited time zone or not. Accordingly, the exchanger 5 performs a service contents judging processing shown in FIG. 24.

Figure 24:
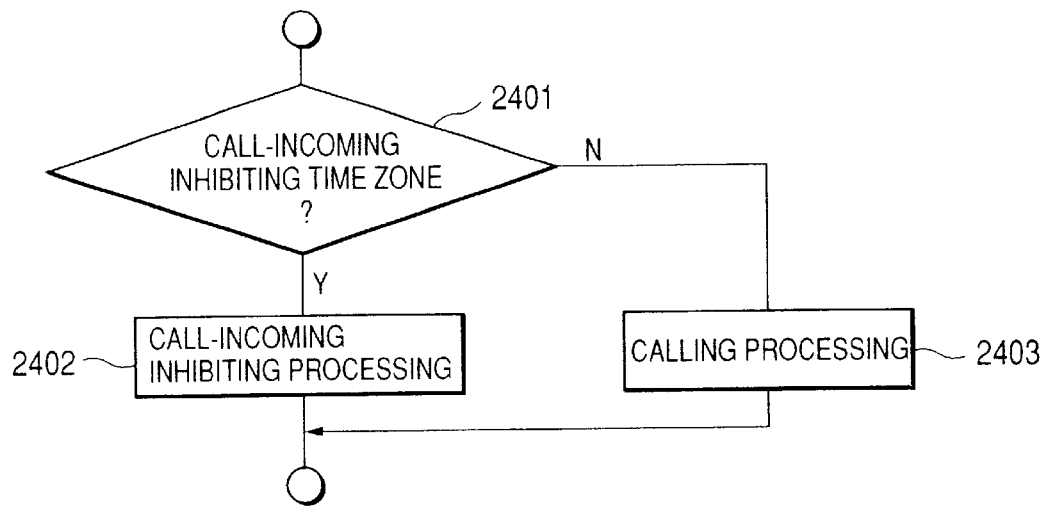
FIG. 24 is a flowchart showing service content judgment processing which is performed by an exchanger in a tenth embodiment.

As shown in FIG. 24, the exchanger 5 judges if the time of the calling from the personal station belongs to the calling prohibited time zone or not (step 2401). If the time belongs to the calling prohibited time zone, meaning that the concert hall 8 is used for presentation, the calling prohibition processing described below is performed (step 2402).

On the other hand, if the time of a calling from the personal station does not belong to the calling prohibited time zone, meaning that the concert hall 8 is not used for presentation, the ordinary calling processing is carried out (step 2403).

In the present case, although the calling prohibition processing is similar to the calling prohibition processing described referring to FIG. 23, contents set inside a release signal 2302 to be transmitted from the exchanger 5 to the base station 2a. Namely, the exchanger 5 transmits, to the base station 2a covering the area 3a, the release signal 2302, inside which a message display indication is set for making the personal station 1 display a message showing that the area 3a in which the personal station 1 is located is in the calling prohibited time zone and showing the time when the calling prohibited time zone is to end.

As a result, according to the tenth embodiment, in the personal station 1 located in the area 3a, when a subscriber performs a calling operation at the time of presentation in the concert hall 8, there is only displayed a message showing that the area 3a in which the personal station 1 is located is in the calling prohibited time zone and showing the time when the calling prohibited time zone is to end, on the display 307, and connection between the personal station 1 and a call target is prohibited.

By this, the subscriber of the personal station 1 can know the reason why connection with the call target has been prohibited, or the fact that the personal station 1 is located in the area 3a which is in the calling prohibited time zone. Further, the subscriber of the personal station 1 can know the time when the calling prohibited time zone is to end, i.e. the time when a calling from the personal station becomes possible.

Further, in the tenth embodiment, the service information stored in the service information storage means is made to show, for predetermined areas out of the areas covered respectively by all the base stations, the calling prohibited time zone, i.e., the time zone during which a calling from a personal station located in the areas in question is prohibited. The service information, however, may show the contents of the processing to be carried out practically.

Namely, there may be shown following contents of the processing: "when there arises a calling from a personal station, if the time belongs to the calling prohibited time zone, prohibit connection between that personal station and the call target, and send the personal station in question a message showing that the area in which that personal station is located is in the calling prohibited time zone and showing the time when the calling prohibited time zone is to end".

Next, the eleventh embodiment will be described.

In the above-described eighth through tenth embodiments, connection with a call target is prohibited for all personal stations located in calling prohibited areas or in the areas in calling prohibited time zones. On the other hand, in the eleventh embodiment, the ordinary calling operation is performed and connection with a call target is realized for particular personal stations located in calling prohibited areas or in areas in calling prohibited time zones.

A block diagram for the eleventh embodiment is similar to FIG. 12.

In the eleventh embodiment, however, the service information stored in the service information storage means (i.e., the service information managed by the service information data base 9) is made to show that, for predetermined areas out of the areas covered respectively by all the base stations including the base stations 2a, 2b, a calling from a personal station located in the areas in question is prohibited, i.e., to show if an area in which a personal station is located is a calling prohibited area.

FIG. 12 shows an example in which the areas 3a, 3b correspond to an art gallery. Accordingly, in the service information data base 9, the service information corresponding to the areas 3a, 3b indicates that the areas are calling prohibited areas.

Further, in the eleventh embodiment, a subscriber data base 15 is manages subscriber information showing, for each of all the personal stations including the personal station 1, calling prohibited areas in which the calling from the personal station in question is not prohibited. Or, for areas for which the service information data base 9 manages the service information showing that those areas are calling prohibited areas, the subscriber data base 15 may manage information indicating personal stations from which a calling is not prohibited in the areas in question.

In FIG. 12, the subscriber of the personal station 1 is assumed to be a member of the staff of the art gallery 16, and accordingly, in the subscriber data base 15, the subscriber information corresponding to the personal station 1 shows that a calling in the areas 3a, 3b is not prohibited.

In a movable communication network 4, when there arises a calling from a personal station located in the areas 3a, 3b which are calling prohibited areas, a service supply means provides service of prohibiting the calling from that personal station unless the subscriber information corresponding to that personal station shows that a calling in the areas 3a, 3b is not prohibited. In other words, when there arises a calling from a personal station located in the areas 3a, 3b, the service supply means prohibits connection between the personal station in question and a call target, if the subscriber information corresponding to that personal station does not show that a calling in the areas 3a, 3b is not prohibited.

Then, a service content notifying means transmits a message showing that the areas 3a, 3b are calling prohibited areas, to the personal station in question.

Even when there arises a calling from a personal station located in the areas 3a, 3b, the service supply means does not provide service of prohibiting a calling from the personal station in question if the subscriber information corresponding to that personal station shows that a calling in the areas 3a, 3b is not prohibited. In that case, in the movable communication network 4, there is provided such calling service that the personal station in question is connected with a call target, which is similar to the conventional movable communication system.

Further, in the movable communication network 4, when there arises a calling from a personal station located in an area for which the service information data base 9 does not manage service information indicating a calling prohibited area, there is provided such calling service that the personal station in question is connected with a call target, which is similar to the conventional movable communication system.

Practically, the service supply means and the service content notifying means are implemented by the operation of the exchanger 5.

Internal construction of the base stations 2a, 2b is similar to FIG. 2, and internal construction of the personal station 1 is similar to FIG. 3.

Now, there will be described operation when there arises a calling from the personal station 1.

As shown in FIG. 23, in the personal station 1, when a subscriber performs a calling operation (for example, input of a telephone number of a call target and calling indication through the key pad 306), the processor 309 sends the base station 2a a setup signal 2101 via the radio part 302 and the antenna 301.

In the base station 2a, on receiving the setup signal 2101 via the antenna 201 and the radio part 202, the processor 206 transmits a setup signal 2301 to the exchanger 5 via the communication part 203 and the line interface 204.

Upon receiving the setup signal 2301, the exchanger 5 transmits the authentication request signal 406 to the base station 2a.

In the base station 2a, on receiving the authentication request signal 406 via the line interface 204 and the communication part 203, send the personal station 1 the authentication request signal 407 via the radio part 202 and the antenna 201.

In the personal station 1, upon receiving the authentication request signal 407 via the antenna 301 and the radio part 302, the processor 309 performs an authentication operation, and sends the base section 2a the processed result as the authentication response signal 408 via the radio part 302 and the antenna 301.

In the base section 2a, upon receiving the authentication response signal 408 via the antenna 201 and the radio part 202, transmits the authentication response signal 409 to the exchanger 5 via the radio part 203 and the line interface 204.

Upon receiving the authentication response signal 409, the exchanger 5 performs an authentication processing for judging the appropriateness of the personal station 1. When the processed result of the authentication processing shows the appropriateness of the personal station 1, the exchanger 5 reads the service information corresponding to the area 3a in which the personal station is located, from the service information data base 9. Since the sender of the setup signal 2301 is the base station 2a, the exchanger 5 recognizes that the area in which the personal station 1 as a caller is located is the area 3a covered by the base station 2a. In the present case, the area 3a in which the personal station 1 is located corresponds to the art gallery 16, in the service information data base 9, the service information corresponding to the area 3a indicates a calling prohibited area.

Successively, the exchanger 5 reads the subscriber information corresponding to the personal station 1 from the subscriber data base 15. In the present case, the subscriber of the personal station 1 is a member of the staff of the art gallery 16, the subscriber information corresponding to the personal station 1 indicates that a calling in the areas 3a, 3b is not prohibited.

In the eleventh embodiment, even though the area 3a in which the personal station 1 is located is a calling prohibited area, the contents provided to the personal station 1 change depending on if the personal station 1 is the particular personal station in the area 3a. Accordingly, the exchanger 5 performs a service contents judging processing shown in FIG. 25.

Figure 25:
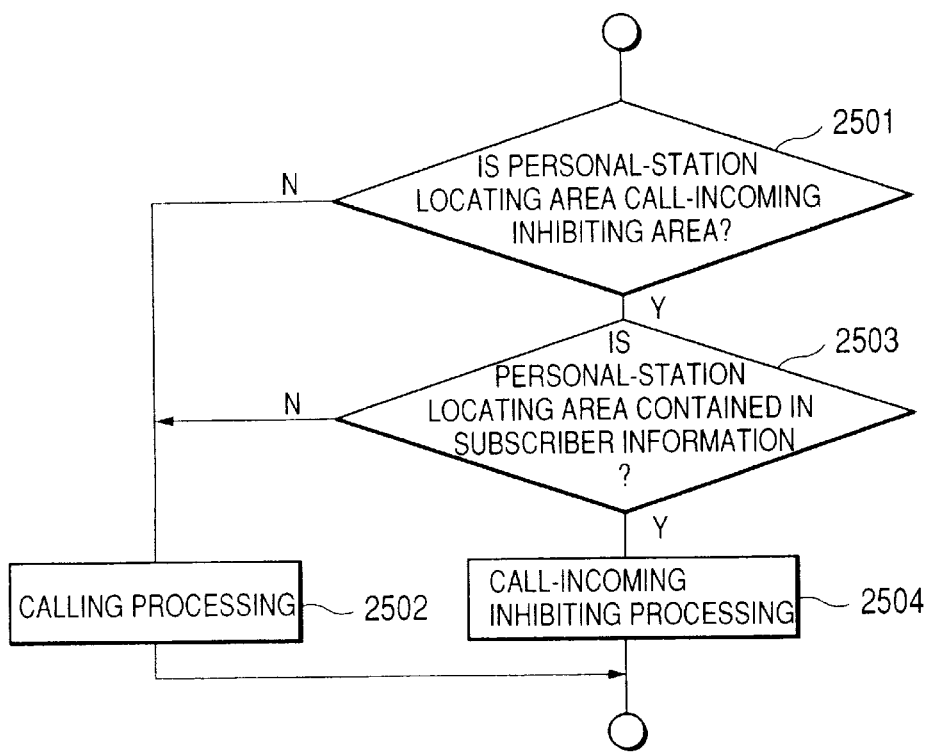
FIG. 25 is a flowchart showing a service content judgment processing which is performed by an exchanger in an eleventh embodiment.

As shown in FIG. 25, the exchanger 5 judges if the area 3a in which the personal station 1 is located is a calling prohibited area or not (step 2501).

When the area 3a in which the personal station 1 is located is not a calling prohibited area, the ordinary calling processing is carried out for connecting between the personal station 1 and a call target (step 2502). On the other hand, when the area 3a in which the personal station 1 is located is a calling prohibited area, the exchanger judges if the area 3a as a calling prohibited area is included in the subscriber information corresponding to the personal station 1 or not (step 2503).

When it is included, meaning the personal station 1 is the particular personal station in the area 3a, the ordinary calling processing is carried out for connecting the personal station 1 with the call target (step 2502). On the other hand, when it is not included, a calling prohibition processing is carried out for prohibiting connection between the personal station 1 and the call target (step 2504).

The calling prohibition processing carried out in Step 2504 is similar to the one described referring to FIG. 23.

In the present case, since the subscriber of the personal station is a member of the staff of the art gallery 16, and the personal station 1 is the particular subscriber in the area 3a, the exchanger 5 performs the ordinary calling processing to connect the personal station with the call target.

Namely, the exchanger 5 alerts the call target, and, when a subscriber of the call target answers, the exchanger 5 transmits a call signal and answer signal to the personal station 1 via the base station 2a. In the personal station 1, when the processor 309 receives the call signal and answer signal via the antenna 301 and the radio part 302, the personal station 1 is connected with the call target so that it becomes possible to communicate between the subscriber of the personal station 1 and the subscriber of the call target.

As described, according to the eleventh embodiment, when there arises a calling from the personal station 1 located in the area 3a, the exchanger 5 performs the above-described ordinary calling processing because, although the service information managed by the service information data base 9, which corresponds to the area 3a, indicates a calling prohibited area, the subscriber information managed by the subscriber data base 15, which corresponds to the personal station 1, indicates that a calling in the area 3a is not prohibited. Thus, although the area 3a in which the personal station 1 is located is a calling prohibited area, the personal station 1 is connected with the call target if the personal station 1 is the particular personal station in the area 3a.

In the eleventh embodiment, the service information stored in the service information storage means is made to indicate that, for the predetermined areas out of the areas covered respectively by all the base station, the areas in question are calling prohibited areas. The service information, however, may indicate contents of processing carried out practically.

Namely, there may be shown following contents of the processing: "when there arises a calling from a personal station other than the particular personal stations, prohibit connection between that personal station and the call target, and send the personal station in question a message showing that the area in which that personal station is located is a calling prohibited area".

Further, in the eleventh embodiment, the service supply means may provide similar service by making the service information stored in the service information storage means indicate a calling prohibited time zone during which a calling from a personal station located in the areas in question is prohibited.

Next, the twelfth embodiment will be described.

Figure 26:
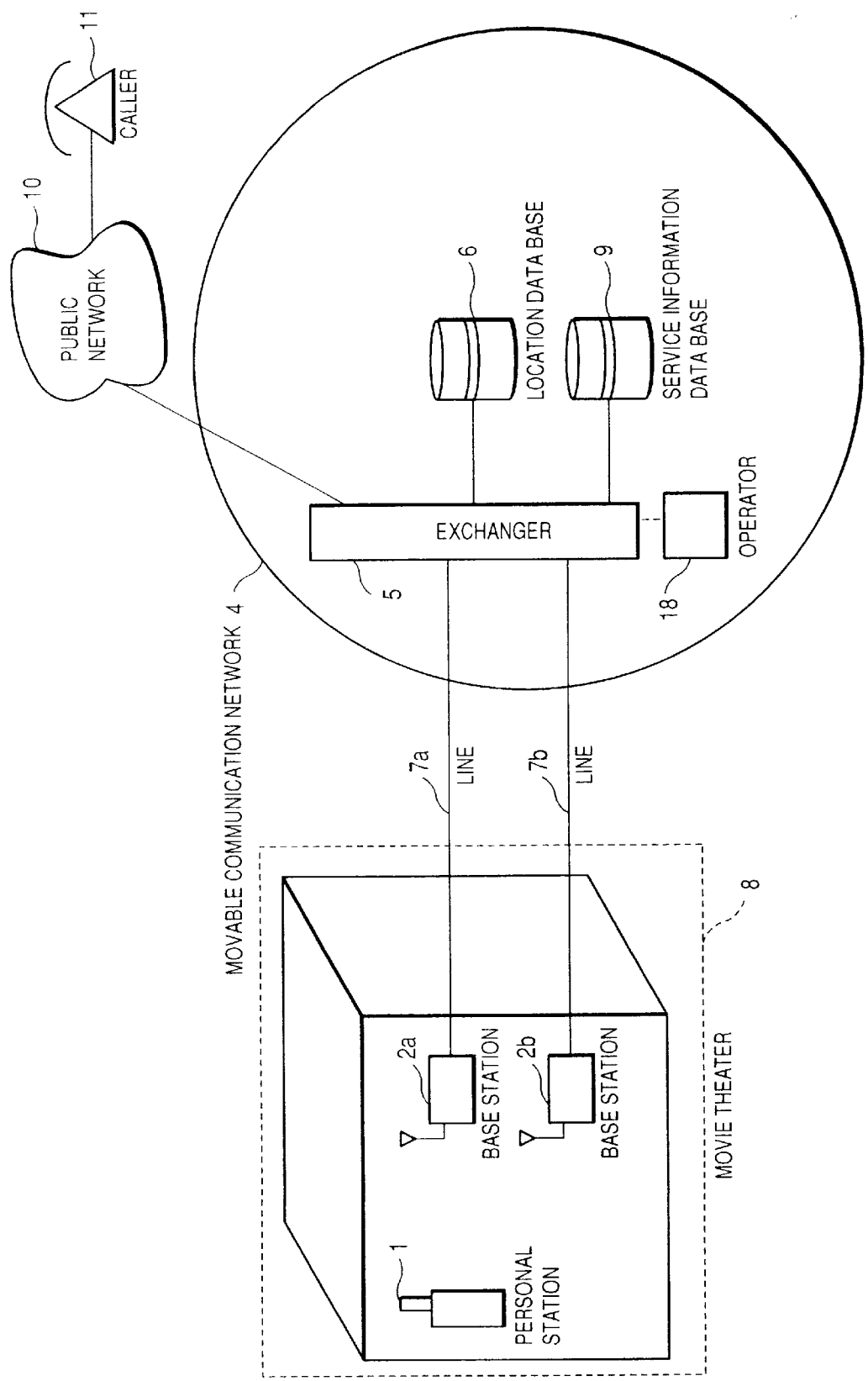
FIG. 26 is a diagram showing a movable communication system according to a twelfth embodiment of the present invention.
Figure 27:
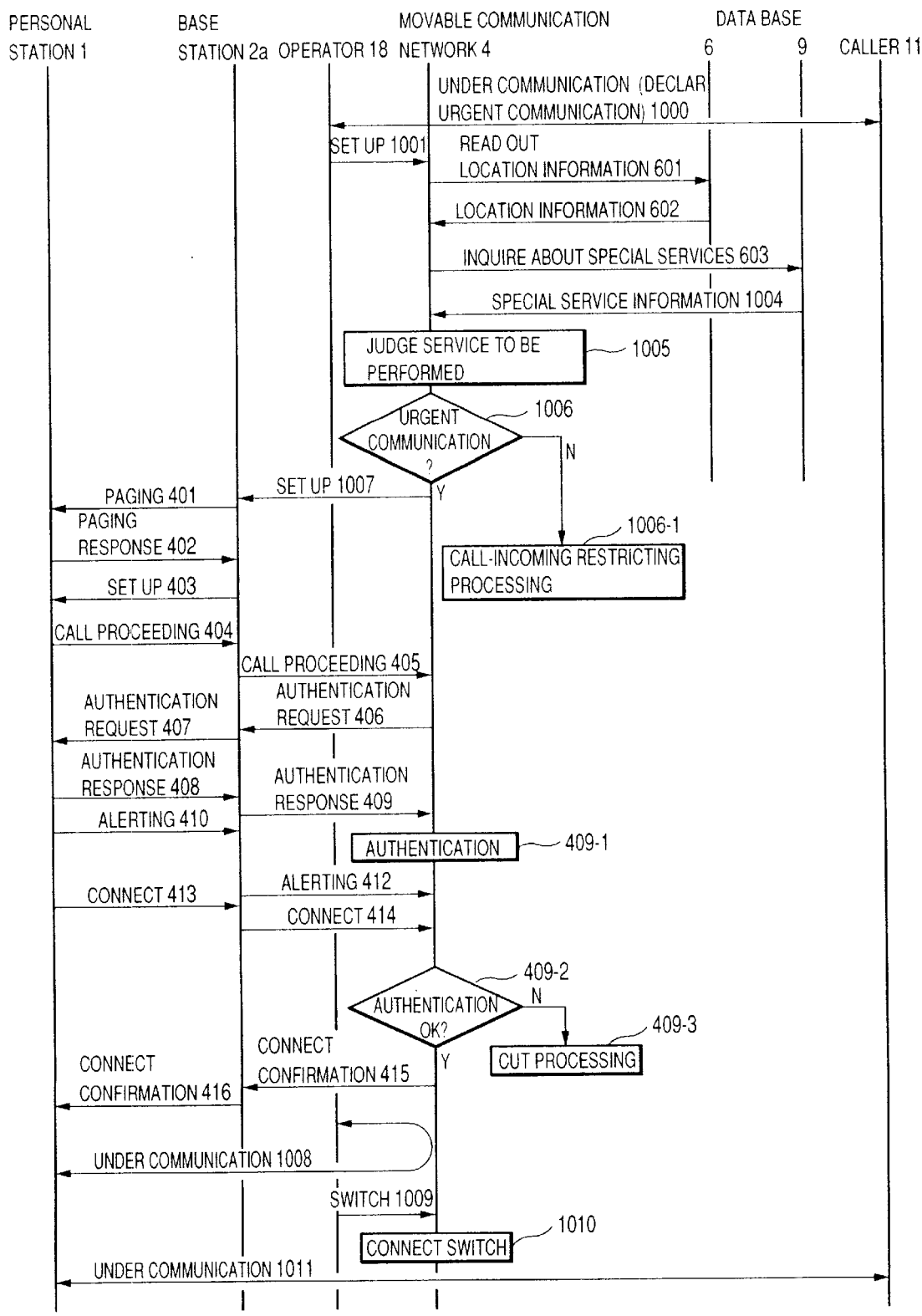
FIG. 27 is a flowchart in the twelfth embodiment.

In FIG. 26, a personal station 1 is located in a concert hall or movie theater 8, and a call-incoming is regulated. Here, for example, there will be described service in the case of requiring an urgent call-incoming, referring to FIG. 27. As shown in FIG. 27, firstly a caller 11 phones to an operator 18 of a movable communication network 4, and there exist a state of being under communication 1000 between the operator 18 and the caller 11. At this point, the caller 11 declares urgent communication to the operator 18 to the effect that he wishes to have urgent communication with a personal station 1 located inside the concert hall or movie theater 8 where a call-incoming is regulated. Upon receiving the declaration of the urgent communication 1000, the operator 18 sends the movable communication network 4 a setup 1001 for the personal station 1. Upon receiving the setup 1001 from the operator 18, the movable communication network 4 reads 601 location information from a location data base 6 as in the ordinary sequence to obtain the location information 602 of the personal station 1. The location information 602 describes that the personal station 1 is located in the concert hall or movie theater 8, i.e., within service areas of base station 2a and 2b. Successively, the movable communication network 4 makes an inquiry 603 about special service to a data base 9 storing service information regarding the location information. Having read the special service information 1004 from the data base 9, the movable communication network 4 performs effective service judgment 1005. At this point, the movable communication network 4 judges 1006 if the setup 801 in question is an urgent communication or not, and, if it is not an urgent communication, performs a call-incoming to page processing 1006-1. When the setup 1001 in question is an urgent communication, the movable network 4 sends the base station 2a a setup 1007. The base station 2a sends the personal station 1 a call-incoming 401 as in the time of the ordinary call-incoming. Upon receiving the call-incoming 401, the personal station 1 sends the base station 2a a call-incoming response 402 as in the time of the ordinary call-incoming. Responding to it, the base station 2a sends the personal station 1 a setup 403, and the personal station 1 sends the base station 2a a call proceeding 404 as in the time of the ordinary call-incoming. Upon receiving the call proceeding 404, the base station 2a sends the movable communication network 4 a call proceeding 405. The movable communication network 4 sends the base station 2a an authentication request 406, and the base station 2a sends the personal station 1 the authentication request 407. Upon receiving the authentication request 407, the personal station 1 performs an authentication calculation operation as in the time of the ordinary call-incoming, and the personal station 1 sends the base station 2a the processed result as an authentication response 408. Upon receiving the authentication response 408, the base station 2a performs an authentication 409-1. The personal station 1 sends the base station 2a an alerting 410 and a connection 413 following the authentication response 408. Upon receiving the alerting 410 and the connection 413 from the personal station 1, the base station 2a sends the movable communication network 4 an alerting 412 and a connection 414 as in the time of the ordinary call-incoming. At this point, the movable communication network 4 performs a judgment of the authentication result 409-2, and, when the authentication is carried out correctly, sends the base station 2a a connection confirmation 415, and, when the authentication is not carried out correctly, performs a disconnection processing 409-3. On receiving the connection confirmation 415 from the movable communication network 4, the base station 2a sends the personal station 1 a connection confirmation 416, and the operator 18 and the personal station 1 become under communication 1008. At this point, the operator 18 sends the movable communication network 4-1 a switching 1009 to switch the communication in question to one between the caller 11 and the personal station 1. The movable communication network 4 performs a connection switching 1010, so that switching is carried out to realize communication between the caller 11 and the personal station 1.

Next, the thirteenth embodiment will be described.

In FIG. 28, a personal station 1 is located inside a restaurant 8-2 in which special service is provide. The restaurant 8-2 consists of a dining room 8-2-2 covered by base stations 2a, 2b and a lobby 8-2-1 covered by a base station 2c. Although the personal station 1 can receive a call signal of a call-incoming inside the dining room 8-2-2, real communication is impossible unless it moves to the lobby 8-1-1 covered by the base station 2c. Now, in FIG. 29A, when there arises a call-incoming (setup 400) to the personal station 1 from the caller 11 via a public network 10, the movable communication network 4 performs a location information reading 601 from the data base 6 to read the location information 602 of the personal station 1. The location information 602 describes that the personal station 1 is located in the dining room 8-2-2 of the restaurant 8-2, i.e., within the service areas of the base stations 2*a* and 2*b*. The movable communication network 4 makes an inquiry 603 about the special service to the data base 9 in which the service information on the location information is stored. Having read the special service information 1204 from the data base 9, the movable communication network 4 performs an effective service judgment 1205. The special service information 1204 describes that, although, for the service concerning the base stations 2*a* and 2*b*, a call signal of a call-incoming can be received inside the dining room 8-2-2, real communication is impossible if not moving to the lobby 8-1-1 covered by the base station 2*c*. The movable communication network 4 performs a setup 400-1 as in the time of the ordinary call-incoming. The base station 2*a* and base station 2*b* send the personal station 1 a paging signal 401-1 and a paging signal 401-2 according to a program stored in advance.

When the personal station 1 is located in the service area of the base station 2*b*, the personal station receives the paging signal 401-2 from the base station 2*b*. On receiving the paging signal 401-2, the personal station 1 sends the base station 2*b* a call-incoming response 402 according to a program stored in advance. Responding to it, the base station 2*b* sends the personal station 1 a setup 403, and the personal station 1 sends the base station 2*b* a call proceeding 404 as in the time of the ordinary call-incoming. On receiving the call proceeding 404, the base station 2*b* sends the movable communication network 4 a call proceeding 405. The movable communication network 4 sends the base station 2*b* an authentication request 406 as in the ordinary call-incoming, and the base station 2*b* sends the personal station 1 an authentication request 407. The authentication request 407 is received by the personal station 1, and the personal station 1 sends the base station 2*b* the result of the authentication operation in the personal station 1 as an authentication response 408, as in the time of the ordinary call-incoming. On receiving the authentication response 408, the base station 2*b* performs an authentication 409-2. The personal station 1 sends the base station 2*b* an alerting 410 and a connection 413 following the authentication response 408. On receiving the alerting 410 and the connection 413 from the personal station 1, the base station 2*b* sends the movable communication network 4 an alerting 412 and a connection 414 as in the time of the ordinary call-incoming. At this point, the movable communication network 4 performs a judgment of the authentication result 409-2, and, when the authentication is carried out correctly, sends the base station 2*b* a connection confirmation 415, and, when the authentication is not carried out correctly, performs a disconnection processing 409-3. On receiving the connection confirmation 415 from the movable communication network 4, the base station 2*b* sends the personal station 1 a connection confirmation 416. By this, the personal station 1 and the movable communication network 4 become under communication 1219-2. The movable communication network 4, however, performs a call-hold connection 1218, so that the caller 11 and the personal station 1 is not connected directly, and it becomes a state that direct communication between the caller 11 and the personal station 1 is not established. In this state, the personal station 1 moves to the lobby 8-1 (1220). Since the lobby 8-1 is covered by the base station 2*c*, the personal station 1 transmits a setup 1221 to the base station 2*c*. On receiving the setup 1221, the base station 2*c* sends the movable communication network 4 a setup 1222. Responding to it, the movable communication network 4 sends the base station 2*c* a call proceeding 1223 and a connection 1225. On receiving the call proceeding 1223 and the connection 1225, the base station 2*c* sends the personal station 1 a call proceeding 1224 and a connection 1226. On receiving the connection 1226, the personal station 1 sends the base station 2*c* a connection confirmation 1227 so that it becomes in a communication state. On receiving the connection confirmation 1227, the base station 2*c* sends the movable communication network 4 a connection confirmation 1228. On receiving the connection confirmation 1228, the movable communication network 4 connects the communication channel which has been in the call-hold connection, by means of a communication channel connection 1229 so that communication is established between the personal station 1 and the caller 11, and it becomes a state of being under communication 1230.

Figure 29A:
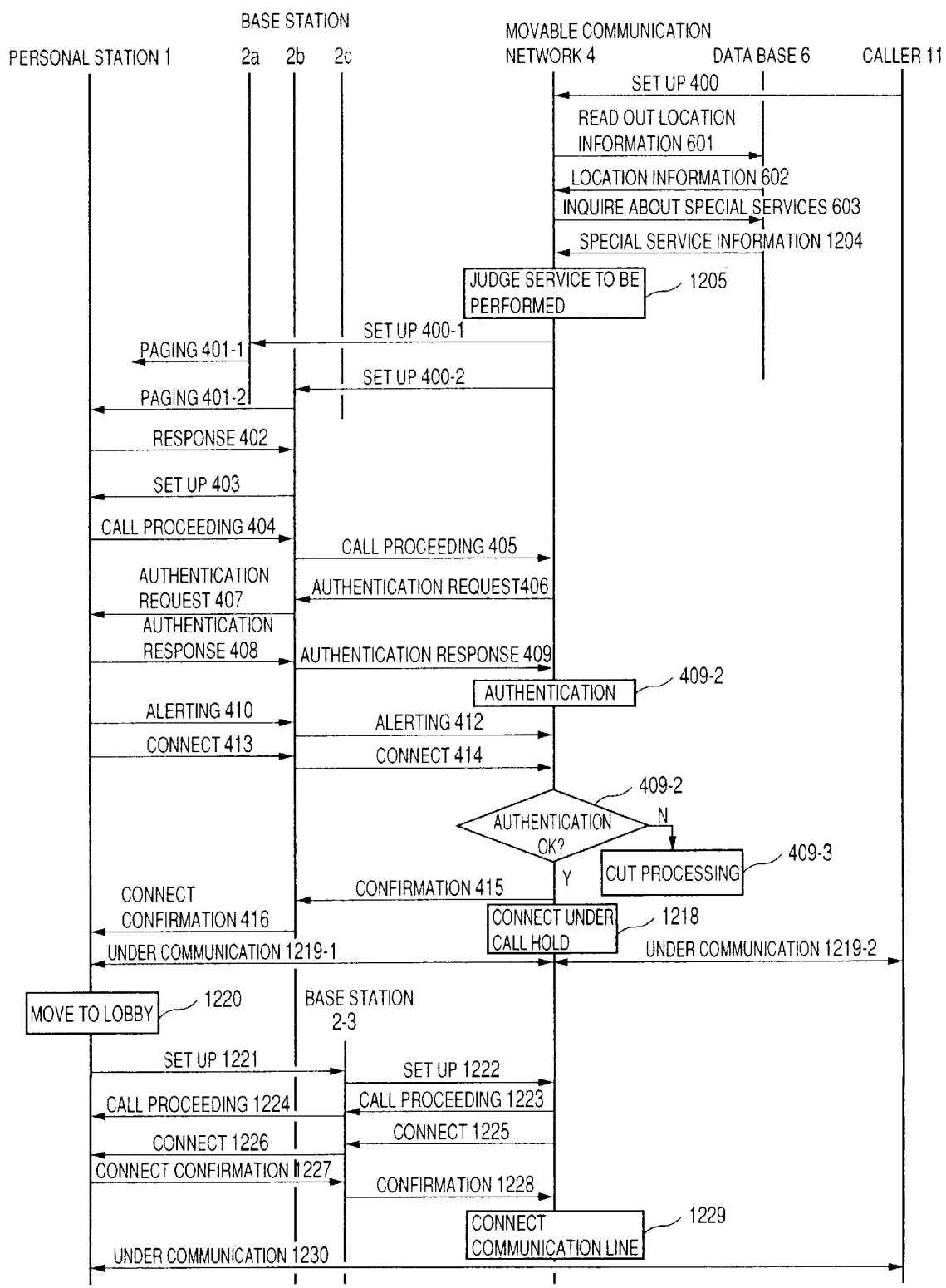
FIGS. 29A and 29B are flowcharts in the thirteenth embodiment.
Figure 29B:
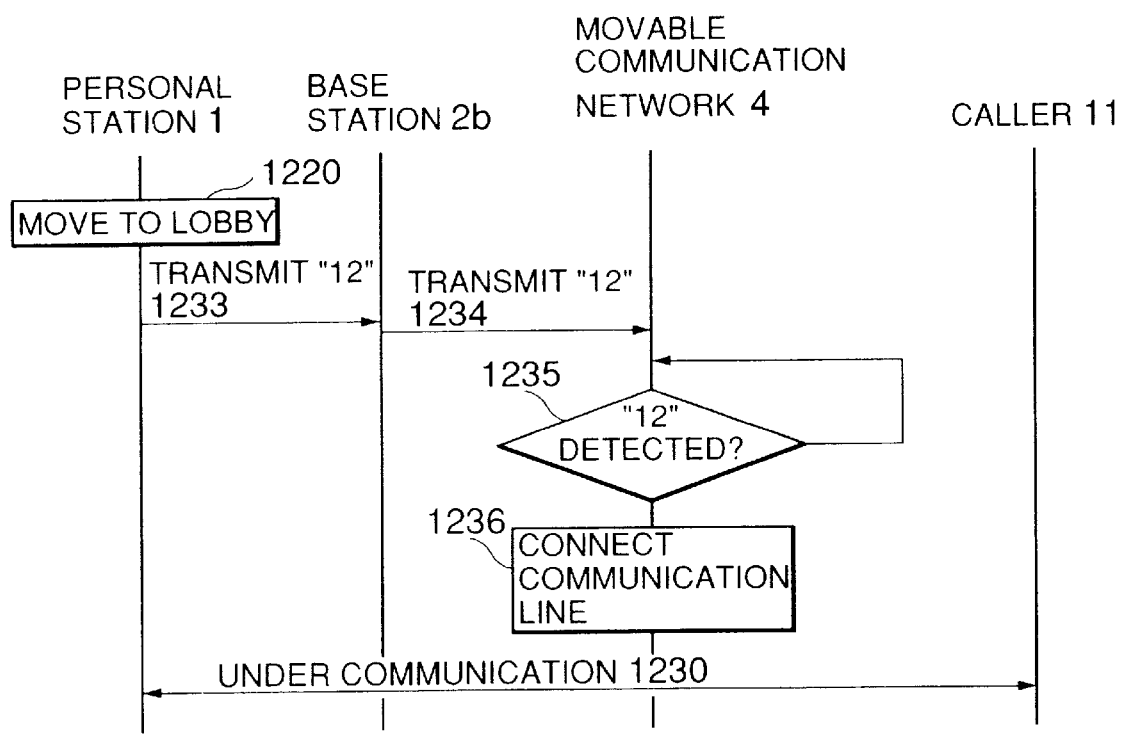

In the FIG. 29A, a move to the lobby 8-1 is detected by a move to a different base station. Now, there will be described an embodiment in which the lobby is covered by the same base station 2*b*, referring to a part of FIG. 29A and FIG. 29B. In FIG. 29A, undergoing the above described operations, the personal station 1 and the movable communication network 4 becomes under communication 1219-2. The movable communication network 4 performs a call-hold connection 1218 so that the caller 11 and the personal station 1 are not connected directly, and it becomes a state that direct communication has not been established between the caller 11 and the personal station 1. A move to the lobby 8-1 can be detected by, for example, sending a predetermined number "12" from the personal station 1. In this case, one embodiment of a communication connection sequence is shown in FIGS. 3 and 29B. In FIG. 29B, after move (1220) to the lobby 8-1, the personal station 1 sends the base station 2*b* the predetermined number "12" (1233). In FIG. 3, sending of "12" (1233) is input through a keypad 306, interpreted by a processor 309, and transmitted to the base station 2*b* via a radio part 302 and through an antenna 301. In FIG. 29B, on receiving the sending 1233 of "12", the base station 2*b* sends the movable communication network 4 the sending of "12" (1234). The movable communication network 4 is in a state of detection wait 1235 for "12", after the call-hold connection 1218. On detecting the sending 1234 of "12" from the base station 2*b*, the movable communication network 4 cancels the call-hold connection 1218, and performs a communication channel connection 1236. By this, the caller 11 and the personal station 1 are connected, and the caller 11 and the personal station becomes under communication.

Next, the fourteenth embodiment will be explained.

Figure 30:
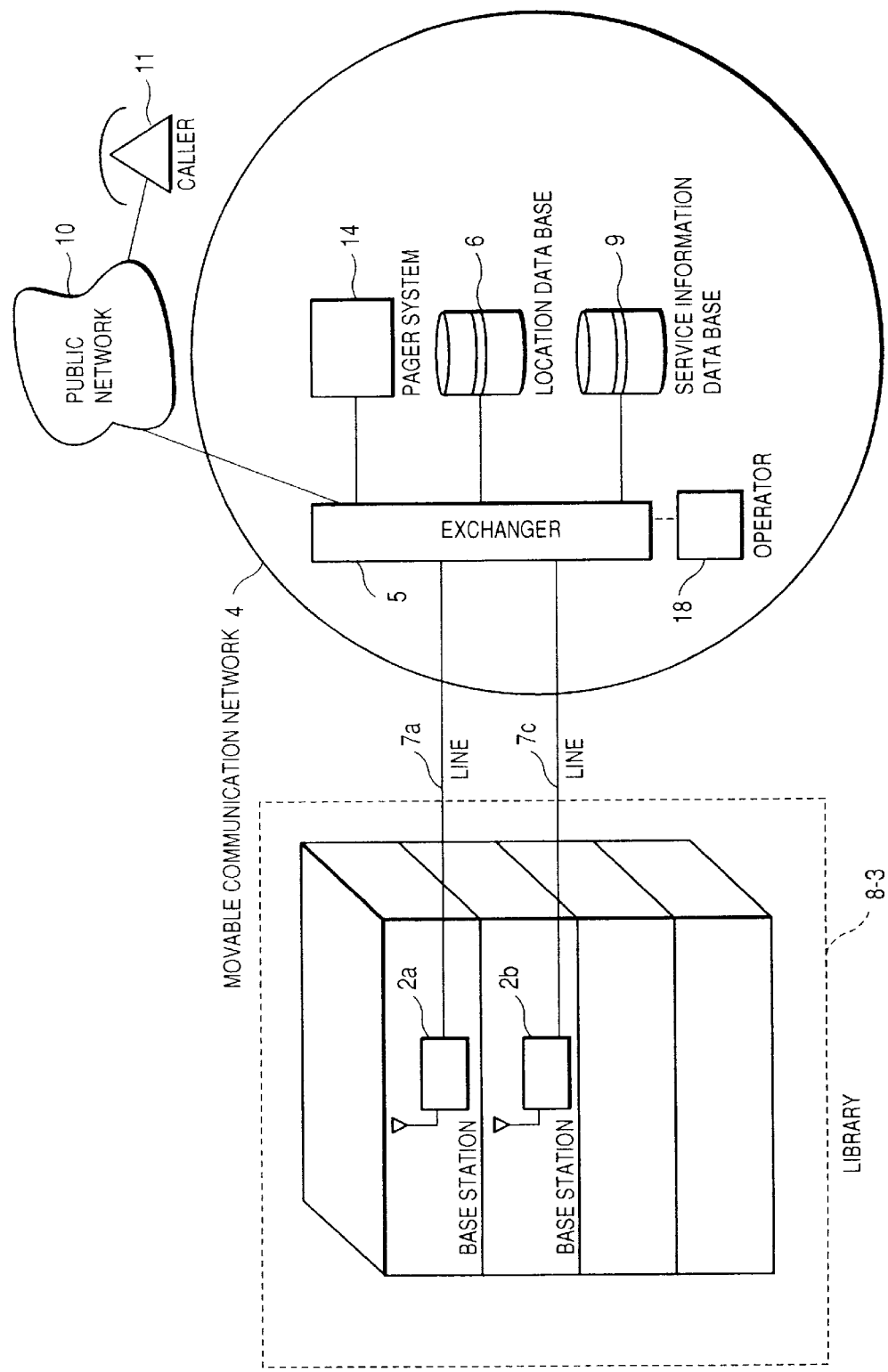
FIG. 30 is a diagram showing the construction of a movable communication system according to a fourteenth embodiment of the present invention.
Figure 31A:
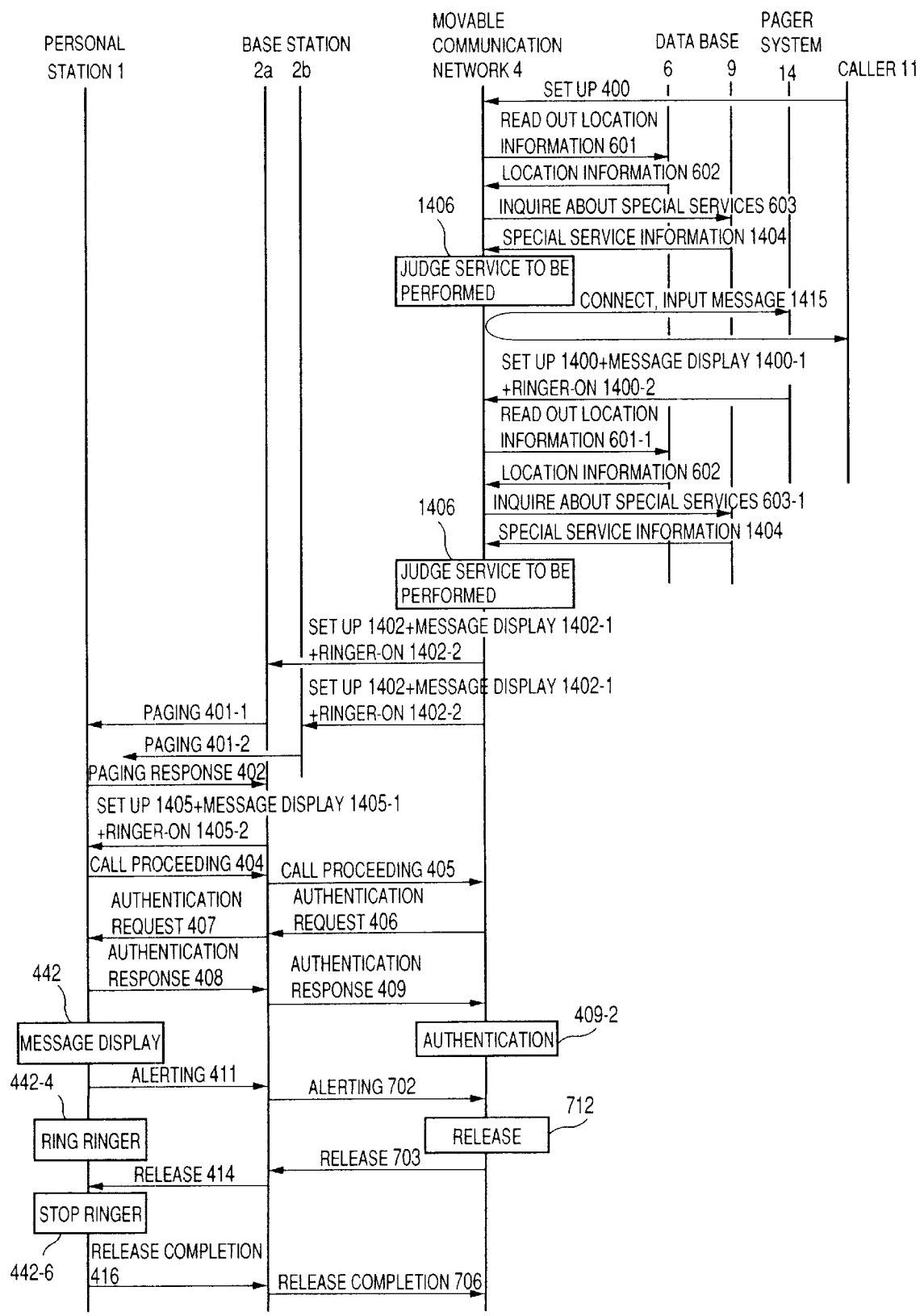
FIGS. 31A and 31B are flowcharts in the fourteenth embodiment.
Figure 31B:
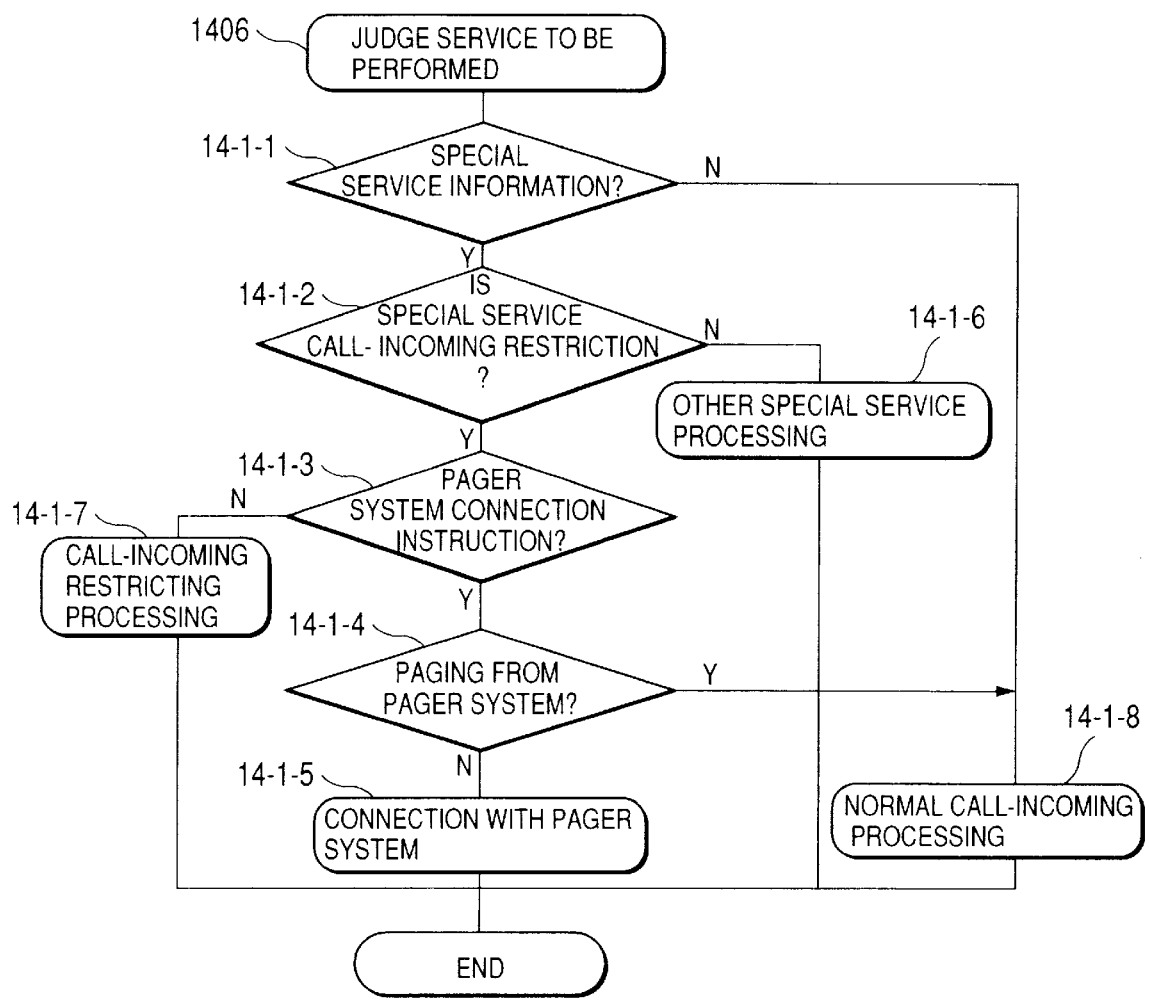

In FIG. 30, a personal station 1 is located inside a library 8-3 in which special service is provided. Inside the library 8-3, the personal station 1 does not receive a call-incoming. Instead of a call-incoming, a message from a caller, which is inputted into a pager system 14, is displayed on a display of the personal station 1. Now, in FIG. 31A, when there arises a call-incoming (setup 400) from the caller 11 to the personal station 1 via a public network 10, the movable communication network 4 performs a location information reading 601 from a data base 6 to read the location information 602 of the personal station 1. The location information 602 describes that the personal station 1 is located inside the library 8-3, i.e. inside the service areas of the base stations 2*a* and 2*b*. Next, the movable communication network 4 performs an inquiry 603 about special service to a data base 9 in which service information about the location information is stored. The special service information 1404 from the data base 9 describes the service about the base stations 2*a* and 2*b* as follows: "Since a call-incoming to a personal station is regulated, connect with the pager system 14, instead of receiving a call-incoming". Having read the special service information 1404, the movable communication network 4 performs an effective service judgment 1406. An embodiment of the effective service judgment 1406 is shown in FIG. 31B. After reading the special service information 1404, firstly, it is judged if there is located the special service information described or not (14-1-1). When there is not special service information, the ordinary call-incoming processing is performed (14-1-8). In the present embodiment, there is located the special service information, it is judged if the special service is call-incoming regulation (e.g., inhibition) (14-1-2). When the special service is not call-incoming regulation, other special service processing is carried out in accordance with its contents (14-1-6). In the present embodiment, the special service is the call-incoming regulation, and therefore, it is judged successively if there is a designation of connection to the pager system or not (14-1-3). When there is not a designation of connection to the pager system 14, there is performed, for example, a call-incoming regulation processing according to a procedure shown in FIG. 4A (14-1-7). In the present embodiment, there is a designation of connection to the pager system 14, and therefore, it is judged, successively, if the call-incoming in question is one from the pager system 14 (14-1-4). When the call-incoming in question is one from the pager system 14, the call-incoming regulation is not carried out, and the ordinary call-incoming processing is carried out (14-1-8). In the present embodiment, the call-incoming in question is not one from the pager system 14, and therefore, that call-incoming 400 is connected with the pager system 14 (14-1-5), to establish a connected state (1415). At this point, the pager system 14 sends the caller 11 a message such as: "The terminal used by the customer is now inside the area in which a call-incoming is limited. Please input a message, and push the "#" key last". The caller 11, in conformity with the directions of the pager system 14, inputs a message through a push type telephone such as a pocket bell. After the end of the message inputting, the pager system 14 sends the movable communication network 4 a setup 1400 which is destined to the personal station 1 and includes a message display 1400-1 for making the above-described message displayed and a ringer on for making a ringer of the terminal is a call-incoming. Similarly to the above-describe operation, the movable communication network 4 performs a location information reading 601-1 from the data base 6 to read the location information 602 of the personal station 1. The location information 602 describes that the personal station 1 is located inside the library 8-3, i.e. inside the service areas of the base stations 2a and 2b. Next, the movable communication network 4 performs an inquiry 603-1 about the special service to the data base 9 in which the service information concerning the location information is stored. The special service information 1404 from the data base 9 describes the services concerning the base stations 2a and 2b as follows: "Since a call-incoming is regulated, connect with the pager system 14, instead of receiving a call-incoming". Having read the special service information 1404, the movable communication network 4 performs, as described above, an effective service judgment 1406 as shown in FIG. 31B. After reading the special service information 1404, it is judged if there is the special service information described (14-1-1). When there is not special service information, the ordinary call-incoming processing is carried out (14-1-8). In the present embodiment, there is the special service information, it is judged if the special service is call-incoming regulation (14-1-2). When the special service is not call-incoming regulation, in accordance with its contents, the other special service processing 14-1-6 is carried out. In the present embodiment, the special service is the call-incoming regulation, and therefore, it is successively judged if there is a designation of connection to the pager system 14 (14-1-3). When there is not a designation of connection to the pager system 14, there is performed, for example, a call-incoming regulation processing according to a procedure shown in FIG. 4A (14-1-7). In the present embodiment, there is a designation of connection to the pager system 14, and therefore, it is judged, successively, if the call-incoming in question is one from the pager system 14 (14-1-4). When the call-incoming in question is not one from the pager system 14, the call-incoming in question is connected with the pager system 14 (14-1-5). In the present embodiment, the call-incoming in question is not one from the pager system, and therefore, call-incoming regulation is not carried out while the ordinary call-incoming processing is carried out (14-1-8). The movable communication network 4 sends the base stations 2a and 2b a setup 1402 which is destined to the personal station 1 and includes a message display 1402-1 for making the above-described message displayed and a ringer on 1402-2 for making a ringer of the terminal is a call-incoming. The base stations 2a and 2b send the personal station 1 a paging signal 401-1 and a paging signal 401-2 in accordance with a program stored in advance. When the personal station 1 is located in the service area of the base station 2a, the personal station 1 receives the paging signal 401-1 from the base station 2a. On receiving the call-incoming 401-1, the personal station 1 sends the base station 2a a call-incoming response 402 in accordance with a program stored in advance. Responding to it, the base station 2 sends the personal station 1 a setup 1405 including a message display 1405-1 and a ringer on 1405-2 for making the ringer of the terminal is a call-incoming. The personal station 1 sends the base station 2a a call proceeding 404 as in the time of the ordinary call-incoming. On receiving the call proceeding 404, the base station 2a sends the movable communication network 4 a call proceeding 405. The movable communication network 4 sends the base station 2 an authentication request 406 as in the time of the ordinary call-incoming, and the base station 2a sends the personal station 1 an authentication request 407. On receiving the authentication request 407, the personal station 1 sends the base station 2a the result of the authentication operation in the personal station 1 as an authentication response 408. On receiving the authentication response 409, the base station 2a performs the authentication 409-2. The personal station 1 receives the message display 1405-1 following the authentication response 409 so that the message from the pager system, which the caller 11 wishes to communicate, is displayed on the display of the personal station 1 (442). Then, an alerting 411 is sent to the base station 2a, and the ringer on 1405-2 is received to ring the ringer of the personal station 1 according to the operation shown in FIG. 4B for example (442-4). Upon receiving the ringing 411 from the personal station 1, the base station 2a sends the movable communication network 4 the a alerting 702 as in the time of the ordinary call-incoming. At this point, the movable communication network 4 performs a release processing 712 for realizing the call-incoming regulation, and sends the base station 2a a release 703. On receiving the release 703, the base station 2a sends the personal station 1 a release 414 as in the ordinary call-incoming processing. On receiving the release 414, the personal station 1 stops the ringer in conformity with the sequence shown in FIG. 4B (442-6), and sends the base station 2a a release-completed 416 as in the ordinary release processing. The base station 2a sends the movable communication network 4 a release-completed 706, and releases without connecting the call as in the ordinary release processing.

Next there will be described the fifteenth embodiment.

Figure 32:
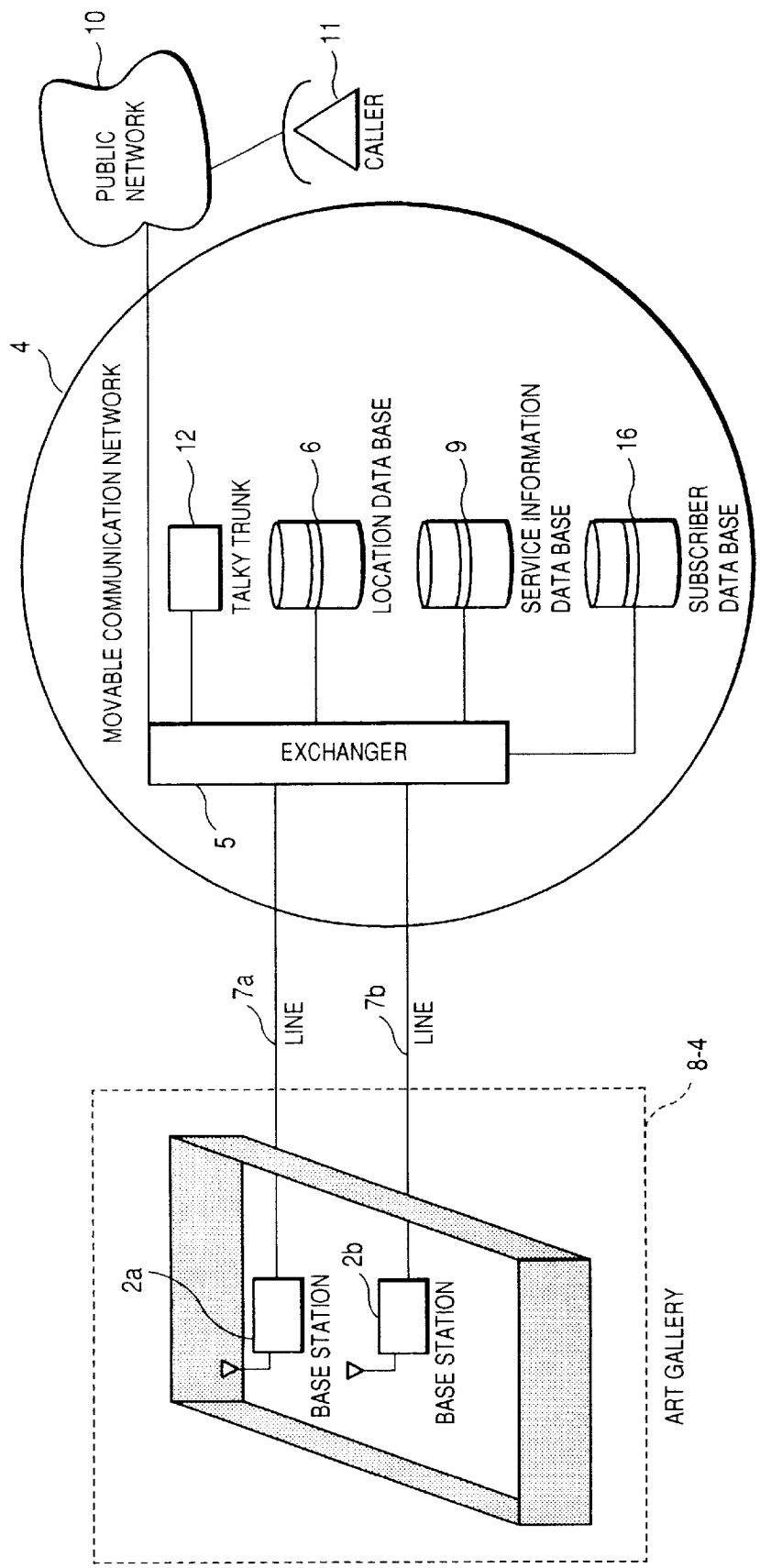
FIG. 32 is a diagram showing the construction of a movable communication system according to a fifteenth embodiment of the present invention.
Figure 33A:
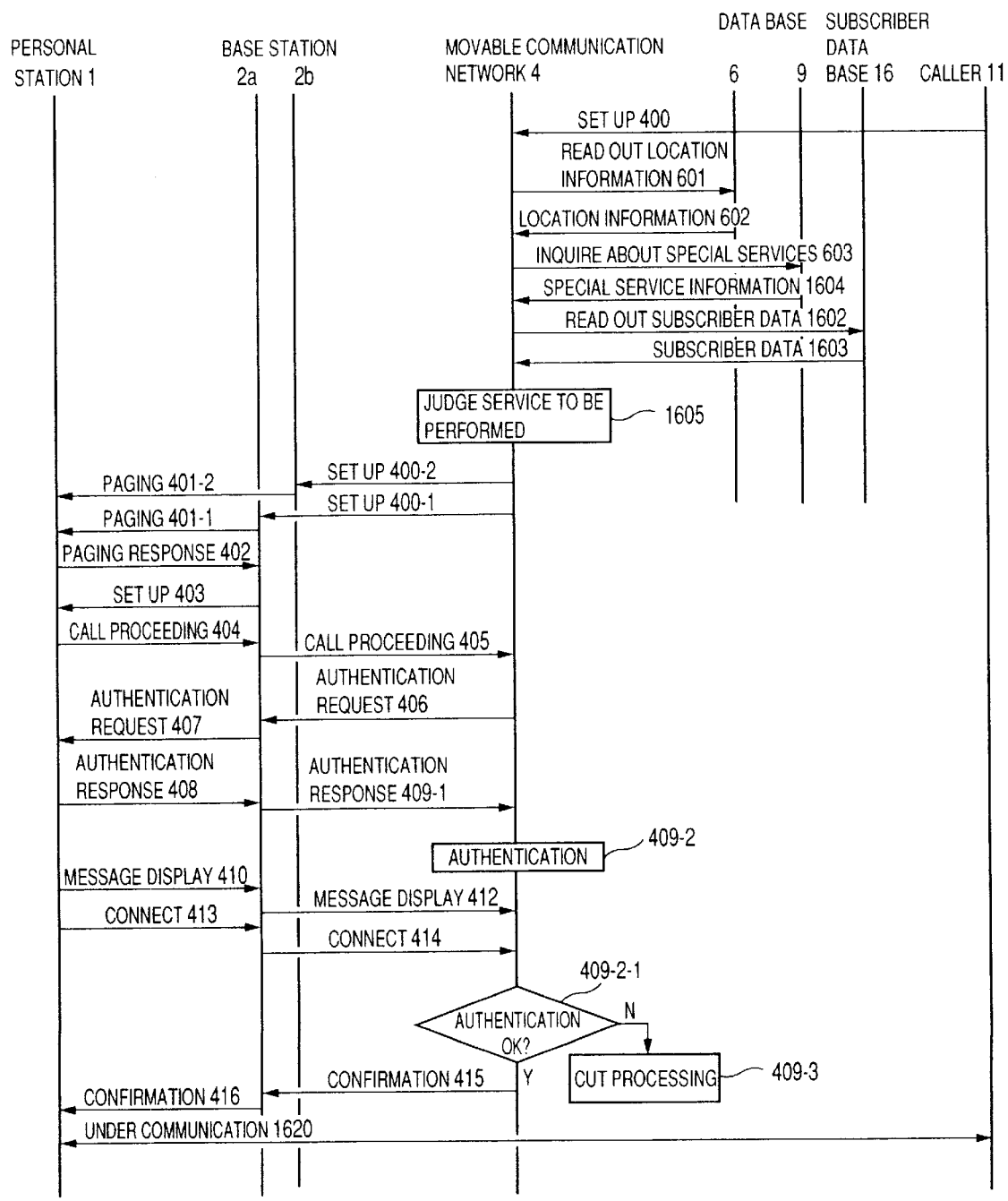
FIGS. 33A and 33B are flowcharts in the fifteeth embodiment.
Figure 33B:
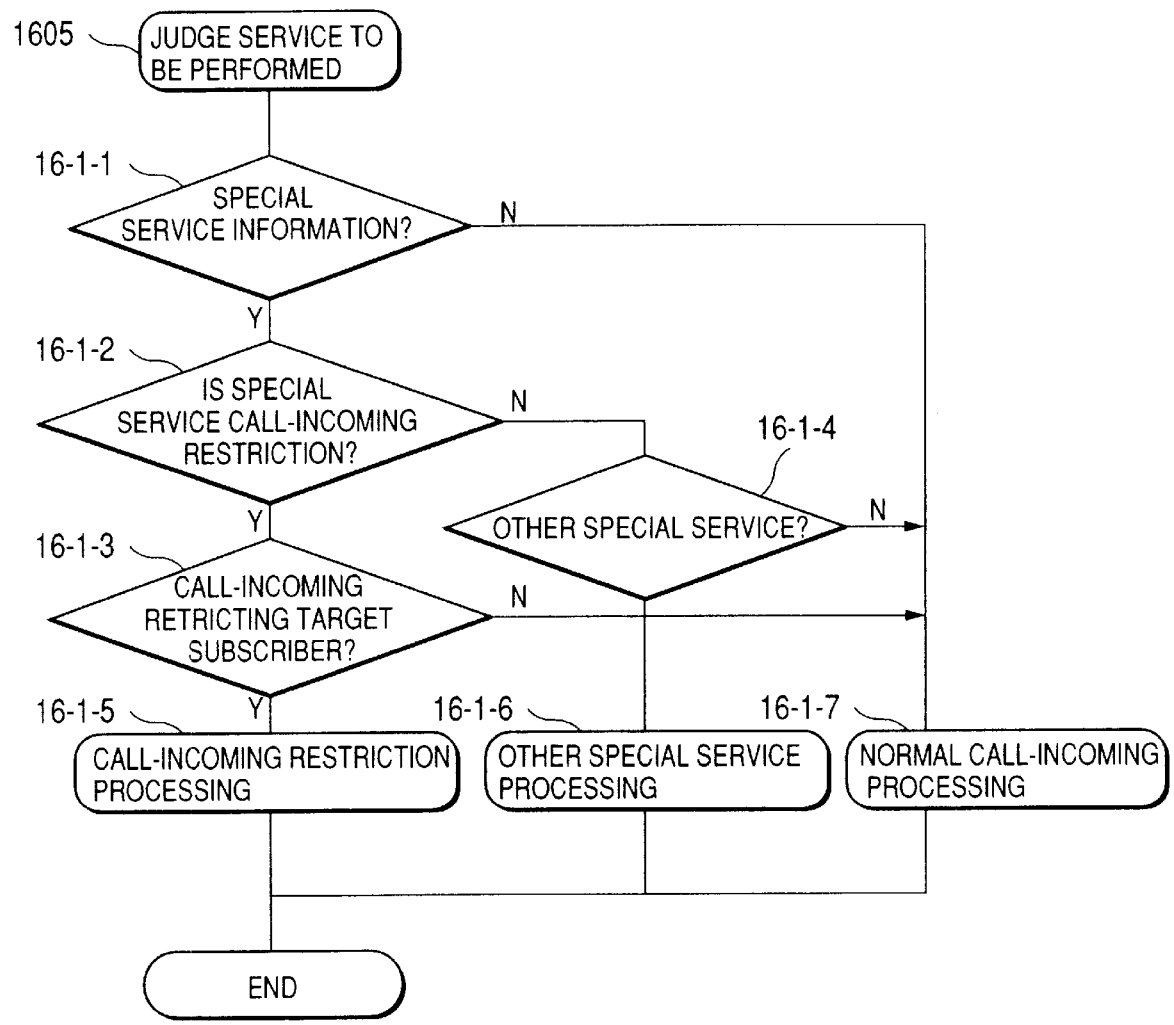

In FIG. 32, a personal station 1 is located inside an art museum 8-4 in which special service is provided. Inside the art museum 8-4, a call-incoming is not received by a movable terminal of a visitor while a call-incoming is allowed for a personal station 1 owned by a member of the staff. Now, in FIG. 33A, when there arises a call-incoming (setup 400) to the personal station 1 from a caller 1 via a public network 10, a movable communication network 4 performs a location information reading 601 from a data base 6 to read location information 602 of the personal station 1. The location information 602 describes that the personal station 1 is located in the art museum 8-4, i.e., in the service areas of base stations 2a and 2b. Next, the movable communication network 4 performs an inquiry (603) about special services to a data base 9 in which service information concerning the location information is stored. The special service information 1604 from the data base 9 describes the service about the radio wave control stations 2a and 2b as follows: "A call-incoming is not received by a personal station of a visitor while a call-incoming is allowed for a personal station 1 owned by a member of the staff". At this point, the movable communication network 4 performs a subscriber data reading 1602 from a subscriber data base 16 to receive subscriber data 1603. Here, the movable communication network 4 performs effective service judgment 1605 from the location information 602, the special service information 1604 and the subscriber data 1603. An embodiment of the effective service judgment is shown in FIG. 33B. Firstly, it is judged whether there is the special service information 1604 described or not (16-11). When there is not any special service information, the ordinary call-incoming processing is performed (16-1-7). In the present embodiment, there is the special service information, and therefore, it is judged if the special service is call-incoming regulation (16-1-2). When the special service is not the call-incoming regulation, other special service processing (16-1-4) is carried out in accordance with its contents. In the present embodiment, the special service is the call-incoming regulation, and therefore, it is judged successively if the destination of the call-incoming in question is a subscriber under the call-incoming regulation (16-1-13). When the destination of the call-incoming in question is a subscriber under the call-incoming regulation, there is performed a call-incoming regulation processing according to the procedure shown in FIG. 4A, for example (16-1-5). In the present embodiment, the destination of the call-incoming in question is not a subscriber under the call-incoming regulation, and therefore, the ordinary call-incoming processing is performed (16-1-7). The movable communication network 4 sends the base stations 2a and 2b a setup 400-1 and a setup 400-2 as in the time of the ordinary call-incoming. The base stations 2a and 2b send the personal station 1 a paging signal 401-1 and a paging signal 401-2 according to a program stored in advance. When the personal station 1 is located in the service area of the personal station 2a, the personal station 1 receives the paging signal 401-1 from the base station 2a.

Upon receiving paging signal 401-1, the personal station 1 sends the base station 2a a call-incoming response signal 402 according to a program stored in advance. Responding to it, the base station 2a sends the personal station 1a a setup 403, and the personal station 1 sends the base station 2a a call proceeding 404 as in the time of the ordinary call-incoming.

Upon receiving the call proceeding 404, the base station 2a sends the movable communication network 4a call proceeding 405. The movable communication network 4 sends the base station 2a an authentication request 406 as in the time of the ordinary call-incoming, and the base station 2a sends the personal station 1 an authentication request 407.

Upon receiving the authentication request 407, the personal station 1 sends the base station 2a the result of the authentication operation in the personal station 1 as an authentication response 408, as in the time of the ordinary call-incoming. Upon receiving the authentication response 408, the base station 2a performs an authentication 409-2. The personal station 1 sends the base station 2a an alerting 410 and a connection 413 following the authentication response 408. Upon receiving the alerting 410 and the connection 413 from the personal station 1, the base station 2a sends the movable communication 4 an alerting 412 and a connection 414 as in the time of the ordinary call-incoming. At this point, the movable communication network 4 performs judgment of the authentication result 409-2-1, and when the authentication is carried out correctly, sends the base station 2a a connect confirmation 415, and when the authentication is not carried out correctly, performs a disconnecting processing 409-3.

Upon receiving the connect confirmation 415 from the movable communication network 4, the base station 2a sends the personal station 1 a connect confirmation 416, whereby it falls into a communication state 1620, whereby the caller 11 and the personal station 1 are directly connected to each other.

As described above, according to the movable communication system of the present invention, by predetermining one or more areas in which special services other than the calling service and the call-incoming service are to be supplied to a personal station, it is possible to inform a personal station located in the predetermined area about the content of the special service to be provided to the personal station.

As a result, even when call-incoming to a personal station is prohibited because the personal station is located in a call-incoming prohibiting area, the subscriber of the personal station can know the reason why the call-incoming has been prohibited.

Further, according to the movable communication system of the present invention, it is possible that, even if an area where a personal station in question is located is an area where special services are to be provided to personal stations, the personal station is excluded from targets to be supplied with the special services when the personal station in question is a particular personal station in the area.

Accordingly, it is possible that even when the subscriber of a personal station is located in a all-incoming prohibited area, the call-incoming to the personal station is not prohibited if he or she is the subscriber of a particular personal station in the call-incoming prohibited area in question.

Further, according to the present invention, it is possible that, even if an area where a personal station is located in an area where the special services are provided to personal stations, the call-incoming from a caller to the personal station is not prohibited if the subscriber of the caller needs an urgent communication with the subscriber of the personal station.

What is claimed is:

1. A movable communication system having plural personal stations, plural base stations each of which performs a radio communication with personal stations located in an own area, and an exchanger for controlling the plural base stations, wherein at least one of said exchanger and said plural base stations includes:
service information storage means for storing service information indicating special services other than a calling service and a call-incoming service to be supplied to personal stations located in predetermined areas of all the areas which are respectively covered by said plural base stations;
service supply means for supplying said personal station located in one of the predetermined areas with a special service indicated by service information corresponding to said one of the predetermined areas stored in said service information storage means, when there is a call from or a call-incoming to said personal station; and
service content notifying means for transmitting to said personal station located in said one of the predetermined areas and supplied the special service by said service supply means, a message indicating the content of the special service concerned.

2. The movable communication system as claimed in claim 1, wherein said service information stored in said service information storage means indicates that the incoming call to a personal station located in the corresponding area is prohibited, and wherein when there is an incoming call to said personal station, said service supply means prohibits a paging to said personal station and prohibits the connection between said personal station and a caller, and also transmits to said personal station a message indicating that there has been an incoming call to said personal station, and said service content notifying means transmits to said personal station supplied with the special service from said service supply means a message indicating that the area where said personal station is located is a call-incoming prohibited area.

3. The movable communication system as claimed in claim 2, further including an operation center having call-incoming accepting means for accepting the call-incoming, calling means for calling to said personal station in accordance with an instruction which is input from the external, and connecting means for connecting, in accordance with an instruction input from the external, a caller of the call-incoming accepted by said call-incoming means and a personal station which is a call target to which said calling means calls, wherein said service supply means pages said personal station to connect said personal station and said operation center regardless of the service information corresponding to the area where said personal station is located, if the caller is said operation center when there is a call-incoming to said personal station.

4. The movable communication system as claimed in claim 3, wherein at least one of said exchanger and said plural base stations further includes subscriber information storage means for storing subscriber information indicating one or more areas for which the services to be supplied to each of personal stations is not effected by the service information, and wherein when there is a call-incoming to said personal station, said service supply means pages said personal station to connect said personal station and the caller to said personal station regardless of the service information corresponding to the area where said personal station is located, if the area where said personal station is located is contained in the subscriber information.

5. The movable communication system as claimed in claim 2, wherein at least one of said exchanger and said plural base stations further includes subscriber information storage means for storing subscriber information indicating one or more areas for which the services to be supplied to each of personal stations is not effected by the service information, and wherein when there is a call-incoming to said personal station, said service supply means pages said personal station to connect said personal station and the caller to said personal station regardless of the service information corresponding to the area where said personal station is located, if the area where said personal station is located is contained in the subscriber information.

6. The movable communication system as claimed in claim 1, wherein the service information stored in said service information storage means indicates prohibition of the call-incoming to a personal station located in the corresponding area, and also a moving target place to which the subscriber of the personal station located in the corresponding area should move to communicate with a caller, and wherein when there is a call-incoming to said personal station, said service supply means pages said personal station to connect said personal station and a caller to said personal station under a call-hold state, and also transmits to said personal station a message indicating that there has been the call-incoming to said personal station, said service content notifying means transmits to said personal station supplied with the service from said service supply means a message indicating that the area where said personal station is located is a call-incoming prohibited area, and a message indicating a moving target place corresponding to the area where said personal station is located, and said service supply means releases the call-hold state under which said caller and said personal station are connected to each other when said personal station is moved to the moving target place within a predetermined time.

7. The movable communication system as claimed in claim 6, further including an operation center having call-incoming accepting means for accepting the call-incoming, calling means for calling to said personal station in accordance with an instruction which is input from the external, and connecting means for connecting, in accordance with an instruction input from the external, a caller of the call-incoming accepted by said call-incoming means and a personal station which is a call target to which said calling means calls, wherein said service supply means pages said personal station to connect said personal station and said operation center regardless of the service information corresponding to the area where said personal station is located, if the caller is said operation center when there is a call-incoming to said personal station.

8. The movable communication system as claimed in claim 7, wherein at least one of said exchanger and said plural base stations further includes subscriber information storage means for storing subscriber information indicating one or more areas for which the services to be supplied to each of personal stations is not effected by the service information, and wherein when there is a call-incoming to said personal station, said service supply means pages said personal station to connect said personal station and the caller to said personal station regardless of the service information corresponding to the area where said personal station is located, if the area where said personal station is located is contained in the subscriber information.

9. The movable communication system as claimed in claim 6, wherein at least one of said exchanger and said plural base stations further includes subscriber information storage means for storing subscriber information indicating one or more areas for which the services to be supplied to each of personal stations is not effected by the service information, and wherein when there is a call-incoming to said personal station, said service supply means pages said personal station to connect said personal station and the caller to said personal station regardless of the service information corresponding to the area where said personal station is located, if the area where said personal station is located is contained in the subscriber information.

10. The movable communication system as claimed in claim 1, wherein the service information stored in said service information storage means indicates a call-incoming prohibiting time zone in which the call-incoming to said personal station located in the corresponding area is prohibited, and wherein when there is a call-incoming to said personal station, said service supply means prohibits the paging to said personal station, prohibits the connection between said personal station and the caller to said personal station and transmits to said personal station a message indicating that there has been the call-incoming thereto if the time is in the call-incoming prohibiting time zone which is indicated by the service information corresponding to the area where said personal station is located, and said service content notifying means transmits to said personal station supplied with the service from said service supply means a message which indicates that the area where said personal station is located is in the call-incoming prohibiting time zone, and also indicates a time when the call-incoming prohibiting time zone is finished.

11. The movable communication system as claimed in claim 10, wherein said service content notifying means transmits a message indicating that the area where said personal station is located in the call-incoming prohibiting time zone, and a voice message indicating the time at which the call-incoming prohibiting time zone is finished, to the caller to said personal station to which the service is supplied from said service supply means.

12. The movable communication system as claimed in claim 11, further including an operation center having call-incoming accepting means for accepting the call-incoming, calling means for calling to said personal station in accordance with an instruction which is input from the external, and connecting means for connecting, in accordance with an instruction input from the external, a caller of the call-incoming accepted by said call-incoming means and a personal station which is a call target to which said calling means calls, wherein said service supply means pages said personal station to connect said personal station and said operation center regardless of the service information corresponding to the area where said personal station is located, if the caller is said operation center when there is a call-incoming to said personal station.

13. The movable communication system as claimed in claim 12, wherein at least one of said exchanger and said plural base stations further includes subscriber information storage means for storing subscriber information indicating one or more areas for which the services to be supplied to each of personal stations is not effected by the service information, and wherein when there is a call-incoming to said personal station, said service supply means pages said personal station to connect said personal station and the caller to said personal station regardless of the service information corresponding to the area where said personal station is located, if the area where said personal station is located is contained in the subscriber information.

14. The movable communication system as claimed in claim 11, wherein at least one of said exchanger and said plural base stations further includes subscriber information storage means for storing subscriber information indicating one or more areas for which the services to be supplied to each of personal stations is not effected by the service information, and wherein when there is a call-incoming to said personal station, said service supply means pages said personal station to connect said personal station and the caller to said personal station regardless of the service information corresponding to the area where said personal station is located, if the area where said personal station is located is contained in the subscriber information.

15. The movable communication system as claimed in claim 10, further including an operation center having call-incoming accepting means for accepting the call-incoming, calling means for calling to said personal station in accordance with an instruction which is input from the external, and connecting means for connecting, in accordance with an instruction input from the external, a caller of the call-incoming accepted by said call-incoming means and a personal station which is a call target to which said calling means calls, wherein said service supply means pages said personal station to connect said personal station and said operation center regardless of the service information corresponding to the area where said personal station is located, if the caller is said operation center when there is a call-incoming to said personal station.

16. The movable communication system as claimed in claim 15, wherein at least one of said exchanger and said plural base stations further includes subscriber information storage means for storing subscriber information indicating one or more areas for which the services to be supplied to each of personal stations is not effected by the service information, and wherein when there is a call-incoming to said personal station, said service supply means pages said personal station to connect said personal station and the caller to said personal station regardless of the service information corresponding to the area where said personal station is located, if the area where said personal station is located is contained in the subscriber information.

17. The movable communication system as claimed in claim 10, wherein at least one of said exchanger and said plural base stations further includes subscriber information storage means for storing subscriber information indicating one or more areas for which the services to be supplied to each of personal stations is not effected by the service information, and wherein when there is a call-incoming to said personal station, said service supply means pages said personal station to connect said personal station and the caller to said personal station regardless of the service information corresponding to the area where said personal station is located, if the area where said personal station is located is contained in the subscriber information.

18. The movable communication system as claimed in claim 1, wherein said service information stored in said service information storage means indicates prohibition of an incoming call from a personal station located in the corresponding area, and wherein said service supply means prohibits the connection between said personal station and a caller to said personal station when there is an incoming call from said personal station, and said service content notifying means transmits to a personal station supplied with the special service from said service supply means a message indicating that the area where said personal station is located is a calling prohibited area.

19. The movable communication system as claimed in claim 18, wherein at least one of said exchanger and said plural base stations further includes subscriber information storage means for storing subscriber information indicating one or more areas for which the services to be supplied to each of personal stations is not effected by the service information, and wherein when there is a call from said personal station, said service supply means connects said personal station and a call target to which said personal station calls, regardless of the service information corresponding to the area where said personal station is located, if the area where said personal station is located is contained in the subscriber information.

20. The movable communication system as claimed in claim 1, wherein the service information stored in said service information storage means indicates a calling prohibiting time zone in which the calling from a personal station in the corresponding area is prohibited, and wherein when there is a calling from said personal station, said service supply means prohibits the connection between said personal station and a call target to which said personal station calls, if the time is in the calling prohibiting time zone which is indicated by the service information corresponding to the area where said personal station is located, and said service content notifying means transmits a message indicating that the area where said personal station is located is in the calling prohibiting time zone and indicating the time when the calling prohibiting time zone is finished, to a personal station to which said service supply means provides the service.

21. The movable communication system as claimed in claim 20, wherein at least one of said exchanger and said plural base stations further includes subscriber information storage means for storing subscriber information indicating one or more areas for which the services to be supplied to each of personal stations is not effected by the service information, and wherein when there is a call from said personal station, said service supply means connects said personal station and a call target to which said personal station calls, regardless of the service information corresponding to the area where said personal station is located, if the area where said personal station is located is contained in the subscriber information.

22. The movable communication system as claimed in claim 1, wherein the call-incoming is not regulated in accordance with a time zone in a specific area even though the area is in a service area, and a time zone in which the call-incoming is allowed is informed to a caller in the form of a talkie message.

23. The movable communication system as claimed in claim 1, wherein a call-incoming ringer is not allowed in case of a normal call-incoming, but is allowed in case of an urgent communication in a specific area by a declaration even though the area is in a service area.

24. The movable communication system as claimed in claim 1, wherein only a call-incoming ringer rung in case of a normal call-incoming, and a communication itself is allowed if a personal station is moved to a specified place in a specific area even though the area is in a service area.

25. The movable communication system as claimed in claim 1, wherein a call-incoming ringer is not allowed in case of a call-incoming to a normal personal station, but is allowed when the call-incoming is give to a specific personal station in a specific area even though the area is in a service area.

26. The movable communication system as claimed in claim 1, characterized in that in case of a call-incoming to a normal personal station, a call-incoming ringer is not a call-incoming and a caller inputs a message information to a message system, and a personal station is provided with means for displaying on a display of said personal station a message corresponding to the message information which is transmitted from a movable communication network.

27. The movable communication system as claimed in claim 1, characterized in that the personal station including means for displaying on a display a message which is conformable with the content of a message display instruction for service information indicating services other than a calling service and a call-incoming service of said movable communication system and is transmitted from a movable communication network containing said base station or said exchanger when a message display instruction signal representing the message display instruction is contained in a setup signal transmitted from said base station, said display means enabling the subscriber of said personal station to know that said personal station has a call-incoming and also know the content of the services other than the calling service and the call-incoming service.

28. The movable communication system as claimed in claim 1, characterized in that the personal station including means of judging whether a message display instruction signal representing service information indicating services other than a calling service and a call-incoming service of said movable communication system is contained in a setup signal when said personal station receives the setup signal from said base station, and means for displaying on a display a message of the service information which is conformable with the content of the message display instruction and transmitted from said base station or a movable communication network when the message display instruction is set in the message display instruction signal, by which the subscriber of said personal station can know that there has been call-incoming thereto, and also know the content of the services other than the calling service and the call-incoming service.

29. The movable communication system as claimed in claim 1, characterized in that the service information including:

prohibiting the paging to a personal station and transmitting to said personal station a message indicating that there has been call-incoming when said personal station located in the area has the call-incoming and the call-incoming prohibited area service information is stored in said service information storage means of the base station corresponding to the area where said personal station is located or the exchanger for controlling said base station; and transmitting to said personal station supplied with the call-incoming service message a service content message which indicates that the area is a call-incoming prohibited area, whereby the reason why the call-incoming to said personal station is prohibited can be known at said personal station.

30. A base station which performs radio communication with a personal station located in an own area, comprising:

service information storage means for storing service information indicating a special service other than a calling service and a call-incoming service to be supplied to a personal station located in the own area;

service supply means for supplying said personal station located in the own area with the special service indicated by service information stored in said service information storage means, when there is a call from or a call-incoming to said personal station; and service content notifying means for transmitting to said personal station located in the own area and supplied the special service by said service supply means, a message indicating the content of the special service.

31. A personal station used in a movable communication system having a base station which covers a predetermined area and performs radio communication with a personal station located in the area, and an exchanger for controlling said base station, characterized by including means for displaying on a display a message which is conformable with the content of a message display instruction for service information indicating services other than a calling service and a call-incoming service of said movable communication system and is transmitted from a movable communication network containing said base station or said exchanger when a message display instruction signal representing the message display instruction is contained in a setup signal transmitted from said base station, said display means enabling the subscriber of said personal station to know that said personal station has a call-incoming and also know the content of the services other than the calling service and the call-incoming service.

32. The personal station as claimed in claim 31, wherein the service information indicates prohibition of the call-incoming to or the calling from a personal station located in the corresponding area, and when said personal station receives a setup signal from said base station and a message indicating that the area where said personal station is located said personal station is a call-incoming prohibiting or calling prohibited area is contained in the setup signal, the connection between said personal station and a caller to said personal station is prohibited, and a message indicating that there has been call-incoming to said personal station and that the area where said personal station is located is a call-incoming prohibited area, is displayed by said display means, by which the subscriber of said personal station can know the reason why the connection between said personal station and said caller is interrupted.

33. The personal station as claimed in claim 31, wherein said personal station is provided with means for prohibiting a ringer from ringing when said personal station further receives a setup signal from said base station and a ringer-off instruction signal is contained in the setup signal.

34. A personal station used in a movable communication system having a base station which covers a predetermined area and performs radio communication with a personal station located in the area, and an exchanger for controlling said base station, characterized by including means of judging whether a message display instruction signal representing service information indicating services other than a calling service and a call-incoming service of said movable communication system is contained in a setup signal when said personal station receives the setup signal from said base station, and means for displaying on a display a message of the service information which is conformable with the content of the message display instruction and transmitted from said base station or a movable communication network when the message display instruction is set in the message display instruction signal, by which the subscriber of said personal station can know that there has been call-incoming thereto, and also know the content of the services other than the calling service and the call-incoming service.

35. The personal station as claimed in claim 34, wherein the service information indicates prohibition of the call-incoming to or the calling from a personal station located in the corresponding area, and when said personal station receives a setup signal from said base station and a message indicating that the area where said personal station is located said personal station is a call-incoming prohibiting or calling prohibited area is contained in the setup signal, the connection between said personal station and a caller to said personal station is prohibited, and a message indicating that there has been call-incoming to said personal station and that the area where said personal station is located is a call-incoming prohibited area, is displayed by said display means, by which the subscriber of said personal station can know the reason why the connection between said personal station and said caller is prohibited.

36. The personal station as claimed in claim 34, further including means for judging whether a ringer-off instruction is set in a setup signal when further receiving the setup signal from said base station, and prohibiting the ring of a ringer if the ringer-off instruction is set.

37. The personal station as claim in claim 34, wherein the service information indicates a call-incoming prohibiting time zone in which the call-incoming to or calling from a personal station located in the corresponding area is prohibited, and wherein a personal station to which the services are supplied receives a setup signal from said base station, and the connection between said personal station and a caller is prohibited when the signal contains service information indicating that an area where said personal station is located is in a call-incoming prohibiting time zone in which the call-incoming to or calling from said personal station is prohibited, and said display means displays a message indicating that there has been call-incoming to said personal station and that the time at the call-incoming is in the call-incoming prohibiting time zone, and also a message indicating the time when the call-incoming prohibiting time zone is finished, whereby the subscriber of said personal station can know the reason why the connection between said personal station and said caller is prohibited.

38. The personal station as claimed in claim 34, wherein the service information indicates a call-incoming prohibiting time zone in which the call-incoming to or calling from said personal station located in the corresponding area is prohibited, and wherein when said personal station is under the call-incoming prohibiting time zone in the call-incoming prohibited area, a caller to a personal station to which the services are supplied is prohibited from being connected to said personal station and is provided with means for receiving from said exchanger a message indicating that the area where said personal station is located is in the call-incoming prohibiting time zone and a message indicating the time when the call-incoming prohibiting time zone is finished, whereby the subscriber of said caller can know the reason why the connection to said personal station and said caller is prohibited.

39. A movable communication system including plural personal stations, plural base stations each of which covers a predetermined area and performs radio communication with personal stations located in the area, and an exchanger for controlling said plural base station, comprising:

service information storage means for storing service information indicating that an area covered by each of said base station is a call-incoming prohibited area;

means for prohibiting the paging to a personal station located in the area and transmitting a message indicating that there has been call-incoming to said personal station when there is the call-incoming to said personal station and the call-incoming prohibiting service information is stored in said service information storage means which corresponds to the base station corresponding to the area where said personal station is located or said exchanger for controlling said base station; and means for transmitting to said personal station supplied with the call-incoming service message a service content message indicating that the area is a call-incoming prohibited area, whereby the subscriber of said personal station can know the reason why the call-incoming to said personal station is prohibited.

40. The movable communication system as claimed in claim 39, wherein said service information storage means is provided to any one of said base station corresponding to the area where said personal station and said exchanger for controlling said base station, or independently of said base station and said exchanger.

41. The movable communication system as claimed in claim 39, further including location data base which is connected to said exchanger and serves to indicate areas where said plural personal stations are located.

42. A base station which performs a radio communication with a personal station located in an own area, comprising:

service information storage means for storing service information indicating a content of a special service other than a calling service and a call-incoming service to be supplied to a personal station located in the own area;

service supply means for supplying said personal station located in the own area with the special service indicated by service information stored in said service information storage means, when there is a call from or a call-incoming to a personal station; and service content notifying means for transmitting to said personal station located in the own area and supplied the special service by said service supply means, a message indicating the content of the special service.

43. The base station as claimed in claim 42, wherein said service information indicating the content of the special service is call or call-incoming prohibited area information which indicates that said personal station is located in a call or call-incoming prohibited area.

44. The base station as claimed in claim 42, wherein said service information stored in said service information storage means indicates prohibition of the call-incoming to a personal station located in the own area, and wherein when there is a call-incoming to said personal station, said service supply means pages said personal station to connect said personal station and a caller to said personal station under a call-hold state, and also transmits to said personal station a message indicating that there has been the call-incoming to said personal station, said service content notifying means transmits to said personal station supplied with the special service from said service supply means a message indicating that the area where said personal station is located is a call-incoming prohibited area, and a message indicating a moving target place corresponding to the area where said personal station is located, and said service supply means releases the call-hold state under which said caller and said personal station are connected to each other when said personal station is moved to the moving target place within a predetermined time.

45. The base station as claimed in claim 42, wherein said service information stored in said service information storage means indicates a call-incoming prohibiting time zone in which the call-incoming to said personal station located in the own area is prohibited, and wherein when there is a call-incoming to said personal station, said service supply means prohibits the paging to said personal station, prohibits the connection between said personal station and the caller to said personal station and transmits to said personal station a message indicating that there has been the call-incoming thereto if the time is in the call-incoming prohibiting time zone which is indicated by the service information corresponding to the area where said personal station is located, and said service content notifying means transmits to said personal station supplied with the special service from said service supply means a message which indicates that the area where said personal station is located is in the call-incoming prohibiting time zone, and also indicates a time when the call-incoming prohibiting time zone is completed.

46. The base station as claimed in claim 42, wherein said service content notifying means transmits a message indicating that the area where said personal station is located is in the call-incoming prohibiting time zone, and a voice message indicating the time at which the call-incoming prohibiting time zone is completed, to the caller to said personal station to which the special service is supplied from said service supply means.

47. The base station as claimed in claim 42, further including an operation center having call-incoming accepting means for accepting the call-incoming, calling means for calling to said personal station in accordance with an instruction which is input from the external, and connecting means for connecting, in accordance with an instruction input from the external, a caller of the call-incoming accepted by said call-incoming means and a personal station which is a call target to which said calling means calls, wherein said service supply means pages said personal station to connect said personal station and said operation center regardless of the service information corresponding to the area where said personal station is located, if the caller is said operation center when there is a call-incoming to said personal station.

48. The base station as claimed in claim 42, wherein said service information stored in said service information storage means indicates prohibition of the call from a personal station located in the corresponding area, and wherein said service supply means prohibits the connection between said personal station and a caller to said personal station when there is a call from said personal station, and said service content notifying means transmits to a personal station supplied with the special service from said service supply means a message indicating that the area where said personal station is located is a calling prohibited area.

49. The base station as claimed in claim 42, wherein said call-incoming is not regulated in accordance with a time zone in a specific area even though the own area is in a service area, and a time zone in which the call-incoming is allowed is informed to a caller in the form of a talkie message.

50. The base station as claimed in claim 42, wherein said service information indicates a call-incoming prohibiting time zone in which the call-incoming to or calling from a personal station located in the own area is prohibited, and wherein said personal station to which the special service is supplied receives a setup signal from said base station, and the connection between said personal station and a caller is prohibited when the setup signal contains service information indicating that an area where said personal station is located is in a call-incoming prohibiting time zone in which the call-incoming to or calling from said personal station is prohibited, and display means displays a message indicating that there has been call-incoming to said personal station and that the time at the call-incoming is in the call-incoming prohibiting time zone, and also a message indicating the time when the call-incoming prohibiting time zone is completed such that the subscriber of said personal station knows the reason why the connection between said personal station and said caller is prohibited.

51. A movable communication method for a movable communication system having plural personal stations, plural base stations each of which covers a predetermined area and performs a radio communication with a personal station located in the area, an exchanger for controlling said plural base stations, and service information storage means for storing service information indicating that an area covered by each of said base station is a call-incoming prohibited area, comprising the steps of:

prohibiting the paging to a personal station and transmitting to said personal station a message indicating that there has been call-incoming when said personal station located in the area has the call-incoming and the call-incoming prohibited area service information is stored in said service information storage means of the base station corresponding to the area where said personal station is located or the exchanger for controlling said base station; and transmitting to said personal station supplied with the call-incoming service message a service content message which indicates that the area is a call-incoming prohibited area, whereby the reason why the call-incoming to said personal station is prohibited can be known at said personal station.

52. A communication method of a base station which performs a radio communication with a personal station located in an own area, comprising steps of:

storing service information indicating a content of a special service other than a calling service and a call-incoming service to be supplied to a personal station located in the own area;

supplying to said personal station located in the own area the special service indicated by the stored service information when there is a call from or a call-incoming to said personal station located in the own area; and transmitting to said personal station located in the own area and supplied the special service, a message indicating the content of the special service.

53. The communication method as claimed in claim 52, wherein said service information indicating the content of the special service is call or call-incoming prohibited area information which indicates that said personal station is located in a call or call-incoming prohibited area.

54. A movable communication system having personal stations, base stations each of which covers a predetermined area and performs a radio communication with a personal station located in the area, and an exchanger for controlling said base stations, including:

service information storage means (memory of base station) for storing a call-incoming prohibited area service and prohibition reason service information; and service content notifying means for notifying the service information to said personal station when there is a call-incoming to said personal station and the service information is stored in a base station covering said personal station, whereby the call-incoming prohibiting reason is notified to said personal station.

* * * * *